United States Patent
Tanaka et al.

(10) Patent No.: US 6,704,933 B1
(45) Date of Patent: Mar. 9, 2004

(54) PROGRAM CONFIGURATION MANAGEMENT APPARATUS

(75) Inventors: Akihiro Tanaka, Moriguchi (JP); Toshiya Mori, Settsu (JP)

(73) Assignee: Masushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/496,620

(22) Filed: Feb. 2, 2000

(30) Foreign Application Priority Data

Feb. 3, 1999 (JP) .......................... 11-026272

(51) Int. Cl.[7] .................. G06F 9/44; G06F 15/177
(52) U.S. Cl. ................ 725/132; 725/140; 725/152; 717/168; 717/170; 709/221
(58) Field of Search ................. 725/132, 140, 725/152; 348/180, 107; 717/168, 170, 173

(56) References Cited

U.S. PATENT DOCUMENTS

| | | | |
|---|---|---|---|
| 5,210,854 A | | 5/1993 | Beaverton et al. |
| 5,450,589 A | | 9/1995 | Maebayashi et al. |
| 5,809,287 A | * | 9/1998 | Stupek et al. ............ 703/22 |
| 5,826,075 A | | 10/1998 | Bealkowski et al. |
| 5,878,256 A | | 3/1999 | Bealkowski et al. |
| 6,002,869 A | * | 12/1999 | Hinckley .............. 717/124 |
| 6,363,499 B1 | * | 3/2002 | Delo et al. ............ 714/15 |
| 6,460,175 B1 | * | 10/2002 | Ferri et al. .......... 717/103 |

FOREIGN PATENT DOCUMENTS

JP         8-331278         12/1996

* cited by examiner

*Primary Examiner*—John Miller
*Assistant Examiner*—Johnny Ma

(57) ABSTRACT

A program configuration management apparatus restores the configuration of programs in the receiving apparatus to an original state if programs downloaded for version-up contain bugs. The program configuration management apparatus includes a program download unit for downloading programs via communication channels, a program management unit for storing the downloaded programs as well as previous versions of the downloaded programs into an object storing unit, and a history information management unit for storing history information concerning the downloaded programs into a history information storing unit. On receiving a previous version reinstallation designation for a specific program from a broadcast center, the program management unit validates a previous version of the specific program stored in the object storing unit by referring to the history information storing unit via the history information management unit.

8 Claims, 34 Drawing Sheets

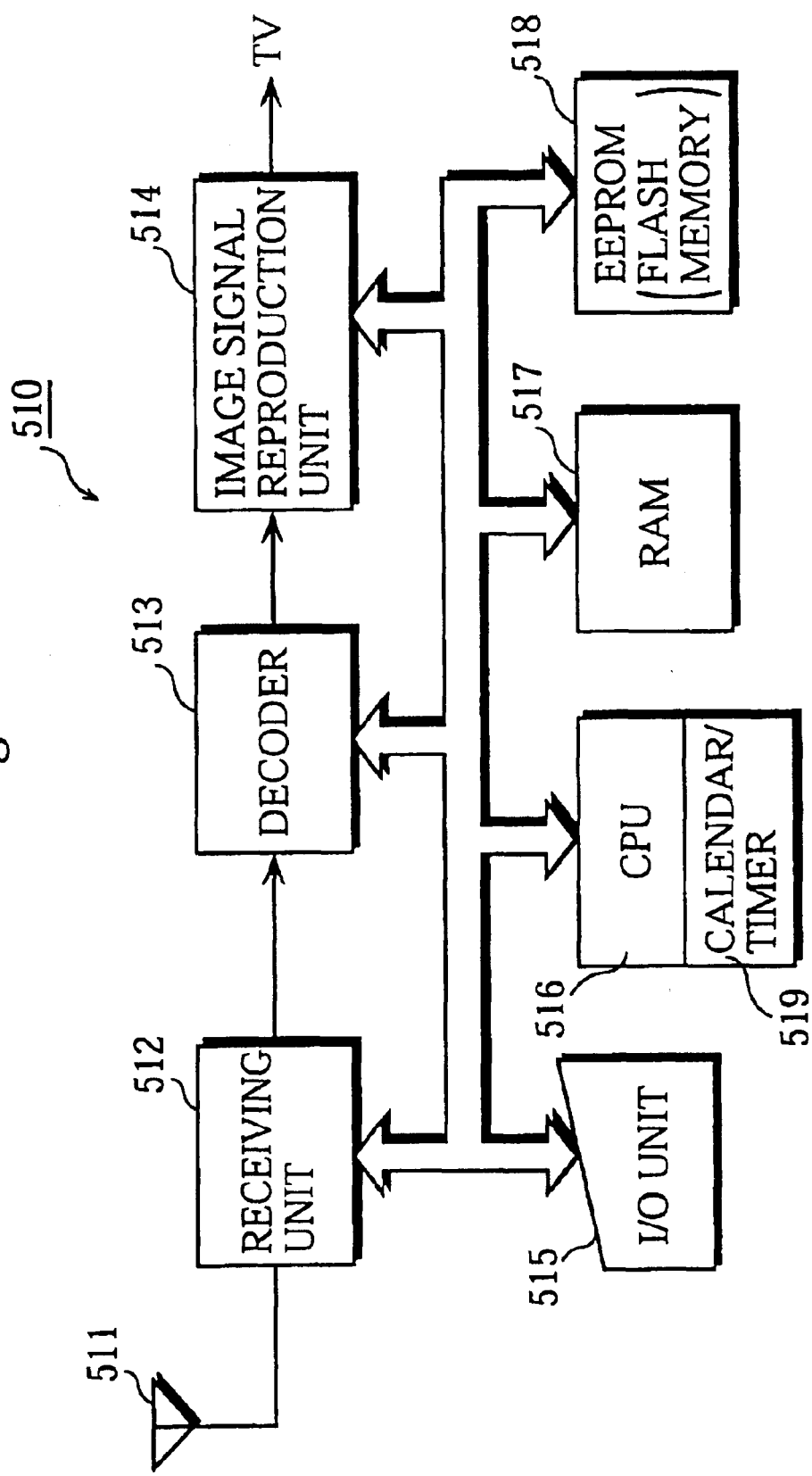

THE CASE WHERE TARGET OBJECT IS MODULE

THE CASE WHERE TARGET OBJECT IS APPLICATION

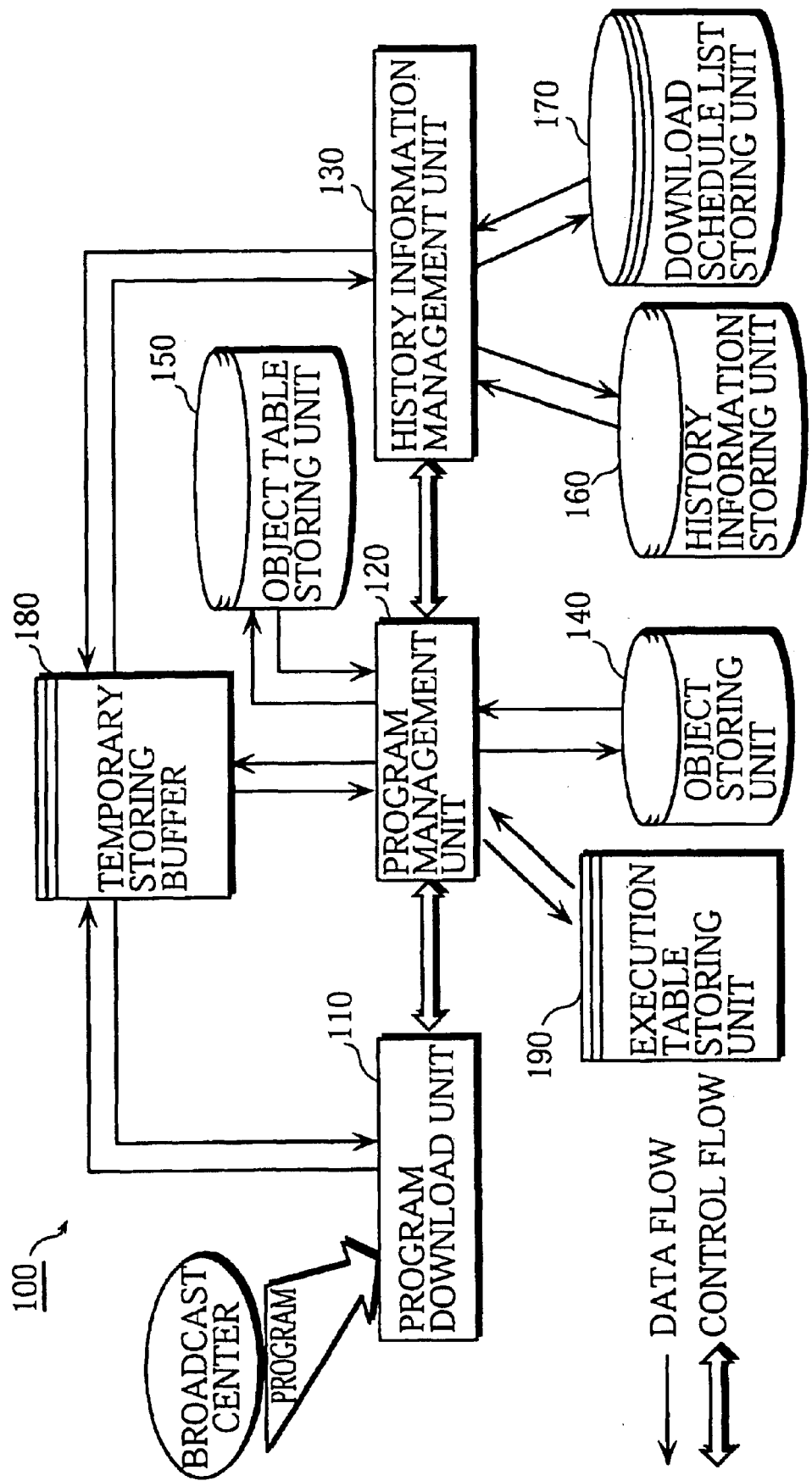

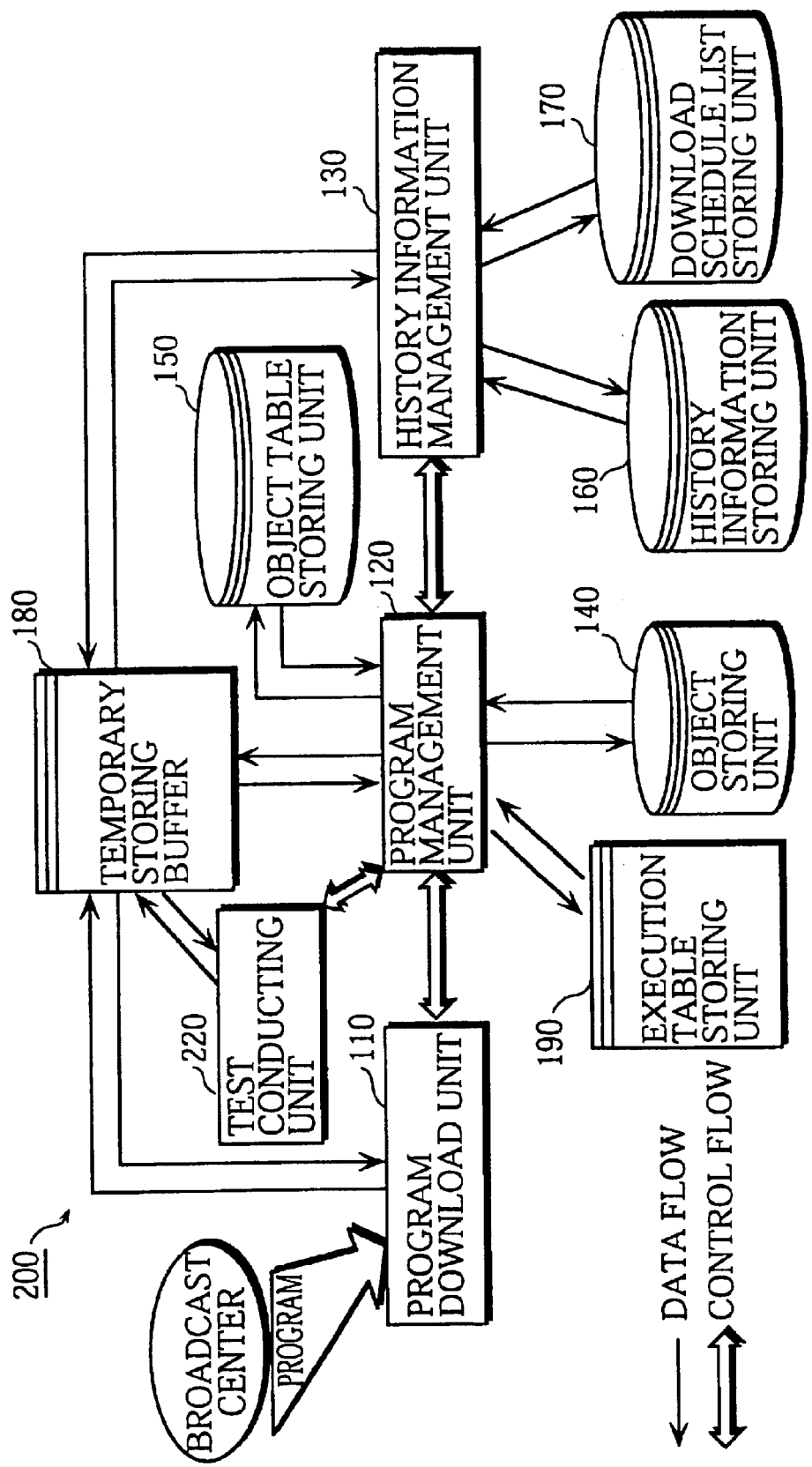

PROGRAM CONFIGURATION MANAGEMENT APPARATUS

This application is based on application No. H11-026272 filed in Japan, the content of which is hereby incorporated by reference.

BACKGROUND OF THE INVENTION

1. Field of the Invention

The present invention relates to an apparatus that manages the configuration of a plurality of programs, which are stored in an electrical appliance and provide functions of the electrical appliance. More particularly, the present invention relates to a program configuration management apparatus for downloading programs sent via a communication channel and revising programs in a communication terminal device using the downloaded programs.

2. Background Art

Programs installed in communication terminal devices, such as tuners used for digital satellite broadcasts and CATVs (Cable Televisions), are conventionally updated by downloading new versions of the programs sent via transmission channels in their entirety and completely replacing old versions in non-volatile memories, such as flash memories, of the communication terminal devices with the new versions. Old versions are not erased during the updating and are kept as recovery programs to guarantee the functioning of the communication terminal devices.

As the variety of communication services, such as satellite broadcasts and CATVs, has increased in recent years, so have the functions that communication terminal devices need to perform. As a result, the software installed in the communication terminal devices has also increased in size. Consequently, with the aforementioned conventional method where programs are updated by downloading entire new versions, it is only realistically possible for a communication terminal device to keep one previous version as a backup. Therefore, if a new version downloaded for a bug fix also contains bugs, the communication terminal device will be left with no fully functioning program.

Also, since the presence of bugs in only certain parts of a current version will necessitate the downloading of an entire new version, there is the problem that transmission channels are unnecessarily occupied by program downloads.

This problem could potentially be solved by dividing the programs required by the communication terminal devices into small units (modules) according to functions and updating programs in module units. However, when the number of modules becomes very large or the number of versions increases due to repeated program updates, there will be an explosive increase in the number of combinations of modules. As a result, checking whether each module combination is executable becomes an enormous burden. Also, when new versions downloaded into communication terminal devices contain bugs or are not fully compatible with other programs that have already been downloaded, the new versions hinder the functioning of the other programs that hitherto operated normally.

SUMMARY OF THE INVENTION

The present invention relates to a program configuration management apparatus that is used for a communication terminal device, which downloads the entire new version of a program or each module of the new version and updates a current version with the downloaded new version or module.

In view of the stated problems, the present program configuration management apparatus avoids the inconvenience that a defective downloaded version or module may hinder the functioning of other programs that hitherto operated properly.

The stated object is achieved by a program configuration management apparatus that is used for a communication terminal device and manages a configuration of programs for providing functions of the communication terminal device, the program configuration management apparatus including: a download unit for downloading a program via a communication channel; a program holding unit for holding the downloaded program as well as at least one previous version of the downloaded program; and a previous version reinstallation unit for receiving a previous version reinstallation designation for a specific program held in the program holding unit, invalidating a current version of the specific program, and validating a previous version of the specific program.

With this construction, the program configuration management apparatus of the present invention validates previous versions stored in the communication terminal device. Therefore, even if programs that are newly downloaded for version-up contain bugs, the program configuration management apparatus restores the state (program configuration) of the communication terminal device to the original state where the communication terminal device functioned properly. As a result, a situation where programs downloaded for version-up impair the functioning of the communication terminal device is avoided.

Here, the program holding unit may include: a program holding unit for holding each program downloaded by the download unit, and a management information holding unit for holding management information that shows a name, a version, and validity information for each program in the program holding unit, the validity information showing whether a program is valid or invalid, with programs whose validity information is valid being selected as execution objects, and the previous version reinstallation unit may include: a receiving unit for receiving a designation of a name of the specific program and a reinstallation target version of the specific program; and a reinstallation unit for validating a previous version of the specific program by changing the validity information of a certain version of the specific program, the certain version being a most recent version, out of the reinstallation target version and older versions of the specific program, in the program holding unit.

With this construction, when it is necessary to invalidate the current version of a program and validate another version of the program, it is enough to change validity information related to the versions. Therefore, an operation for invalidating the latest version of a program and validating a previous version is simplified.

Here, the program configuration management apparatus may further include a history information holding unit for holding history information giving a name, a version, a downloading date and time, and an invalidation date and time for each of the downloaded programs, the downloading date and time showing when a program was downloaded and the invalidation date and time showing when a program that has been invalidated was invalidated, where the management information also shows the names and versions of programs that have dependent relations with individual programs in the program holding unit, and the previous version reinstallation unit further includes: a related program reinstallation unit that identifies all programs which have dependent relations with the specific program by referring to the management information, and validates a suitable version of each identified program by referring to the history information, the suitable version of each identified program being the version that was downloaded at a latest time prior to the invalidation date and time of the version validated by the reinstallation unit.

With this construction, the program configuration management apparatus validates previous versions of a specified program and other programs having dependent relations with the specified program. In this manner, the program configuration management apparatus validates a program set where compatibilities between programs are maintained. Therefore, a situation where a reinstalled previous version impairs the functioning of other programs due to the incompatibilities between versions is avoided.

Here, the program configuration management apparatus may further include a test unit for performing a test execution on each downloaded program and writing only programs that pass the test execution into the program holding unit. With this construction, even if a newly downloaded program contains critical bugs, for instance, a worst case where the downloaded program renders the communication terminal device completely inoperative is avoided.

Here, the download unit may download test conditions and pass/fail evaluation criteria together with each program, and the test unit may perform a test execution on each downloaded program using the test conditions downloaded with the program and judge whether the program has passed the test execution according to the pass/fail evaluation criteria downloaded with the program. With this construction, the sending side of a program who thoroughly familiar with the specification of the program sets information, such as test conditions and pass/fail criteria, and sends the information to the communication terminal device. As a result, the program is definitely subjected to an appropriate test execution.

Here, the test unit may include a test result saving unit for saving a result of the test execution of each downloaded program so that the result is associated with the downloaded program, where before a downloaded program is subjected to a test execution, the test unit refers to the test result saving unit and terminates the test execution if the downloaded program failed a previous test execution. With this construction, a situation where a program that has failed a previous test execution is unnecessarily downloaded and subjected to a test execution again is avoided.

Here, the program configuration management apparatus may further include: a removable, non-volatile memory; a backup unit for copying a designated program from the program holding unit to the non-volatile memory, management information related to the designated program from the management information holding unit to the non-volatile memory, and history information related to the designated program from. the history information holding unit to the non-volatile memory; and a restoring unit for copying the copied program from the non-volatile memory to the program holding unit, the copied management information from the non-volatile memory to the management information holding unit, and the copied history information from the non-volatile memory to the history information holding unit. The non-volatile memory is used to store backup copies of programs stored in the communication terminal device or to transfer programs from a communication terminal device into another communication terminal device. Therefore, even if programs downloaded for version-up hinder the functioning of the communication terminal device, for instance, the communication terminal device is restored to a functioning condition with the backup copies.

Here, the program configuration management apparatus may further include a relocation unit for receiving a designation of an unwanted version of a program, erasing the unwanted version and all earlier versions of the program from the program holding unit, and relocating remaining programs in the program holding unit to combine blank areas where the erased versions were previously stored. With this construction, even if programs are stored in a memory, such as a flash memory, where data is erased in blocks, only unnecessary programs are erased. As a result, the utilization ratio of the memory rises.

Here, the download unit and the previous version reinstallation unit may be achieved by programs that are executed in the communication terminal device, and the programs downloaded by the download unit, held in the program holding unit, and validated by the previous version reinstallation unit may include the programs for achieving the download unit and the previous version reinstallation unit. With this construction, programs that construct (provide functions of) the program configuration management apparatus as well as programs that construct the communication terminal device are downloaded. Therefore, the functions of the program configuration management apparatus are also updated or restored to an original state.

Here, the program configuration management apparatus may further include a temporary holding buffer for loading programs to be executed by the communication terminal device from the program holding unit and temporarily holding the loaded programs, where the communication terminal device executes the programs that are temporarily held in the temporary holding buffer. With this construction, all programs stored in the communication terminal device are copied to the temporary storing buffer and the programs in the temporary storing buffer are executed. Therefore, a situation where programs are destroyed by downloads is avoided.

Here, the program configuration management apparatus may further include an interaction unit for interacting with a user by displaying graphics, where the test unit performs test executions on downloaded programs that have been specified by the interaction unit. With this construction, test executions are performed only on programs that the user wishes to subject to test executions. This reduces the time necessary to find bugs contained in programs.

Here, the interaction unit may display a state of each test execution performed by the test unit using graphics and obtain pass/fail evaluation criteria for the test execution from the user. With this construction, the user visually checks whether programs run properly. This reduces the burden of debugging programs on the user.

Here, the program configuration management apparatus may further include an interaction unit for interacting with a user by displaying graphics, where the download unit downloads programs specified by the interaction unit. With this construction, because the user specifies programs to be downloaded and revised, the program configuration management apparatus incorporates the user's usage pattern and intention into the program configuration in the communication terminal device. As a result, the program configuration management apparatus satisfies the user's needs.

Here, the interaction unit may display all programs that have dependent relations with a program specified by the user and display a plurality of acquisition routes that are selectable as the communication channel, and the download unit may download the programs specified by the interaction unit via an acquisition route specified by the interaction unit. With this construction, even if the user does not know the name of a program that he wishes to update, he finds the program according to related programs. Also, even if a specific communication line is unusable or is jammed, programs are downloaded via another communication route to update software in a receiving apparatus.

Also, the program configuration management apparatus may include a unit for informing a center (a program distributor) of test execution results and a final program configuration via a bidirectional communication channel, such as a telephone line. With this construction, the center statistically grasps information concerning bugs in programs and incompatibilities between programs. The center uses this information to debug programs and improve quality of programs.

The stated object is also achieved by a program configuration management method where the units of the program configuration management apparatus are achieved as steps.

The stated object is further achieved by a computer-readable recording medium that records a program including the steps of the program configuration management method described above.

As described above, with the present invention, the program configuration in a communication terminal device that downloads programs and revise programs therein with the downloaded programs is restored to a previous program configuration where compatibilities between programs are maintained according to a download history. Therefore, the present invention has a great practical use as a program configuration management apparatus for a receiving apparatus intended for satellite broadcasts whose communication service variety is rapidly increasing.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 shows the overall hardware construction of a digital satellite broadcast receiving apparatus into which a program configuration management apparatus of the present invention is built;

FIG. 4 is a functional block diagram showing the construction of a program configuration management apparatus of the first embodiment;

FIG. 21 is a functional block diagram showing the construction of a program configuration management apparatus of the second embodiment;

DESCRIPTION OF THE PREFERRED EMBODIMENTS

Figure 2A:
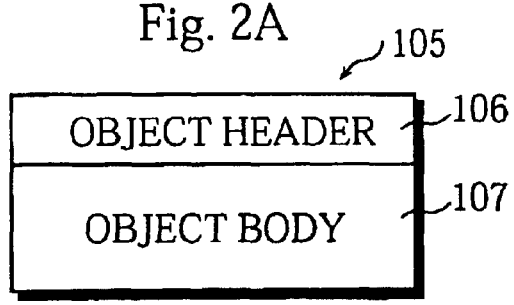
FIG. 2A shows the data construction of an object sent from a broadcast center.

Embodiments of the present invention are described in detail below with reference to the drawings.

<First Embodiment>

The first embodiment relates to a program configuration management apparatus 100 that downloads new versions of programs and replaces previous versions in a communication terminal device with the new versions. The program configuration management apparatus 100 also records the history of the download and version-up, accumulates the new versions in the communication terminal device without erasing the previous versions, and reinstalls an intended previous version by referring to the history. It should be noted here that the reinstallation of a previous version is referred to as "version-down" in this specification.

FIG. 1 shows the overall hardware construction of a receiving apparatus 510 into which the program configuration management apparatus 100 of the present embodiment is built. The receiving apparatus 510 receives digital satellite broadcasts and includes an antenna 511 for receiving radio waves sent from a broadcast center, a receiving unit 512 for demodulating the received radio waves to obtain digital data, a decoder 513 for separating the digital data into various information (image data, audio data, programs, and other data) and decoding the information, an image signal reproduction unit 514 for converting the decoded image and audio data into analog signals and outputting the analog signals to a TV that is connected to the receiving apparatus 510, an I/O (input/output) unit 515 that includes buttons and a LCD (liquid crystal display) and allows a user to interact with the receiving apparatus 510, a RAM (random-access memory) 517 for providing a temporary work area, an EEPROM (electrically erasable programmable ROM) 518 that is a rewritable non-volatile memory and holds programs and data for providing functions of the receiving apparatus 510 and the program configuration management apparatus 100, a CPU (central processing unit) 516 that executes the programs, and a calendar/timer 519 for counting the actual time.

The broadcast center sends objects as well as image data and audio data to the receiving apparatus 510, with the objects being multiplexed with the image and audio data. Here, each "object" is a piece of information to be downloaded into the receiving apparatus 510 and is classified into a program or data for achieving a function of the receiving apparatus 510. The program sent from the broadcast center is, for instance, an EPG (Electronic Program Guide) program for achieving an EPG function. Also the data sent from the broadcast center is, for instance, image data of logos displayed on a screen and broadcast data for information, such as news and weather, that is accumulated in a receiving apparatus. It should be noted here that each embodiment described below takes the case where objects sent from the broadcast center are programs as an example.

Figure 2B:
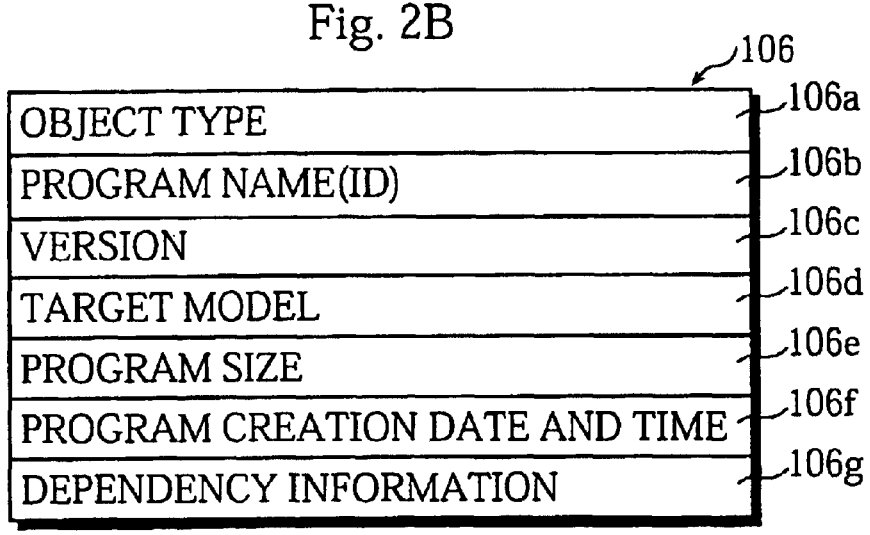
FIG. 2B shows the data construction of an object header.

FIG. 2A shows the data structure of an object 105 sent from the broadcast center. As shown in this drawing, the object 105 includes an object header 106 and an object body 107. The object header 106 shows various information, such as the attributes of the object 105, and the object body 107 is the actual content (a program or data) of the object 105. FIG. 2B shows the data structure of the object header 106. As shown in this drawing, the object header 106 includes an object type 106a, a program (or data) name (ID) 106b, a version 106c, a target model 106d, a program (or data) size 106e, a program (or data) creation date and time 106f, and dependency information 106g.

The object type 106a shows whether the object 105 is a program or data. When the object 105 is a program, the object type 106a also shows whether the program is an application or a module. Here, when a program is an application, the program can be independently executed. On the other hand, when a program is a module, the program cannot be independently executed and needs to be called by another program. The program (or data) name (ID) 106b gives the identifier of the object 105 and the same name (ID) is assigned to objects having the same function regardless of the versions of the objects. The version 106c gives the version number of the object 105, with higher numbers being assigned to later versions. The target model 106d shows the type of a receiving apparatus for which the object 105 is intended, that is, the type of a receiving apparatus that can execute (use) the object 105. The program (or data) size 106e shows the size of the object 105 in bytes. The program (or data) creation date and time 106f shows when the object 105 was created. The dependency information 106g gives the objects that have dependent relations (call relations) with the object 105 when the object 105 is a program.

Figure 3A:
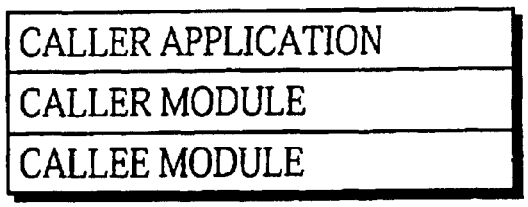
FIG. 3A shows the detailed data structure of dependency information in the case where an object type is a module.
Figure 3B:
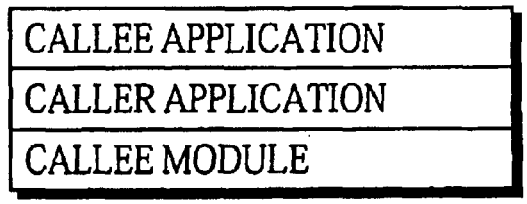
FIG. 3B shows the detailed data structure of the dependency information in the case where the object type is an application.

FIGS. 3A and 3B show the detailed data structure of the dependency information 106f for a module and that for an application, respectively. As shown in FIG. 3A, when the object 150 is a module, the dependency information 106f shows information (names) about all callers (caller applications and caller modules) that call the object 105 and information (names) about all callees (callee modules) that are called by the object 105. On the other hand, when the object 105 is an application, the dependency information 106f shows information (names) about all callers (caller applications), that call the object 105 and information (names) about all callees (callee applications and callee modules) that are called by the object 105, as shown in FIG. 3B. Note that modules are accumulated in the receiving apparatus 510 independently or as elements of applications. Also, the dependency information 106g only gives callers (caller applications and caller modules) that are actually present in the receiving apparatus 510.

FIG. 4 is a functional block diagram showing the construction of the program configuration management apparatus 100 of the first embodiment. This apparatus 100 keeps the objects in the receiving apparatus 510 in a proper and latest state by downloading objects required by the receiving apparatus 510 from the broadcast center and revising objects in the receiving apparatus 510. To do so, the program configuration management apparatus 100 includes three processing units (a program download unit 110, a program management unit 120, and a history information management unit 130) achieved by programs prestored in the EEPROM 518, four non-volatile storage units (an object storing unit 140, an object table storing unit 150, a history information storing unit 160, and a download schedule list storing unit 170) that are areas in the EEPROM 518, and two volatile storing units (an execution table storing unit 190 and a temporary storing buffer 180) that are areas in the RAM 517. Note that in this drawing, black arrows indicate the flows of downloaded objects (programs and data) and white arrows show control flows.

The object storing unit 140 holds objects that may become execution objects of the CPU 516 (executable programs and data), that is, objects that achieve functions of the receiving apparatus 510.

Figure 5:
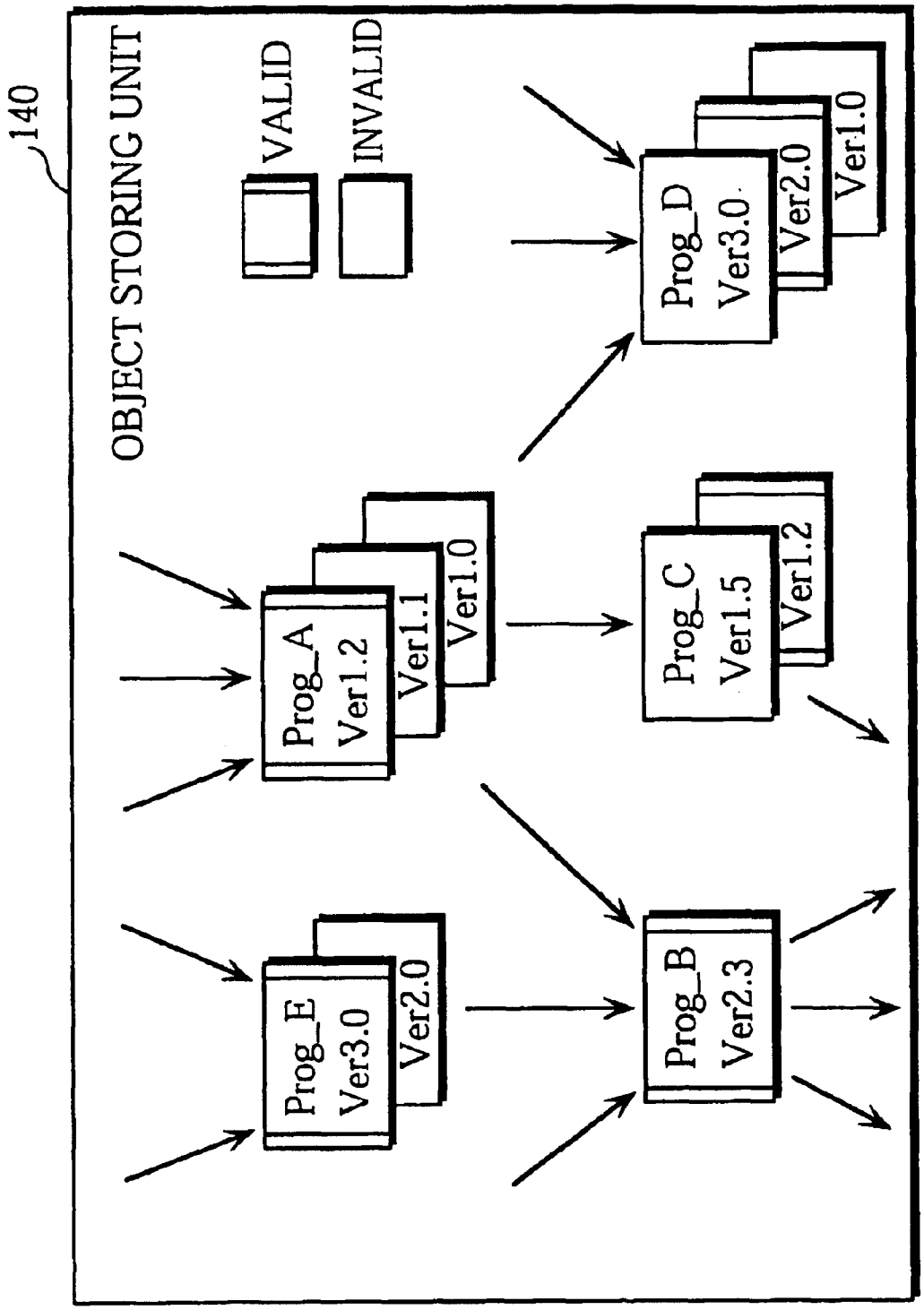
FIG. 5 shows a state of a program group stored in an object storing unit.

FIG. 5 shows the state of a program group that is stored in the object storing unit 140. This program group includes previous versions as well as the latest versions. More specifically, the object storing unit 140 stores every executable version regardless of whether the version is "valid" or "invalid". With this construction, the program configuration management apparatus 100 can easily handle a situation where a version that has been previously invalidated needs to be adopted (validated) again.

Here, a program is "valid" if the program is selected as an execution object of the CPU 516, while a program is "invalid" if the program is not selected so. Also, a program is "executable" if all programs that are called by the program and subsequently called by such a called program (i.e., callee programs on any nesting level) are present in the object storing unit 140.

The temporary storing buffer 180 temporarily holds programs that have been sent from the broadcast center but are not eligible to be stored in the object storing unit 140. That is, the temporary storing buffer 180 temporarily holds programs that are not executable due to the lack of their callee programs in the receiving apparatus 510. It should be noted here that because data does not have dependent relations with other data unlike programs, downloaded data is unconditionally stored in the object storing unit 140.

The object table storing unit 150 stores a plurality of object tables. Each object table corresponds to one object stored in the object storing unit 140 (an executable program or data) and includes information for managing the corresponding object.

Figure 6:
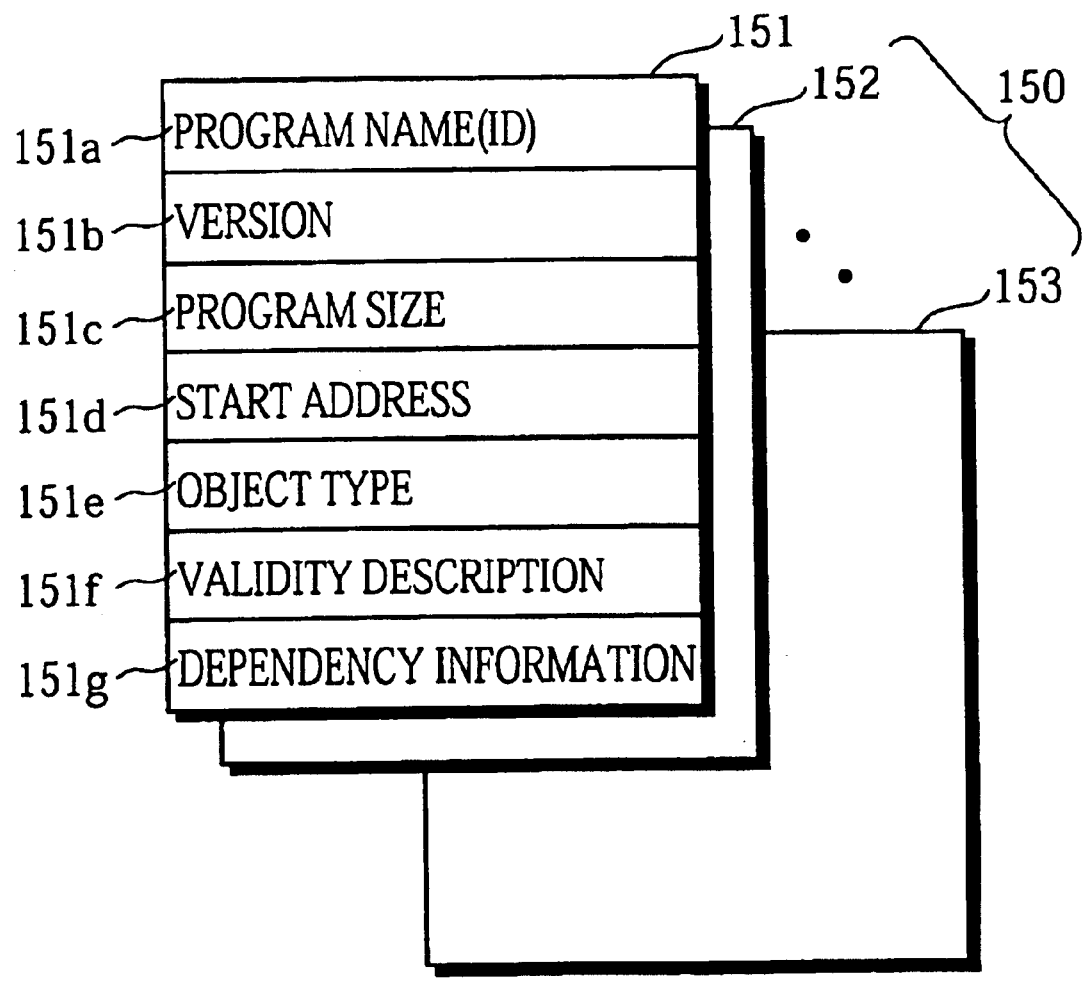
FIG. 6 shows the data structure of object tables stored in an object table storing unit.

FIG. 6 shows the data structure of object tables 151–153 stored in the object table storing unit 150. Each of the object tables 151–153 includes a program (or data) name (ID) 151a, a version 151b, a program (or data) size 151c, a start address 151d, an object type 151e, a validity descriptor 151f, and a dependency information 151g. In these object tables, the program (or data) name (ID) 151a, version 151b, program (or data) size 151c, object type 151e, and dependency information 151g are respectively the same as the program (or data) name (ID) 106b, version 106c, program (or data) size 106e, object type 106a, and dependency information 106g of the object header 106 shown in FIG. 2B. Also, the start address 151d shows the location (the start address) of the corresponding object in the object storing unit 140 or the temporary storing buffer 180. When the object is a program, the validity descriptor 151f indicates whether the program is valid or invalid.

The execution table storing unit 190 stores a plurality of execution tables which each correspond to an object that is currently valid. Each execution table is a collection of information about the execution of the corresponding valid object. That is, the execution table storing unit 190 stores information only concerning objects whose validity descriptors 151f are set as valid among the objects registered in the object table storing unit 150. It should be noted here that in this specification, each object registered in the object table storing unit 150 means an object whose object table is stored in the object table storing unit 150. The execution table storing unit 190 is used by the program configuration management apparatus 100 to inform the receiving apparatus 510 of programs that should be set as execution objects, that is, valid programs that are guaranteed to function properly, out of the many programs stored in the receiving apparatus 510 (in the object storing unit 140).

Figure 7:
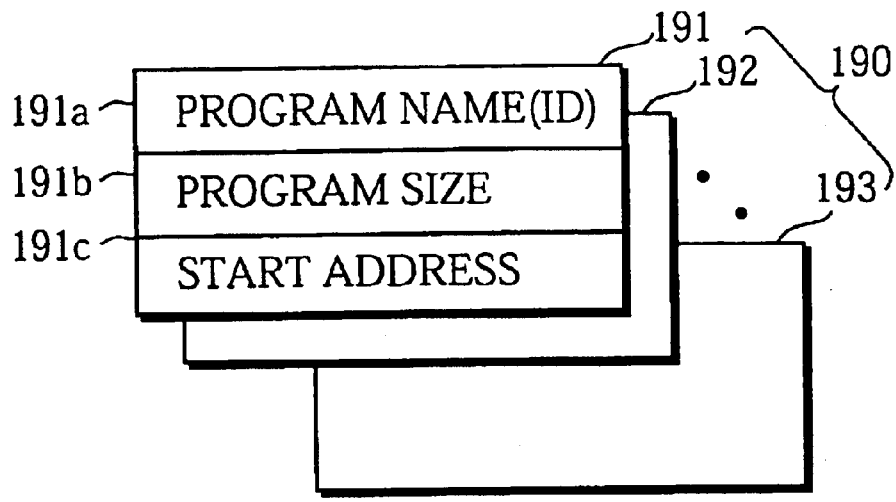
FIG. 7 shows the data structure of execution tables stored in an execution table storing unit.

FIG. 7 shows the data structure of execution tables 191–193 stored in the execution table storing unit 190. Each of the execution tables 191–193 corresponds to one object and includes a program (or data) name (ID) 191a, a program (or data) size 191b, and a start address 191c. The execution tables 191–193 are respectively the subsets of the object tables 151–153. That is, the execution table 191–193 are respectively partial copies of the object tables 151–153.

The history information storing unit 160 stores history information concerning the downloading and revision of objects by the receiving apparatus 510.

Figure 8:
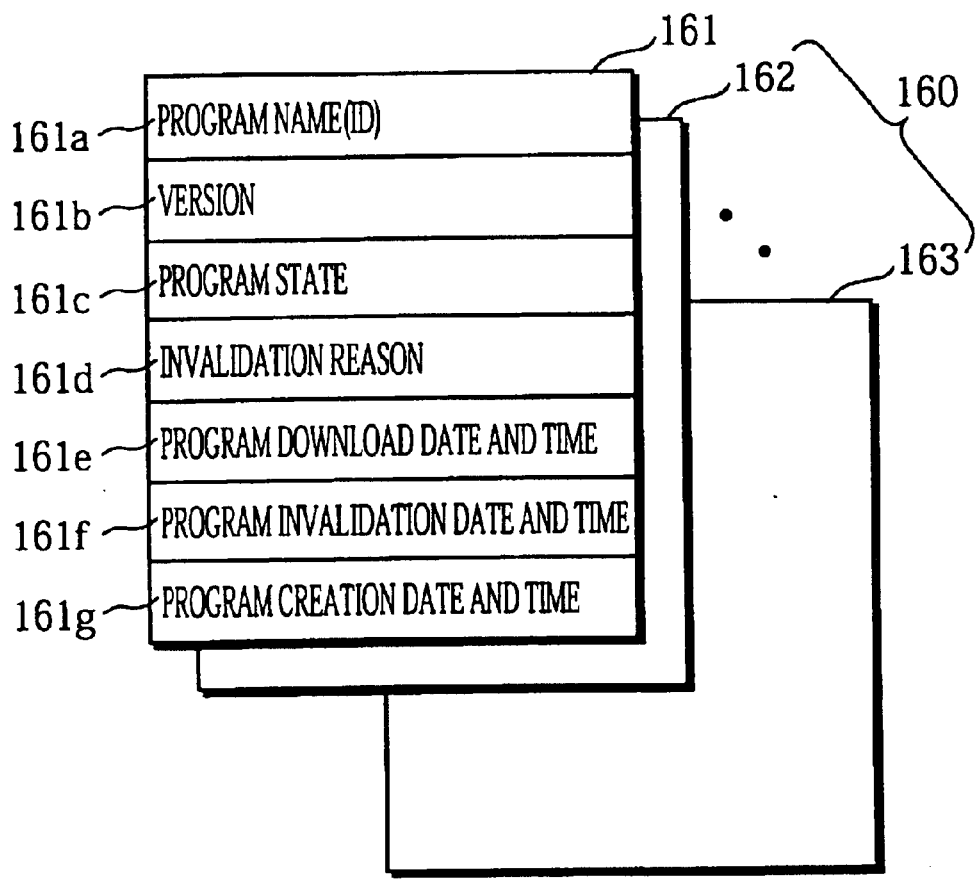
FIG. 8 shows the data structure of history information tables stored in a history information storing unit.

FIG. 8 shows the data structure of history information tables 161–163 stored in the history information storing unit 160. Each of the history information tables 161–163 corresponds to one object registered in the object table storing unit 150 and includes a program (or data) name (ID) 161a, a version 161b, a program (or data) state 161c, an invalidation reason 161d, a program (or data) download date and time 161e, a program (or data) invalidation date and time 161f, and a program (or data) creation date and time 161g. Among these items, the program (or data) name (ID) 161a, version 161b, and program (or data) creation date and time 161g are respectively the same as the program (or data) name (ID) 106b, version 106c, and program (or data) creation date and time 106f of the object header 106.

The program state 161c shows the state of the corresponding program ("valid", "invalid", "download waiting", or "erasable"). Here, when a program is in the "download waiting" state, the receiving apparatus 510 is programmed (is required) to download the program. More specifically, the program in the "download waiting" state has not been downloaded into the receiving apparatus 510 but should be downloaded by the program configuration management apparatus 100 when it is sent from the broadcast center.

The invalidation reason 161d gives the reason why the corresponding program is invalidated and makes sense only if the program state 161c is set as invalid. Possible settings for invalidation reason are, for instance, (1) the program has been replaced with a new version downloaded from the broadcast center and is no longer an execution object, (2) the program has been invalidated by the instruction from the broadcast center or a user, (3) the program will not be executed because it is a module and all caller programs have been deleted, and (4) another reason.

The program download date and time 161e shows when the corresponding program was downloaded into the receiving apparatus 510. The program invalidation date and time 161f shows when the corresponding program is invalidated and makes sense if the program state 161c is set as invalid. Note that the receiving apparatus 510 is factory-configured so that some objects are prestored in the object storing unit 140 and the history information storing unit 160 prestores history information tables of the prestored objects.

The download schedule list storing unit 170 stores a schedule list that gives objects which the program configuration management apparatus 100 is programmed to download into the receiving apparatus 510.

Figure 9:
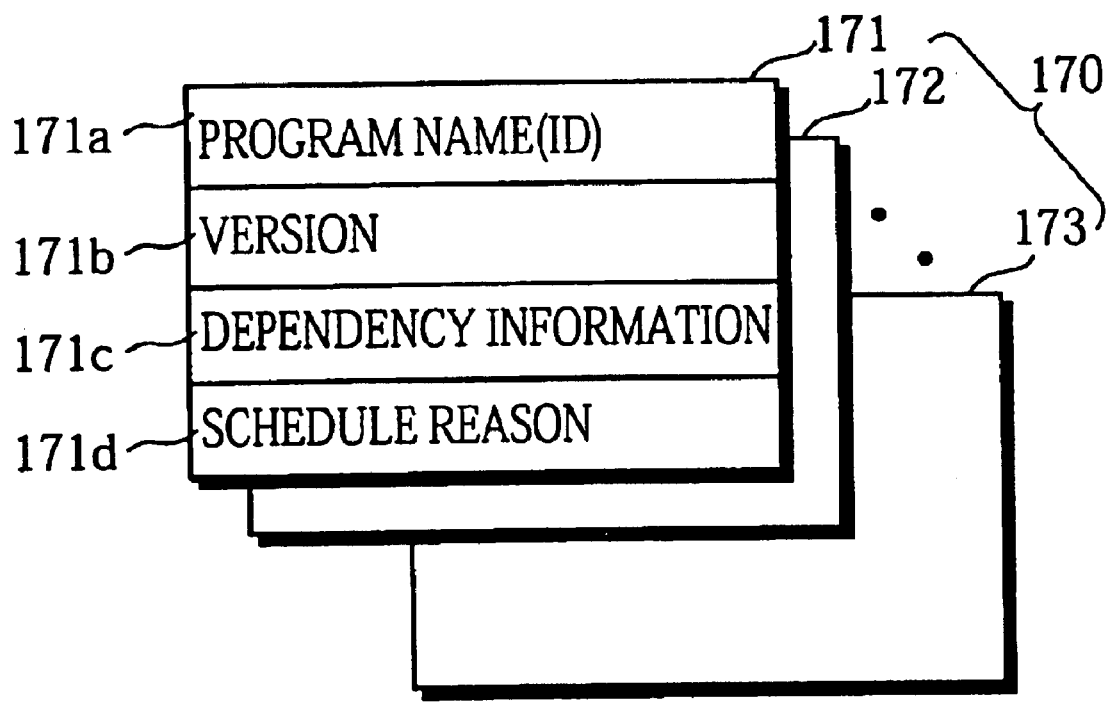
FIG. 9 shows the data structure of a schedule list stored in a download schedule list storing unit.

FIG. 9 shows the data structure of the schedule list stored in the download schedule list storing unit 170. As shown in this drawing, the schedule list includes schedule tables (entries) 171–173 which each correspond to one of the objects that the program configuration management apparatus 100 is programmed to download and each include a program (or data) name (ID) 171a, a version 171b, a dependency information 171c, and a schedule reason 171d. The schedule reason 171d shows the reason why the program configuration management apparatus 100 is programmed to download the corresponding program. The reason given by the schedule reason 171d can be (1) version-up, (2) version-down, or (3) another reason.

The program download unit 110 receives objects sent from the broadcast center and downloads (expands) only objects that meet certain conditions into the temporary storing buffer 180 according to instructions from the program management unit 120.

The program management unit 120 generates execution tables 191–193 for valid objects and updates the execution tables to have valid objects that can definitely be executed set as execution objects of the receiving apparatus 510. By doing so, the program management unit 120 connects the program configuration management apparatus 100 with the receiving apparatus 510. When receiving a request for dynamically selecting an object that should be set as an execution object from the receiving apparatus 510, the program management unit 120 informs the receiving apparatus 510 of the most suitable object at that time by referring to the execution tables 191–193. This means that the program management unit 120 plays a leading role in the program configuration management apparatus 100. The program management unit 120 creates more executable objects by transferring programs and data stored in the temporary storing buffer 180 to the object storing unit 140 while communicating with the program download unit 110 and the history information management unit 130. The program management unit 120 also deletes and transfers objects from the object storing unit 140. During these operations, the program management unit 120 generates and updates object tables and execution tables accordingly. In this manner, the program management unit 120 validates and invalidates objects.

The history information management unit 130 receives inquiries and instructions from the program management unit 120, responds to the inquiries by referring to the history information tables 161–163 and the schedule tables 171–173, and generates and updates the history information tables 161–163 and the schedule tables 171–173. By doing so, the history information management unit 130 keeps a history of changes made to the object configuration in the object storing unit 140 and ensures that objects affected by a version-up or version-down are maintained in an executable state.

The following description concerns the operation of the program configuration-management apparatus 100 having the stated construction.

Figure 10:
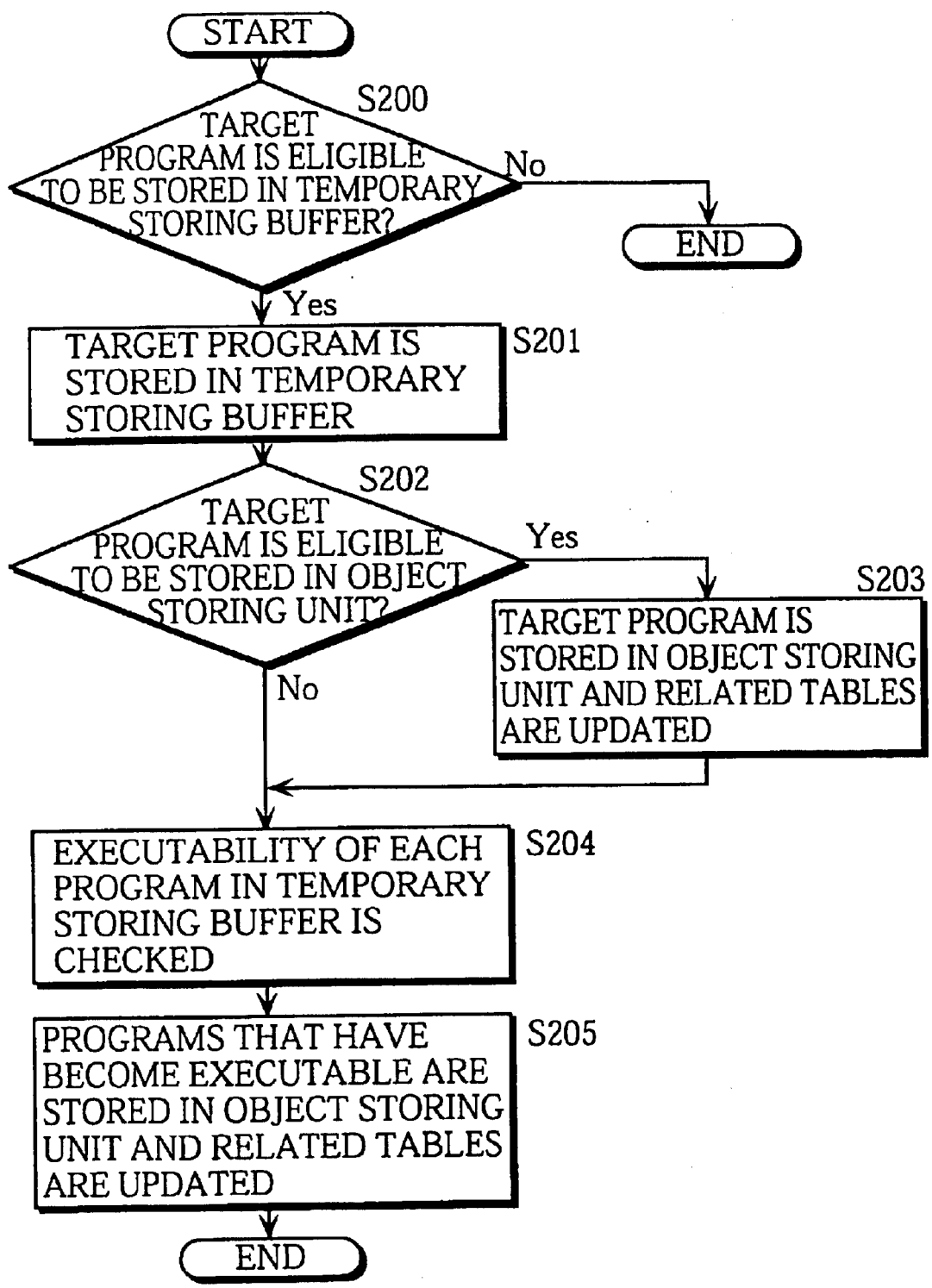
FIG. 10 is a flowchart showing the overall procedure where the program configuration management apparatus downloads a program.

FIG. 10 is a flowchart showing the overall procedure where the program configuration management apparatus 100 downloads a new version and replaces an old version with the downloaded new version. This procedure can be divided into three main processes. In the first process (steps S200–S201), the program configuration management apparatus 100 receives a program from the broadcast center and stores the received program in the temporary storing buffer 180. In the second process (steps S202–S203), the program configuration management apparatus 100 transfers the program stored in the temporary storing buffer 180 to the object storing unit 140 and updates related tables accordingly. In the third process (steps S204–S205), if some programs that are currently stored in the temporary storing buffer 180 become eligible to be stored in the object storing unit 140 due to the received program, the program configuration management apparatus 100 transfers such programs from the temporary storing buffer 180 to the object storing unit 140 and updates the related tables accordingly.

Figure 11:
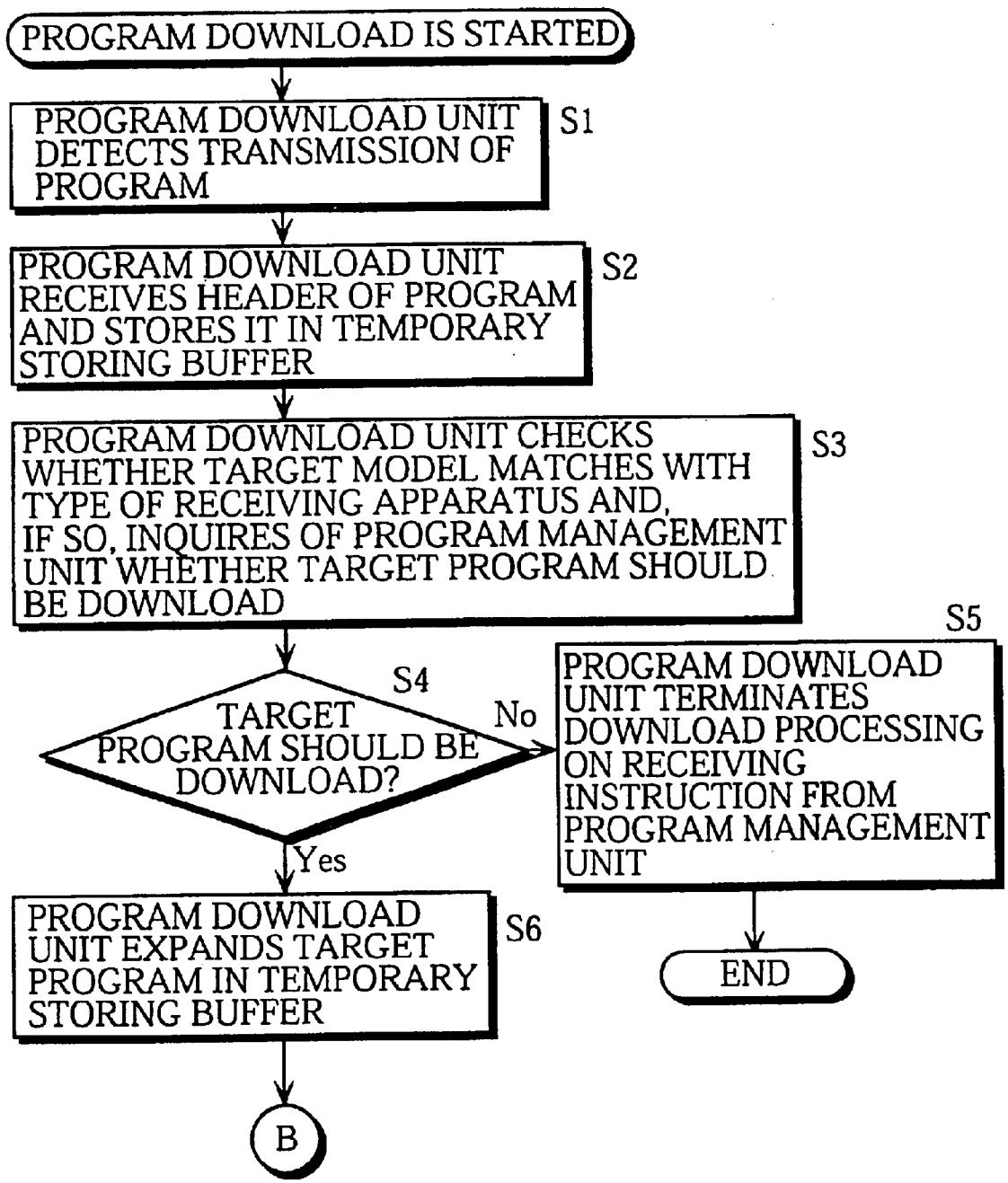
FIG. 11 is a flowchart showing the detailed operation in the first process in the overall procedure shown in FIG. 10.

FIG. 11 is a flowchart showing the detailed operation in the first process (steps S200–S201). That is, FIG. 11 shows the detailed procedure where a program is received from the broadcast center and the received program is stored in the temporary storing buffer 180.

Figure 12:
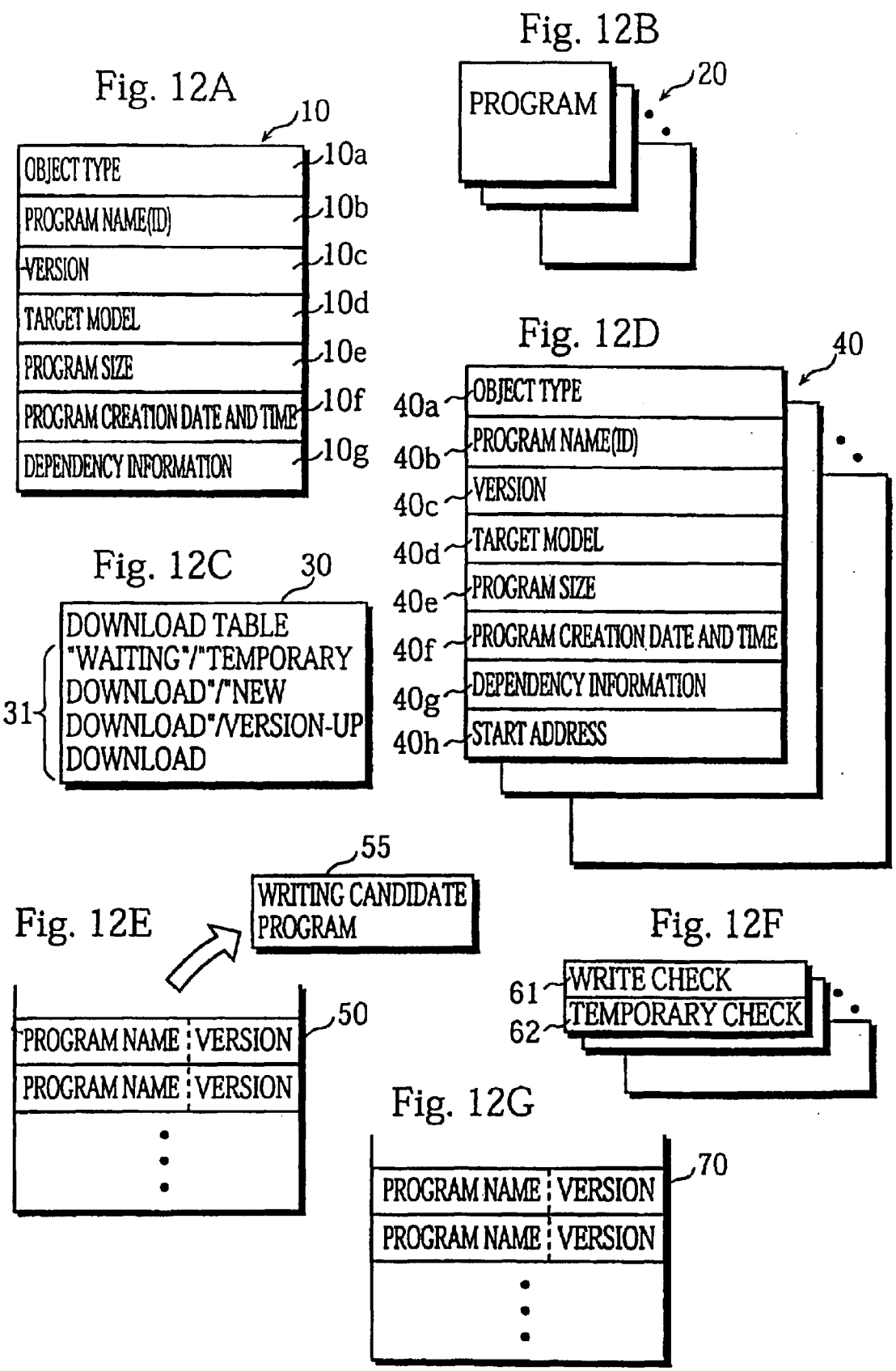
FIG. 12A shows header information that is temporary stored in a temporary storing buffer.
FIG. 12B shows a state of programs that are temporary stored in the temporary storing buffer.
FIG. 12C shows a download table that is temporary stored in the temporary storing buffer.
FIG. 12D shows a temporary object storing table that is temporary stored in the temporary storing buffer.
FIG. 12E shows a candidate program stack that is temporary stored in the temporary storing buffer.
FIG. 12F shows a check flag that is temporary stored in the temporary storing buffer.
FIG. 12G shows the structure of a temporary stack that is temporary stored in the temporary storing buffer.

The program download unit 110 first detects the transmission of a program (a notification that the program will be sent) (step S1). To do so, the program download unit 110 polls and monitors signals sent from the broadcast center using the receiving unit 512 and the decoder 513 under the control of the CPU 516. After detecting the program transmission, the program download unit 110 receives an object header 10 of the program corresponding to the program transmission (such a program is hereinafter referred to as a "target program") and stores the object header 10 in the temporary storing buffer 180 (step S2). FIG. 12A shows the construction of the object header 10. As can be seen from this drawing, the object header 10 has the same construction as the object header 106 shown in FIG. 2B and includes an object type 10a, a program (or data) name (ID) 10b, a version 10c, a target model 10d, a program (or data) size 10e, a program (or data) creation date and time 10f, and dependency information 10g. Note that FIGS. 12A–12G show main information stored in the temporary storing buffer 180 and are described in detail later.

The program download unit 110 then checks whether the target program is intended for the receiving apparatus 510 by referring to the target model 10d included in the object header 10 and, if so, asks the program management unit 120 whether the target program should be downloaded (step S3).

If the program management unit 120 judges that the target program does not need to be downloaded (step S4), the program download unit 110 terminates the download process (step S5). On the other hand, if the program management unit 120 judges that the program needs to be downloaded (step S4), the program download unit 110 expands the target program in the temporary storing buffer 180 (step S6). Note that as shown in FIG. 12B, programs expanded in the temporary storing buffer 180 are accumulated and kept therein until transferred to the object storing unit 140 by the program management unit 120.

Figure 13:
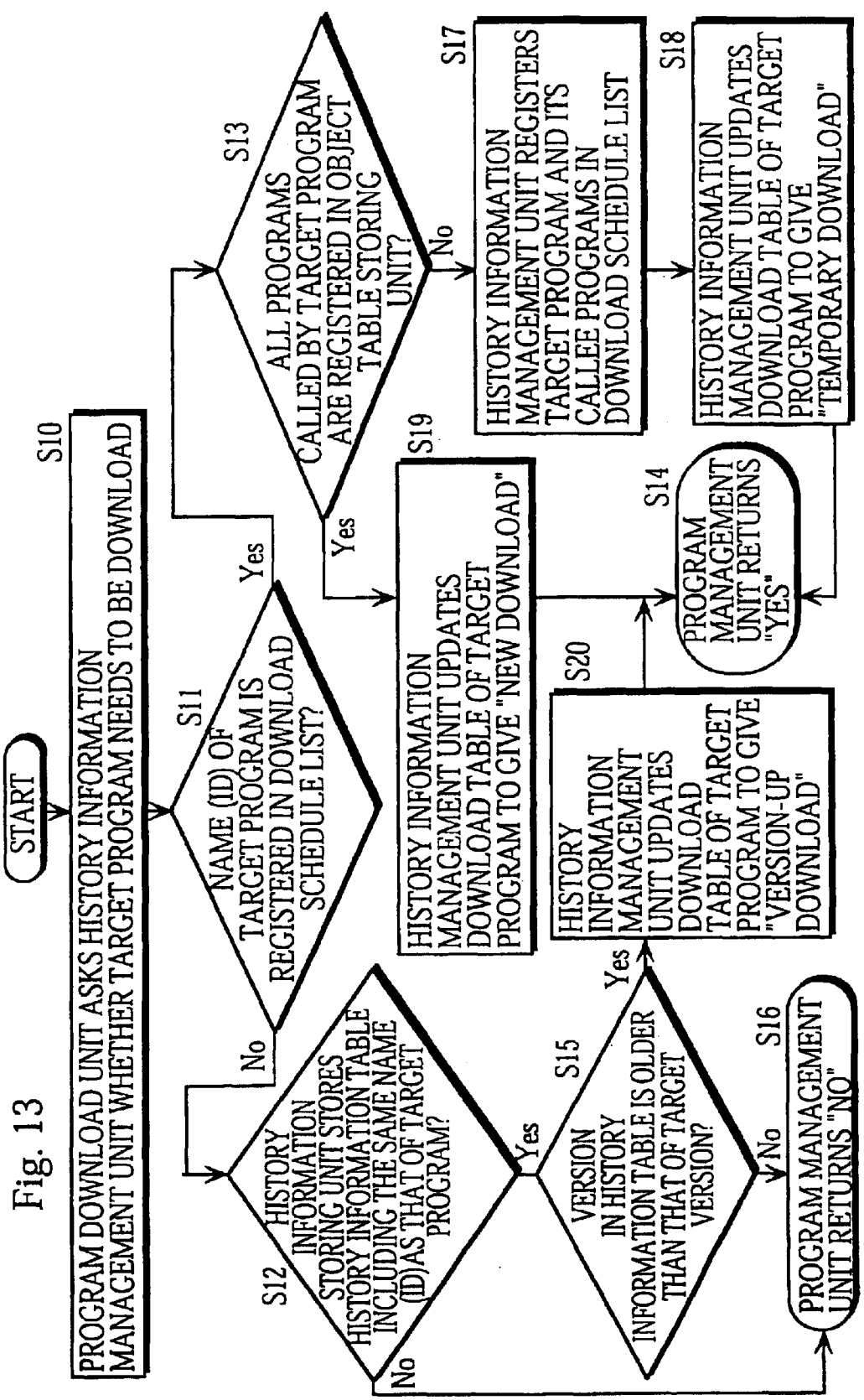
FIG. 13 is a flowchart showing the detailed procedure in step S4 shown in FIG. 11.

FIG. 13 is a flowchart showing the detailed operation performed in step S4 in FIG. 11. In this step, it is determined whether the target program needs to be downloaded. If the target program needs to be downloaded, it is also determined how the target program should be downloaded, that is, the mode (manner) of downloading the target program is determined.

There are four modes of downloading programs ("standby", "temporary download", "new download", and "version-up download") and the program configuration management apparatus 100 is placed in one of these modes. In the standby mode, the program download unit 110 is not currently downloading a program and waits for any program to be sent from the broadcast center. In the temporary download mode, the program download unit 110 downloads a program that may become executable afterward even though the program will not be executable at first because not all callee programs called by the downloaded program are present in the receiving apparatus 510. In the new download mode, the program download unit 110 downloads an executable program having a name that did not exist in the receiving apparatus 510 previously. In the version-up download mode, the program download unit 110 downloads a new version of a program that the program configuration management apparatus 100 is not programmed to download but is executable because a version having the same name as the new version is present in the receiving apparatus 510.

First, the program download unit 110 asks the program management unit 120 whether the target program needs to be downloaded and the program management unit 120 transfers the inquiry to the history information management unit 130 (step S10). The history information management unit 130 then checks whether the program name (ID) 10b stored in the temporary storing buffer 180 is also stored in the download schedule list storing unit 170 (step S11).

If the check result in step S11 is affirmative, the history information management unit 130 informs the program management unit 120 and the program management unit 120 checks whether all callee programs called by the target program are registered in the object table storing unit 150 (step S13).

If all callee programs are registered in the object table storing unit 150, the history information management unit 130 judges that the target program is executable and sets mode information 31 in a download table 30 shown in FIG. 12C as "new download" (step S19). At the same time, the program management unit 120 informs the program download unit 110 that it is possible to download the target program (step S14). Here, if it is possible to download the target program, the program management unit 120 sends a "Yes" signal to the program download unit 110; if not, the program management unit 120 sends a "No" signal to the program download unit 110.

On the other hand, if the program management unit 120 judges that not all callee programs called by the target program are registered in the object table storing unit 150 (step S13), the history information management unit 130 generates download schedule tables for the target program and programs. that are called by the target program but are not registered in the object table storing unit 150, before storing the generated download schedule tables in the download schedule list storing unit 170 (step S17). The history information management unit 130 then sets the download mode information 31 of the download table 30 as "temporary download" (step S18). At the same time, the program management unit 120 outputs a Yes signal to the program download unit 110 (step S14) because even if not all callee programs called by the target program are registered in the object table storing unit 150, the target program may become executable due to programs that have already been stored in the temporary storing buffer 180 or due to programs to be downloaded afterward.

If the program name (ID) of the target program is not stored in the download schedule list storing unit 170, the history information management unit 130 judges whether the target program may be downloaded in the "version-up download" mode (steps S12–S13). More specifically, the history information management unit 130 checks whether the history information storing unit 160 stores a history information table including the same program (or data) name (ID) 161a as the program (or data) name (ID) 10b stored in the temporary storing buffer 180 (step S12). If the check result in step S12 is affirmative, the history information storing unit 160 compares the version 10c of the target program with the version 161b in the history information table including the same program (or data) name (ID) 161a (step S15).

If the version 10c is more recent than the version 161b (step S15), the history information management unit 130 determines that the target program corresponds to the "version-up download" and sets the mode information in the download table 30 as "version-up download" (step S20). At the same time, the program management unit 120 sends a Yes signal to the program download unit 110 (step S14).

On the other hand, if the version 10c is the same as or earlier than the version 161b (step S15), the history information management unit 130 determines that it is unnecessary to download the target program because a more recent version is present in the receiving apparatus 510. The history information management unit 130 then informs the program download unit 110 of this via the program management unit 120 (step S16).

If the program name (ID) of the target program is not stored in the history information storing unit 160 (step S12), the history information management unit 130 judges that it is unnecessary to download the target program and informs the program download unit 110 via the program management unit 120 (step S16). This is because if the program name (ID) of the target program is not registered in the schedule list 171–173 and the history information 161–163, the target program is not intended for the receiving apparatus 510 (is not a version-up program).

Note that the mode information of the download table 30 is initially set as "standby".

Figure 14:
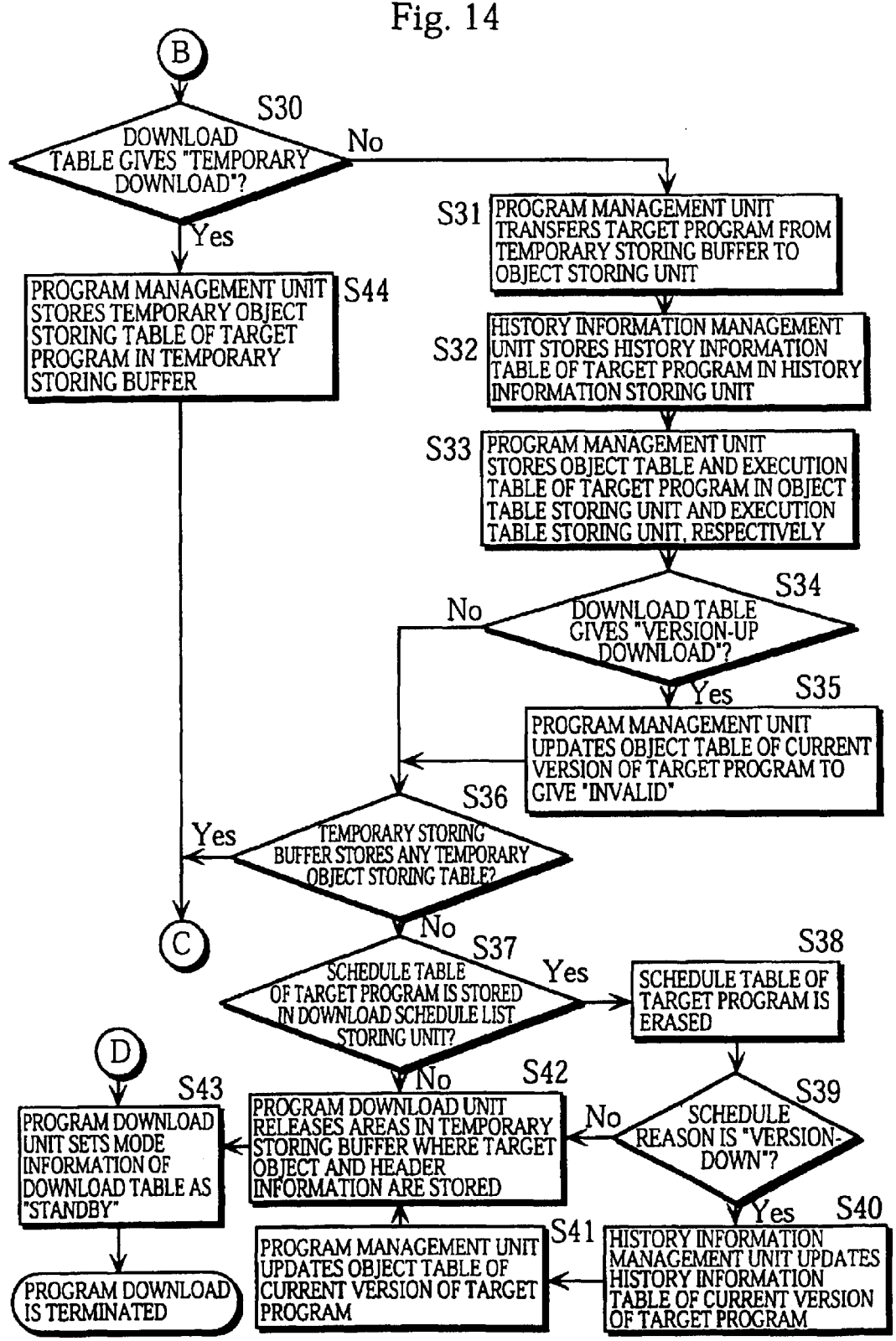
FIG. 14 is a flowchart showing the detailed operation in the second process in the overall procedure shown in FIG. 10.

FIG. 14 is a flowchart showing the detailed operation for transferring a program expanded in the temporary storing buffer 180 to the object storing unit 140.

The program management unit 120 judges whether a program that is newly expanded in the temporary storing buffer 180 corresponds to the "temporary download" mode or not (corresponds to the "new download" or "version-up download" mode) (step S30).

If the newly expanded program corresponds to the "temporary download" mode, the target program cannot be transferred to the object storing unit 140 at the present moment. Therefore, the program management unit 120 generates a temporary object storing table 40 (shown in FIG. 12D) for the target program and stores the generated table in the temporary storing buffer 180 (step S44). Then the processing proceeds to the third process where another program whose temporary object storing table 40 is stored in the temporary storing buffer 180 is processed (step C).

It should also be noted here that each temporary object storing table 40 corresponds to one object temporarily stored in the temporary storing buffer 180 and is a collection of information (data items 10a–10g) that uniquely specifies the corresponding object. When the temporary object storing table 40 is generated, the header information 10a–10g of the target program 20 is copied to the data items 40a–40g of the temporary object storing table 40. Also, a start address of the area in the temporary storing buffer 180 where the target program is stored is written in the start address 40h by the program download unit 110 (step S6). program is stored is written into the start address 40h by the program download unit 110 (step S6).

On the other hand, if the newly expanded program does not correspond to the "temporary download" mode (corresponds to the "new download" or "version-up download" mode) (step S30), the program management unit 120 judges that the target program is an executable program and transfers the target program expanded in the temporary storing buffer 180 to the object storing unit 140 (step S31). The history information management unit 130 then generates a history information table for the target program and stores the generated table in the history information storing unit 160 (step S32). More specifically, the history information management unit 130 writes new history information 161a–161g into the history information storing unit 160. In this history information table, the program state 161c is set as "valid", the invalidation reason 161d remains blank because there is no meaningful data, the program download date and time 161e is set as the date and time when the target program is downloaded, and the program invalidation date and time 161f remains blank because there is no meaningful data.

The program management unit 120 generates an object table and an execution table for the target program stored in the object storing unit 140 and stores the generated object table and execution table in the object table storing unit 150 and the execution table storing unit 190, respectively (step S33). More specifically, the program management unit 120 generates a new object table by referring to the object header 10 stored in the temporary storing buffer 180 and stores the generated object table in the object table storing unit 150. At the same time, the program management unit 120 generates a new execution table 191a–c that is a subset of the object table and stores the generated execution table in the execution table storing unit 190. When doing so, the program management unit 120 sets each of the start addresses 151d and 191c to give the start address of the area in the object storing unit 140 where the target program is stored. Also, the program management unit 120 sets the validity descriptor 151f as "valid". In this manner, the target program that has been downloaded in the "new download" or "version-up download" mode is newly registered as an execution object.

The program management unit 120 then checks the mode information in the download table 30 (step S34) and, if it is set as "version-up download", invalidates the previous version of the target program (step S35). More specifically, the program management unit 120 specifies a previous version (having the same name as the target program) that is currently set as "valid" by referring to the object table storing unit 150 and changes the validity descriptor 151f corresponding to the specified version to "invalid". The history information management unit 130 then updates the history information table corresponding to the specified version by setting the invalidation reason 161d to show that the invalidation reason is (1) replacement with a new version and setting the program invalidation date and time 161f as the date and time when the specified version is invalidated (step S35).

The program management unit 120 then checks whether the temporary storing buffer 180 stores a temporary object storing table (step S36) and, if so, performs the third process (step C). This is because a program that is currently stored in the temporary storing buffer 180 may have become executable due to the download of the target program.

On the other hand, when there is no temporary object storing table (step S36), no object can be transferred from the temporary storing buffer 180 to the object storing unit 140. Therefore, the download process is terminated (steps S37–S43).

More specifically, the history information management unit 130 checks whether the. schedule table of the target program is stored in the download schedule list storing unit 170 (step S37) and, if so, erases the schedule table (step S38). During this operation, when the schedule reason 171d of the schedule table is set as "version-down" (step S39), the newer version that is currently set as valid is invalidated (steps S40 and S41). That is, the history information management unit 130 updates the history information table corresponding to the newer version by changing the program state 161c to "invalid", setting the program invalidation date and time 161f as the date and time when the newer version is invalidated, and setting the invalidation reason 161d to show that the invalidation reason is (2) notification from the broadcast center (step S40). The program management unit 120 then updates the object table corresponding to the newer version by changing the validity descriptor 151f to "invalid" (step S41).

After this operation in steps S40 and S41, or when the check result in step S37 or S39 is negative, the program download unit 110 restores the temporary storing buffer 180 to its original state by releasing the areas that are reserved in the temporary storing buffer 180 and are used to store the target object and the object header 10 (step S42) and setting the mode information of the download table 30 as "standby" (step S43). In this manner, the program download process is terminated.

Figure 15:
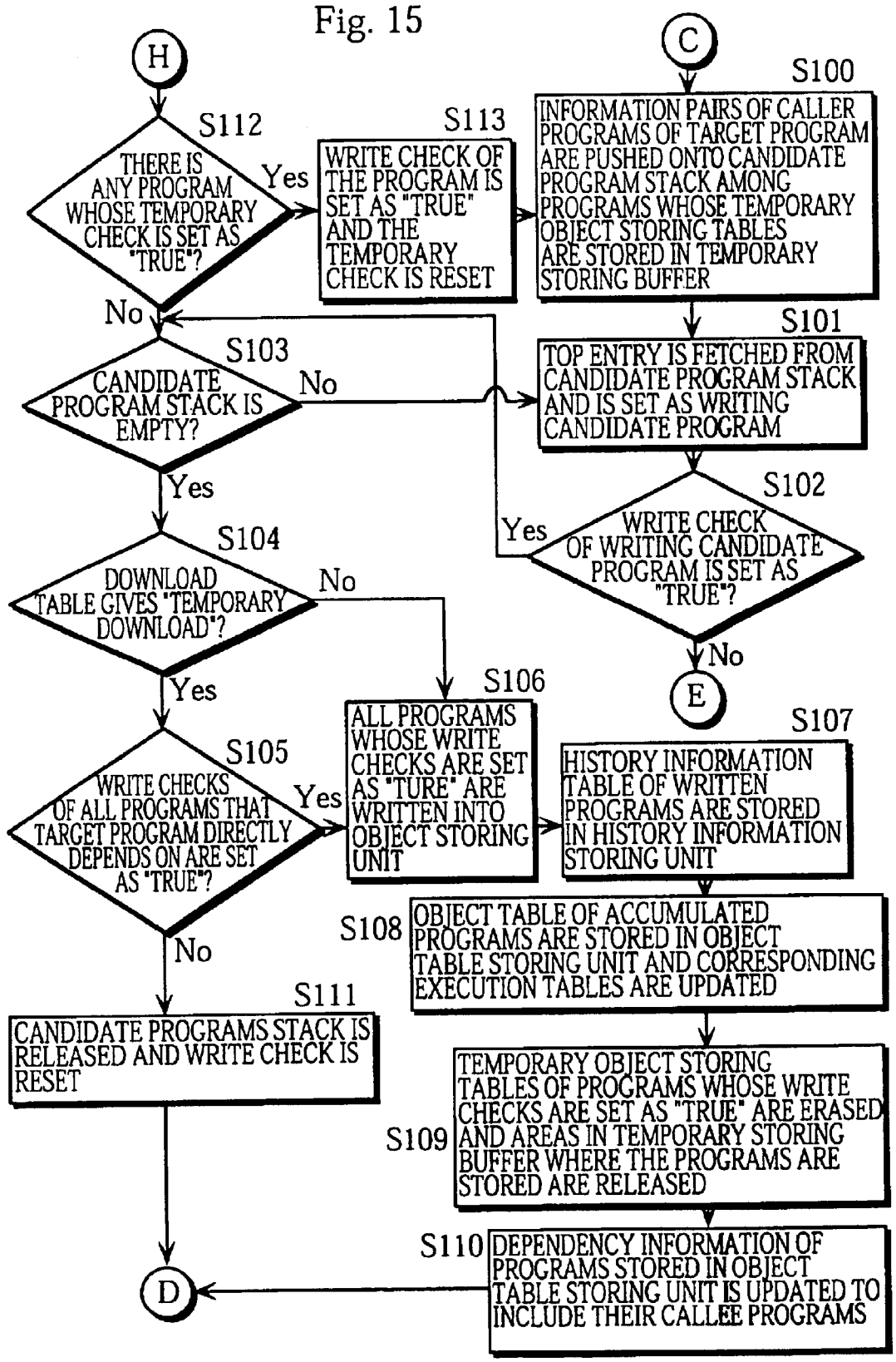
FIG. 15 is a flowchart showing the detailed operation in the third process in the overall procedure shown in FIG. 10.

FIG. 15 is a flowchart showing the detailed operation performed in the third process (steps S204–S205) in the flowchart shown in FIG. 10. That is, FIG. 15 shows the process where programs that have become executable due to the download of the target program are found out of the programs whose temporary object storing tables are stored in the temporary storing buffer 180 and transferred to the object storing unit 140.

The program management unit 120 pushes an information pair (a pair of the program name 40b and the version 40c) for each program, out of programs whose temporary object storing tables are stored in the temporary storing buffer 180, that calls the target program onto a candidate program stack 50 (step S100). This is because a program that is not currently executable due to the lack of its callee program (the target program) may become executable after the download of the target program. Here, the candidate program stack 50 is a memory area in stack form (Last In First Out), as shown in FIG. 12E, and is used to examine whether each program whose temporary object storing table is stored in the temporary storing buffer 180 becomes executable after the download of the target program.

The program management unit 120 then fetches the top entry (the information pair on the top of the candidate program stack 50) from the candidate program stack 50 as a writing candidate program 55 (step S101) and judges whether all callee programs called by the writing candidate program 55 are executable (step S102 to step E). Here, the writing candidate program 55 means a program whose qualification to be written into the object storing unit 140 is judged. That is, the writing candidate program 55 is a program whose executability is to be judged.

To judge whether all callee programs called by the writing candidate program 55 are executable, the program management unit 120 checks whether a "write check" 61 (shown in FIG. 12F) corresponding to the writing candidate program 55 is set as "true" or "false" (step S102). Here, the "write check" 61 is a flag that is provided for each program whose temporary object storing tables are stored in the temporary storing buffer 180. When the "write check" 61 is set as "true", the writing candidate program 55 is executable (writeable). On the other hand, when the "write check" 61 is set as "false", the executability of the writing candidate program 55 has not been checked and the program management unit 120 commences to check whether the writing candidate program 55 is executable (step E).

Figure 16:
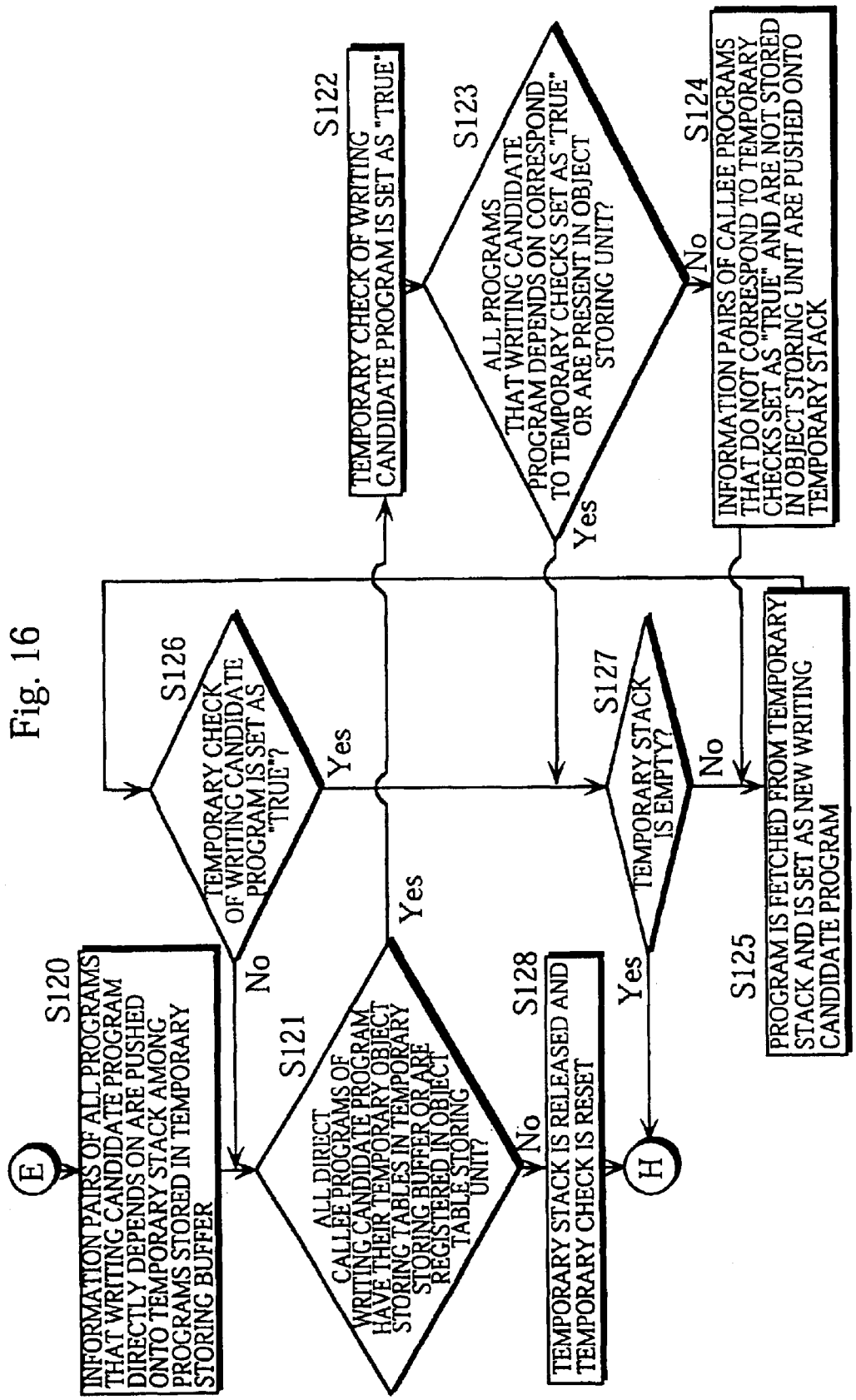
FIG. 16 is a flowchart showing the procedure for checking the executability of a writing candidate program.

FIG. 16 is a flowchart showing the procedure for checking whether the writing candidate program 55 is executable. That is, it is judged whether programs on all nesting levels that the writing candidate program 55 depends on are present in the receiving apparatus 510 (in the object storing unit 140 or the temporary storing buffer 180).

The program management unit 120 first pushes information pairs of all programs that the writing candidate program 55 directly depends on (programs that are directly beneath the writing candidate program 55) onto a temporary stack 70 (shown in FIG. 12G) reserved in the temporary storing buffer 180. When doing so, the program management unit 120 refers to the dependency information 40g of the temporary object storing table 40 corresponding to the writing candidate program 55 (step S120). Here, the temporary stack 70 is a memory area in stack form and is used to examine whether all programs that the writing candidate program 55 depends on are executable. Each program that the writing candidate program 55 directly depends on is hereinafter referred to as a "direct callee program".

The program management unit 120 then checks the executability of the writing candidate program 55 by judging whether all direct callee programs are present in the receiving apparatus 510 (in the temporary storing buffer 180 or the object storing unit 140) (step S121). More specifically, the program management unit 120 checks whether all callee programs registered in the dependency information 40g corresponding to the writing candidate program 55 have their temporary object storing tables in the temporary storing buffer 180 or are registered in the object table storing unit 150.

If all direct callee programs are present in the receiving apparatus 510, the program management unit 120 sets a "temporary check" 62 (shown in FIG. 12F) of the writing candidate program 55 as "true" (step S122). Here, the "temporary check" 62 is a flag that is provided for each program whose temporary object storing table is stored in the temporary storing buffer 180. When the "temporary check" 62 of a program is set as "true", all programs directly called by the program are present in the receiving apparatus 510. On the other hand, when the "temporary check" 62 of a program is set as "false", not all programs directly called by the program are present in the receiving apparatus 510. Because all direct callee programs of the writing candidate program. 55 are present in the receiving apparatus 510 when its "temporary check" is set as "true", the writing candidate program 55 may be executable. This is because the writing candidate program 55 will be executable if all of the callee programs are executable.

The program management unit 120 then checks whether all programs that the writing candidate program 55 depends on have temporary checks set as "true" or are present in the object storing unit 140 (step S123). More specifically, the program management unit 120 checks whether each callee program of the writing candidate program 55 corresponds to the "temporary check" set as "true" or has an object table in the object table storing unit 150. This is because if a callee program has a "temporary check" set as "true", the executability of the callee program can be judged by checking the "temporary checks" of programs on all nesting levels that the callee program depends on. Naturally, any callee programs stored in the object storing unit 140 are definitely executable.

If all callee programs correspond to the temporary check set as "true" or are stored in the object storing unit 140, the program management unit 120 checks the executability of the callee programs by examining the executability of programs whose information pairs are pushed onto the temporary stack 70 one by one (steps S127, S125, and S126).

On the other hand, when any callee program has a temporary check not set as "true" and is not stored in the object storing unit 140 (step S123), the program management unit 120 pushes information pairs of such callee programs onto the temporary stack 70 (step S124). The program management unit 120 then checks the executabilities of such callee programs (steps S125–S127) because it may be possible to change the temporary checks of the callee programs to "true".

The program management unit 120 reads each callee program whose information pair has been pushed onto the temporary stack 70 and sets the read program as a new writing candidate program until the temporary stack 70 becomes empty (steps S125–S127). The program management unit 120 then repeats the same process as that performed to check the executability of the first writing candidate program 55 for respective new writing candidate programs (steps S121–S127). When the temporary stack 70 becomes empty, the executabilities of all programs (on any nesting levels) that the first writing candidate program 55 depends on will have been checked, so the program management unit 120 terminates this executability check process (step H).

When not all programs that the first writing candidate program depends on are present in the receiving apparatus (step S121), the program management unit 120 concludes that the first writing candidate program 55 is not executable. Therefore, the program management unit 120 releases the temporary stack 70, resets the temporary checks that have been set as "true" to "false" (step S128), and terminates the executability check process (step H). This is because the first writing candidate program will not be executable if one or more programs that the first writing candidate program depends on are not present in the receiving apparatus 510.

After checking the executability of the writing candidate program 55 whose information pair has been popped from the candidate program stack 50 in this manner (step H), the program management unit 120 judges whether there is any program whose temporary check 62 is set as "true" (step S112). Since a program whose temporary check 62 is set as "true" will definitely be executable, the program management unit 120 sets the corresponding write check 61 as "true" and resets the temporary check 62 to "false" (step S113). The program management unit 120 repeats this executability check process for each program whose information pair has been pushed onto the candidate program stack 50 until this stack 50 becomes empty (steps S101–S103 and S120–S128).

When all programs pushed onto the candidate program stack 50 are processed (step S103), the executabilities of all programs stored in the temporary storing buffer 180 that may become executable due to the download of the target program will have been examined. Therefore, the program management unit 120 finally checks whether the target program that has been downloaded in the "temporary download" mode and is stored in the temporary storing buffer 180 can be written into the object storing unit 140 (steps S104 and S105).

More specifically, the program management unit 120 judges whether the target program was downloaded in the "temporary download" mode by referring to the download table 30 (step S104). If the target program was downloaded in the "temporary download" mode, the program management unit 120 then checks whether the write checks of all programs that the target program directly depends on and are not stored in the object storing unit 140 are set as "true" (step S105). In this manner, the program management unit 120 checks whether all programs that the target program depends on are stored in the object storing unit 140, that is, whether all such programs are executable.

When the check result in step S105 is negative, the target program cannot be stored in the object storing unit 140. Therefore, the program management unit 120 releases the candidate program stack 50, resets the write checks to "false" (step Sill), and terminate the download process (steps D–S43).

On the other hand, when the target program was not downloaded in the "temporary download" mode (step S104) or, when even if the target program was downloaded in the "temporary download" mode, all programs that the target program depends on are stored in the object storing unit 140 or corresponds to the write checks set as "true" (step S105), the program management unit 120 transfers the programs whose write checks are set as "true" from the temporary storing buffer 180 to the object storing unit 140 and updates the related tables accordingly (steps S106–S110).

More specifically, the program management unit 120 accumulates all programs whose write checks are set as "true" in the object storing unit 140 (step S106). The history information management unit 130 then generates history information tables for the accumulated programs and stores the generated tables in the history information storing unit 160 to incorporate the program accumulation into the information in the history information storing unit 160 (step S107). The history information management unit 130 generates a history information table for each of the accumulated programs by copying the information of the corresponding temporary object storing table 40 into the program name (ID) 161*a*, the version 161*b*, and the program creation date and time 161*g*, setting the program state 161*c* as "valid", writing no value in the invalidation reason 161*d* and the program invalidation date and time 161*f*, and setting the program download date and time 161*e* to give the date and time when the accumulated program is downloaded.

In the same way, the program management unit 120 generates object tables for the accumulated programs stores the generated tables in the object table storing unit 150, and updates the corresponding execution tables accordingly to incorporate the program accumulation into the information in the object. table storing unit 150 and the execution table storing unit 190 (step S108). When generating an object table for each of the accumulated programs, the program management unit 120 copies the information of the temporary object storing table 40 into the program name (ID) 151*a*, the version 151*b*, the size 151*c*, the object type 151*e*, and the dependency information 151*g*, sets the start address 151*d* to give the start address of an area in the object storing unit 140 where the program management unit 120 wrote the program in step S106, and sets the validity descriptor 151*f* as "valid". In this manner, the functions of the receiving apparatus 510 can be immediately updated by the download of the target program. The program management unit 120 then generates execution tables for the accumulated programs and stores the generated tables in the execution table storing unit 190.

After this operation, the program management unit 120 releases all temporary object storing tables corresponding to the programs whose write checks are set as "true" and all areas in the temporary storing buffer 180 where the programs are stored (step S109). The program management unit 120 then updates the dependency information 151*g* of the object tables of programs that are called by the accumulated programs by adding the accumulated programs to the caller program information (step S110). Then the download process is terminated (steps D–S43).

In this manner, the program configuration management apparatus 100 downloads the new version sent from the broadcast center into the receiving apparatus 510, checks the executability of the new version, replaces the previous version with the new version when the new version is executable, and upgrades other related programs from previous versions to later versions that become executable due to the downloaded new version. The program configuration management apparatus 100 does not discard the previous versions and instead keeps them in the receiving apparatus 510, as well as incorporates the change in configuration of executable programs in the receiving apparatus 510 into history information tables.

Figure 17:
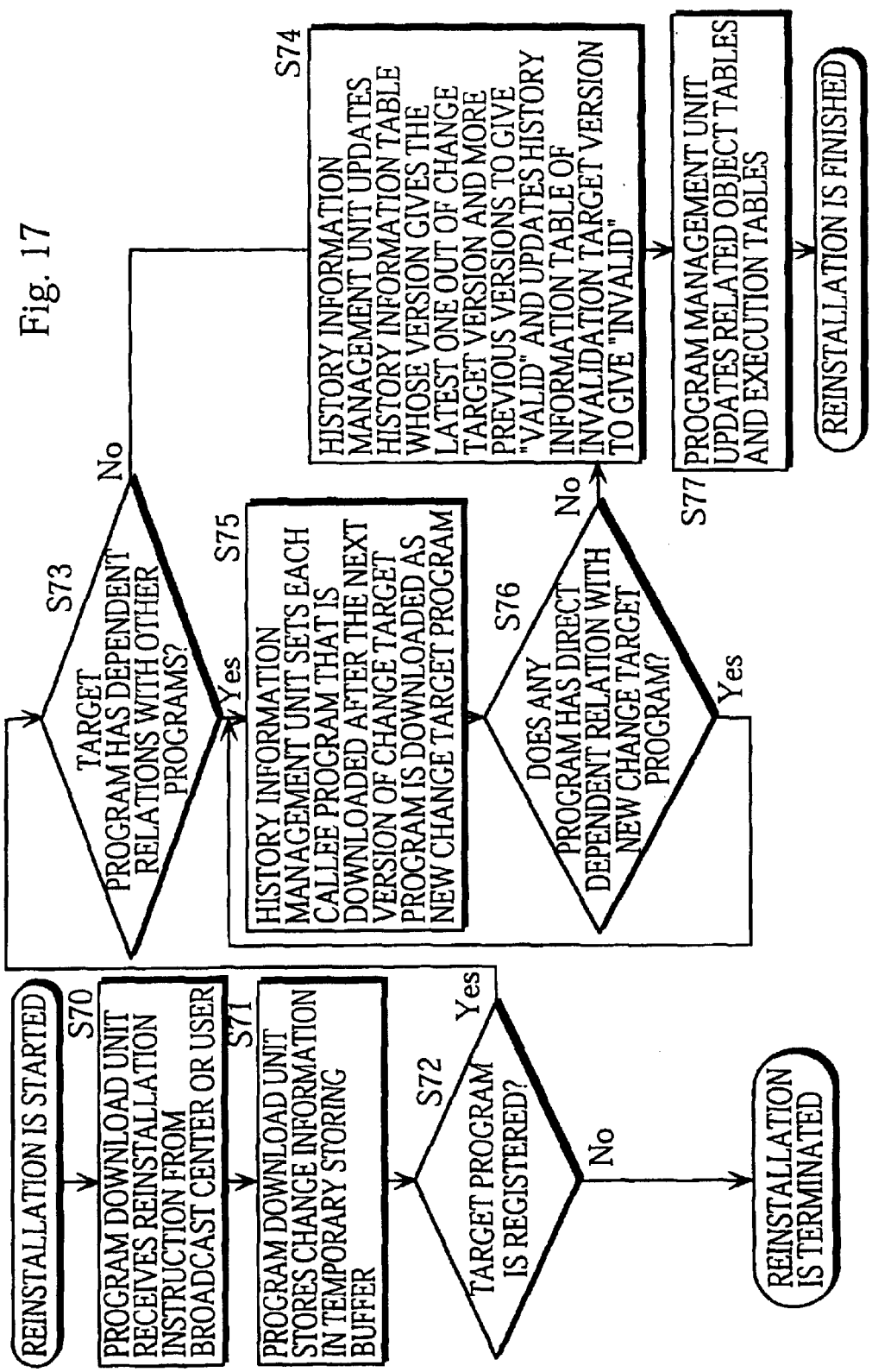
FIG. 17 is a flowchart showing the procedure where the program configuration management apparatus of the first embodiment reinstalls a previous version of a program.

FIG. 17 is a flowchart showing the procedure where the program configuration management apparatus 100 reinstalls a reliable previous version by referring to the history information tables when the current version causes problems for the receiving apparatus 510.

Figure 18:
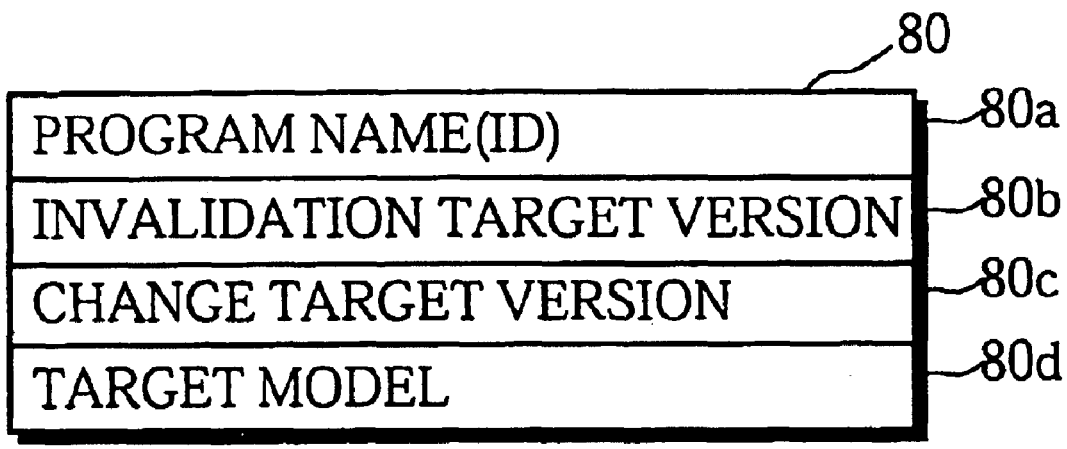
FIG. 18 shows the data structure of change information given to a receiving apparatus along with a reinstallation instruction.

First, the program download unit 110 receives an instruction for reinstalling a previous version (such an instruction is hereinafter referred to as a "reinstallation instruction") from the broadcast center or from the user via the I/O unit 515 (step S70). FIG. 18 shows change information 80 given by the reinstallation instruction. As shown in this drawing, the change information 80 includes a program name (ID) 80*a*, invalidation target version 80*b*, a change target version 80*c*, and a target model 80*d*. Here, the target model 80*d* makes sense only when the reinstallation instruction is sent from the broadcast center. It should be noted here that in the following description where the program reinstallation is explained, any version having the program name (ID) 80*a* is referred to as a target program.

The invalidation target version 80*b* is a version that should be invalidated among the target programs. The change target version 80*c* gives the latest version among target programs that can be reinstalled, that is, the most recent version whose executability has been confirmed among target programs. This means that the target program can be made to operate normally by changing the version executed by the receiving apparatus 510 from the invalidation target version 80*b* to the change target version 80*c* or an older version.

When receiving a program change instruction (step S70), the program download unit 110 also receives the change information 80 sent with the instruction and expands the change information in the temporary storing buffer 180 (step S71). The program management unit 120 then checks whether the validity information target version 80b is stored in the object table storing unit 150 and, if so, the program management unit 120 also checks whether the validity information 151f of the object table is set as "valid" (step S72).

If the object table is not stored in the object table storing unit 150 or the validity information 151f of the object table is set as "invalid", it is not necessary to invalidate the invalidation target version 80b. Therefore, the program management unit 120 terminates the program reinstallation operation. When the object table is stored in the object table storing unit 150 and its validity information 151f is set as "invalid", the history information management unit 130 sets the invalidation reason 161d of the history information table of the invalidation target version 80b to show that the invalidation reason is (2) the instruction from the broadcast center (or the user).

When the object table of the invalidation target version 80b is stored in the object table storing unit 150 and its validity information 151f is set as "valid" (step S72), the program management unit 120 checks the dependent relation of the invalidation target version 80b (step S73). More specifically, the program management unit 120 checks whether at least one program is registered in the dependency information 151g of the invalidation target version 80b.

When no program is registered in the dependency information 151g, the history information management unit 130 updates related history information tables to reinstall the most recent, out of the change target version 80c and earlier versions, that is present in the receiving apparatus 510 (step S74). More specifically, the history information management unit 130 specifies a history information table whose version 161b gives the most recent, out of the change target version 80c and earlier versions, that is present in the receiving apparatus 510 (such a most recent version is hereinafter referred to as "a reinstallation target version"). The history information management unit 130 then updates the specified history information table by setting the program state 161c as "valid" and blanking out the invalidation reason 161d. The history information management unit 130 finally updates the history information table of the invalidation target version 80b by setting the program state 161c as "invalid", sets the invalidation reason 161d to show that the invalidation reason is (2) instruction from the broadcast center (or the user), and writes the date and time when the invalidation target version 80b is invalidated in the program invalidation date and time 161f.

On being informed of the reinstallation target version by the history information management unit 130, the program management unit 120 sets the validity descriptor 151f of an object table corresponding to the invalidation target version 80b as "invalid" and sets the validity descriptor 151f of an object table corresponding to the reinstallation target version as "valid". The program management unit 120 then updates the information in the execution table storing unit 190 by deleting the execution table of the invalidation target version 80b and adding the execution table of the reinstallation target version (step S77). In this manner, the invalidation target version 80b is replaced with the reinstallation target version that is definitely executable and is the same as the change target version 80c or an earlier version. At the same time, the change in the program configuration in the receiving apparatus 510 due to the program reinstallation is incorporated into related tables.

If there are programs having dependent relations with the target programs (step S73), the program management unit 120 also replaces such programs with previous versions whose executabilities are ensured, that is, previous versions that ran when and before the change target version 80c became valid (steps S75 and S76).

To do so, the history information management unit 130 specifies each program that has been downloaded after the change target version 80c was invalidated among programs that the invalidation target version directly depend on and sets the specified programs as change target programs. Here, the "change target program" means a program that should be replaced with a previous version due to the reinstallation of the target program designated by the broadcast center (or the user).

More specifically, the history information management unit 130 compares the download date and time 161e of each program included in the dependency information 151g of the invalidation target version with the program invalidation date and time 161f of the change target version 80c. The history information management unit 130 then extracts the change information 80 (the same as that of the target programs) of each program (change target program) whose download date and time 161e succeeds the program invalidation date and time 161f of the change target version. The history information management unit 130 temporarily holds the extracted change information 80. When extracting the change information 80 of each change target program, the history information management unit 130 writes the program name 151a and the version 151b of a program included in the dependency information 151g of the invalidation target version into the program name 80a and the invalidation target version 80b of the change target program. Also, the history information management unit 130 specifies a history information table whose download date and time 161e immediately precedes the program invalidation date and time 161f of the change target version among history information tables of programs having the same name as the change target program. The history information management unit 130 then writes the version 151b of the specified history information table into the change target version 80c of the change target program.

The history information management unit 130 then checks whether any program has the direct dependent relation with the program that is set as the change target program in step S75 (step S76) and, if so, determines whether such a program should be set as a new change target program (step S75). That is, the history information management unit 130 repeatedly finds all programs that have the dependent relations with a current change target program and have no guarantee of being executable once the current change target program has been reinstalled and sets the found programs as new change target programs.

After programs on all nesting levels that have dependent relations with the target programs are processed in this manner (step S76), the history information management unit 130 updates tables related to all programs set as change target programs in step S75 in the same way as the reinstallation of target programs (steps S74 and S77). That is, to successively replace the invalidation target version 80b of each change target program with its change target version 80c, the history information management unit 130 updates the related history information tables (step S74) and the program management unit 120 updates related object tables and execution tables (step S77). By doing so, even if the invalidation target version 80b has a dependent relation with other programs, the invalidation target version and programs on all nesting level that have dependent relations with the invalidation target version are replaced with previous versions whose executabilities are ensured. As a result, the program configuration management apparatus 100 avoids problems caused by incompatibility between versions that would occur if only the invalidation target version of the target program were replaced with its change target version.

Figure 19:
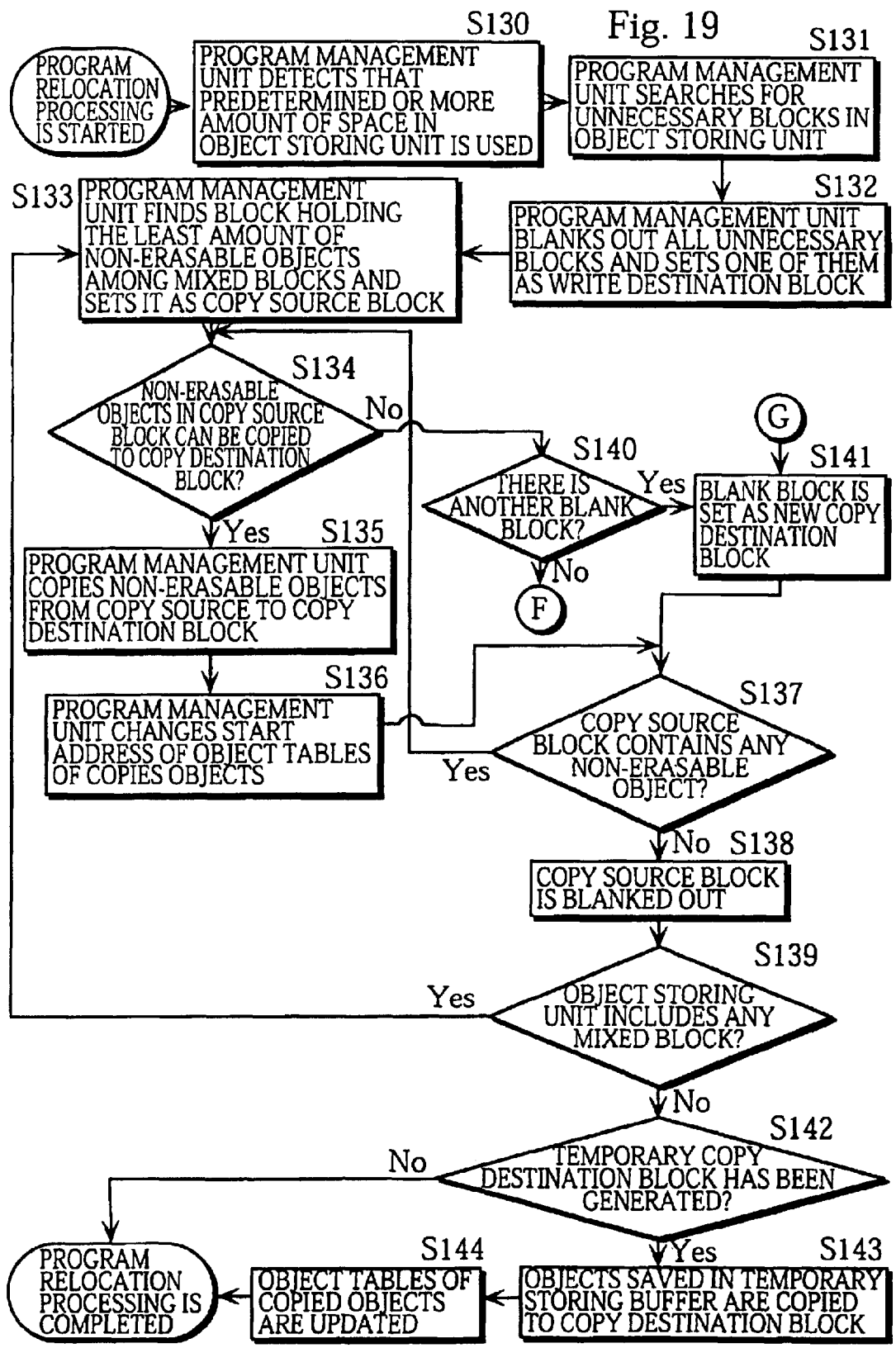
FIG. 19 is a flowchart showing the procedure where the program configuration management apparatus of the first embodiment performs a program relocation process.

FIG. 19 is a flowchart showing the procedure where the program configuration management apparatus 100 performs a program relocation process. Here, the "program relocation process" means a process for making more space available in the object storing unit 140 by erasing unwanted programs from the object storing unit 140 when there is not enough available space in the object storing unit 140.

When detecting that a predetermined amount or more of space in the object storing unit 140 is used (step S130), the program management unit 120 determines that the program relocation process is necessary and searches via the history information management unit 130 for programs whose program states 161c in the history information storing unit 160 are set as "erasable" (step S131).

The following is a description of the procedure where the program states 161c of programs are set as "erasable". Here, when the executability of a version is completely ensured, the broadcast center sends to the receiving apparatus 510 an erase signal showing that the previous versions are erasable. On receiving this erase signal, the receiving apparatus 510 checks whether the version whose executability is completely ensured is present in the receiving apparatus 510 and, if so, sets the program states 161c of the previous versions as "erasable". It should be noted here that in the following description, each program whose program state 161c in the history information storing unit 160 is set as "erasable" is referred to as an "erasable program". Also, each program whose program state 161c in the history information storing unit 160 is not set as "erasable" is referred to as a "non-erasable program".

After finding erasable programs, the program management unit 120 judges whether any block in the object storing unit 140 only includes erasable programs by referring to object tables. Here, a "block" is an area in the object storing unit 140 having a predetermined size, with all in a block being erased in a single operation. That is, the program management unit 120 erases objects stored in the object storing unit 140 in block units. Each block that only includes erasable programs is hereinafter referred to as an "unnecessary block".

The program management unit 120 blanks out all unnecessary blocks in the object storing unit 140 and sets one of the blank blocks as a write destination block (step S132). On the other hand, when no unnecessary block is present in the object storing unit 140, the program management unit 120 sets a block into which a program was most recently written as a write destination block (step S132). The write destination block is used to eliminate (sort out) blocks in which erasable objects and non-erasable objects coexist (such a block is hereinafter referred to as "mixed blocks") from the object storing unit 140. That is, only non-erasable objects are fetched from mixed blocks and are transferred to the write destination block.

The program management unit 120 specifies all mixed blocks in the object storing unit 140 and repeatedly blanks out each specified block (steps S133–S139).

More specifically, the program management unit 120 first specifies all mixed blocks, finds a block that holds the least amount of non-erasable objects among the specified blocks, and sets the found block as a copy source block (step S133).

The program management unit 120 then judges whether non-erasable objects in the copy source block can be copied to a copy destination block (whether an enough space for storing the non-erasable objects remains in the copy destination block) (step S134). When the non-erasable objects can be copied to the copy destination block, the program management unit 120 copies the non-erasable objects to the copy destination block (step S135) and updates the object tables corresponding to the copied objects by changing the start addresses 151d of the corresponding object tables to give the start address of the copy destination block (step S136).

On the other hand, when the non-erasable objects cannot be copied to the copy destination block (step S134), the program management unit 120 checks whether there is another blank block (step S140) and, if so, sets the blank block as a new copy destination block (step S141).

On the other hand, when there is no other blank block (step S140), the program management unit 120 generates a temporary copy destination block (step F).

Figure 20:
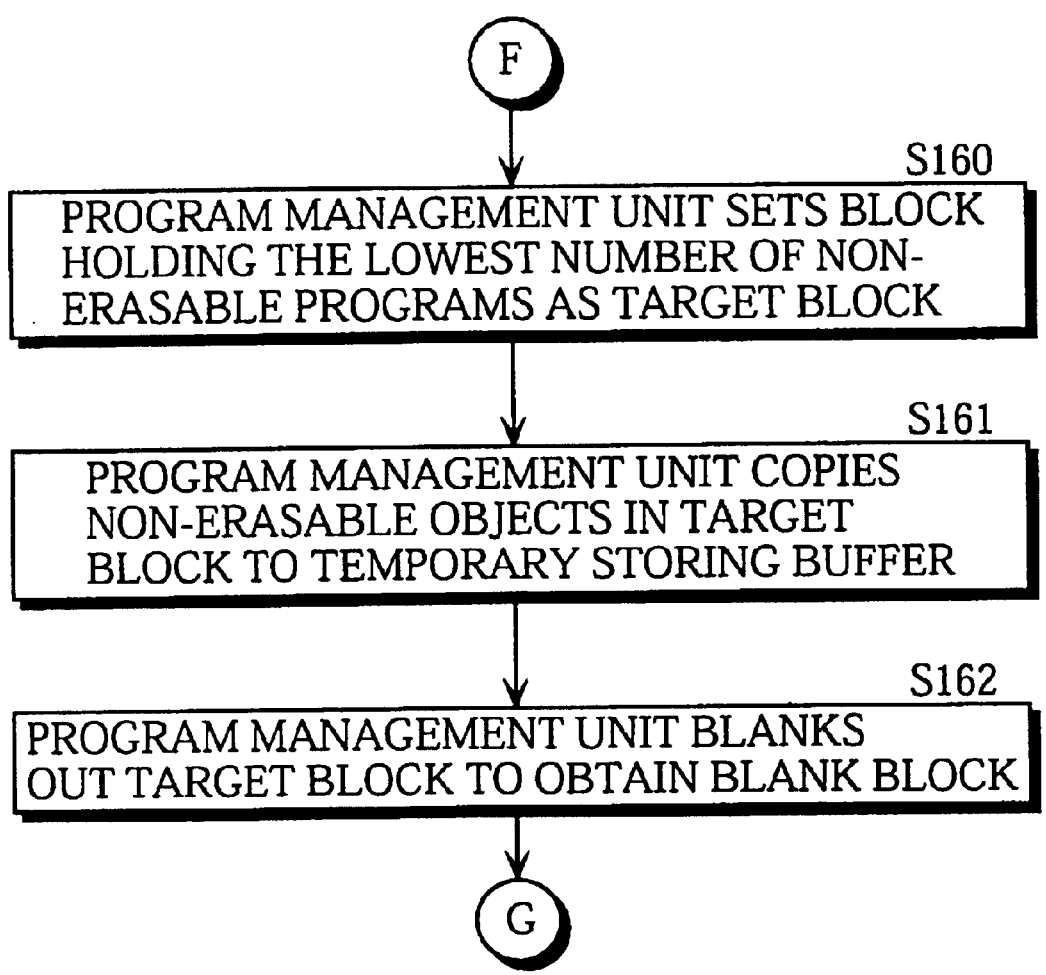
FIG. 20 is a flowchart showing the procedure for temporarily generating a blank block.

FIG. 20 is a flowchart showing the process for generating a temporary copy destination block.

The program management unit 120 first selects a block that holds the lowest number of non-erasable programs among blocks in the object storing unit 140 and sets the selected block as a target block (step S160). The program management unit 120 then saves each non-erasable object in the target block by copying the non-erasable object to the temporary storing buffer 180 and writes information for identifying the saved non-erasable object into the temporary storing buffer 180 (step S161). That is, the program management unit 120 writes the object name, the version (when the object is a program), the size, and the start address in the object table of the saved object into the temporary storing buffer 180. The program management unit 120 then blanks out the target block and sets this block as a temporary copy destination block (step S162).

In this manner, a temporary copy destination block is generated. Note that by reducing the threshold value that the program management unit 120 uses to judge whether the program relocation process needs to be performed in step S130, the frequency with which such a temporary copy destination block is generated decreases.

The program management unit 120 repeats this operation until the copy source block no longer contains a non-erasable object (steps S134–S137, S140, and S141). After all non-erasable objects in the copy source block are saved in the temporary storing buffer 180, the program management unit 120 blanks out the copy source block to generate a new blank block (step S138).

The program management unit 120 then repeats this operation for saving non-erasable objects in mixed blocks and blanking out the mixed blocks one by one (steps S134–S139, S140, and S141).

The program management unit 120 finally performs an operation for restoring objects that are temporarily saved in the temporary storing buffer 180 after blanking out all mixed blocks (steps S142–S144). The program management unit 120 judges whether a temporary copy destination block is generated (step S142) and, if not, terminates the program relocation process. On the other hand, if a temporary copy destination block is generated, the program management unit 120 copies objects, which were saved in the temporary storing buffer 180 when the temporary copy destination block is generated, to a copy destination block (or to another blank block when the free space in the copy destination block is not enough to restore all of the saved objects) (step S143). When the copied objects are programs, the program management unit 120 changes the start addresses 151d in the corresponding object tables to give the start addresses of the areas in the object storing unit 140 in which the objects are copied (step S144). In this manner, the program management unit 120 restores all objects that are temporarily saved in the temporary storing buffer 180 to blank blocks in the object storing unit 140 and terminates the program relocation process.

As described above, the program management unit 120 processes mixed blocks so that the mixed blocks contain only erasable objects. To do so, the program management unit 120 transfers (saves) non-erasable objects in the mixed blocks. Therefore, the program management unit 120 can blank out mixed blocks as well as blocks that only contain erasable objects in block units. As a result, blocks such as mixed blocks whose utilization ratios are low are eliminated from the object storing unit 140 and the storing area in the object storing unit 140 is used efficiently.

As described above, when the receiving apparatus 510 downloads programs sent from the broadcast center, the program configuration management apparatus 100 of the present embodiment does not overwrite earlier versions with the downloaded programs but accumulates all versions in the object storing unit 140 and keeps a history of downloads. As a result, an intended previous version can be easily reinstalled into the receiving apparatus 510. Because the program configuration management apparatus 100 records a download history, the program configuration management apparatus 100 can properly reinstall even an intended previous version of an application that includes a plurality of modules which depend on one another. That is, by referring to the download history, the program configuration management apparatus 100 can reinstall the intended previous version into the receiving apparatus 510, with the dependent relations between modules being properly maintained.

Also, the broadcast center can reinstall an intended previous version into the receiving apparatus 510 and erase specific versions stored in the receiving apparatus 510 by sending programs to the receiving apparatus 510, having the receiving apparatus 510 download the sent programs, and giving corresponding instructions to the receiving apparatus 510. This reduces the burden on the broadcast center because the broadcast center does not need to manage the program configuration and versions in the receiving apparatus 510 after sending programs.

<Second Embodiment>

The following is a description of a program configuration management apparatus 200 of the second embodiment for ensuring that the receiving apparatus 510 functions even after the download of programs. To do so, the program download unit 110 of the present program configuration management apparatus 200 performs a test execution of a program expanded in the temporary storing buffer 180 before transferring the expanded program to the object storing unit 140. The expanded program is written into the object storing unit 140 only when it has been confirmed that the expanded program will run properly.

FIG. 21 is a functional block diagram showing the construction of the program configuration management apparatus 200 of the second embodiment. The present program configuration management apparatus 200 differs from the program configuration management apparatus 100 of the first embodiment in that the present program configuration management apparatus 200 further includes a test conducting unit 220. However, the present program configuration management apparatus 200 is also built into the receiving apparatus 510.

The test conducting unit 220 is achieved by a program prestored in the EEPROM 518 and subjects the program expanded in the temporary storing buffer 180 to a test execution. To do so, the test conducting unit 220 has the following five functions.

(1) A function for executing a specified program by passing an specified argument to the program
(2) A function for reading the content of communication between designated programs
(3) A function for changing the content of communication between designated programs
(4) A function for reading a return value from a designated program
(5) A function for forcefully terminating the execution of a designated program Also, there are five differences given below between this embodiment and the first embodiment.

(1) The broadcast center sends a test case along with each application.
(2) The test case is written into the object storing unit 140 with the application.
(3) Information concerning the test execution is added to the history information storing unit 160.
(4) When a program is downloaded into the temporary storing buffer 180, a test case is also stored in the temporary storing buffer 180.
(5) Test case information is added to the temporary object storing table 40.

The following description concerns the differences described above.

Difference (1)

In this embodiment, the broadcast center also sends a test case that is information specifying a test condition for a target program and pass/fail evaluation criteria for the test execution. The test case gives (i) an argument passed to the target program, (ii) a return value that should be returned by the target program when the argument is passed, and (iii) time necessary to perform the test execution. The test conducting unit 220 performs the test execution by passing the argument specified by the test case to the target program and executing the target program.

Figure 22A:
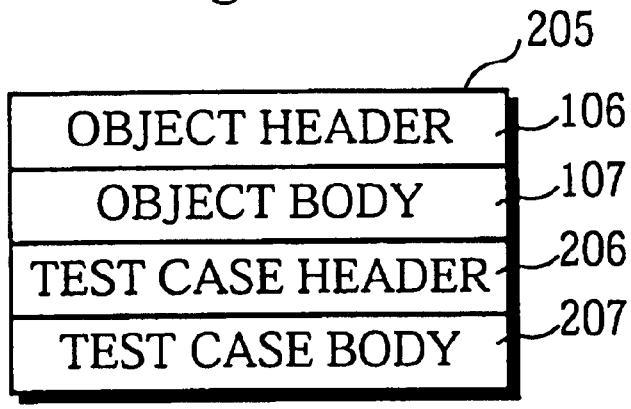
FIG. 22A shows the data structure of information sent from the broadcast center to update a program.
Figure 22B:
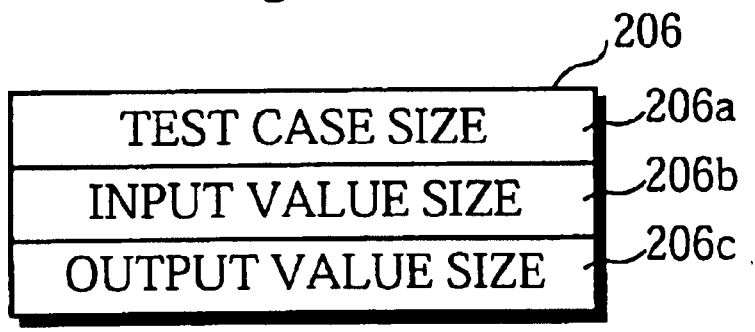
FIG. 22B shows the data structure of a test case header sent from the broadcast center to update the program.
Figure 22C:
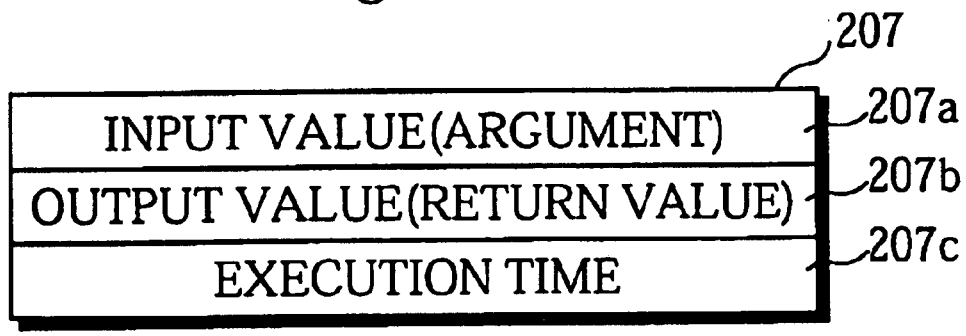
FIG. 22C shows the data structure of a test case body sent from the broadcast center to update the program.

FIG. 22A shows the information that is sent from the broadcast center to update a program. As can be seen by comparing this drawing with FIG. 2A, the sent information includes a test case header 206 and a test case body 207 as well as the object header 106 and the object body 107. As shown in FIG. 22B, the test case header 206 includes a test case size 206a, an input value size 206b, and an output value size 206c. The test case size 206a shows the size of the entire test case body 207 in bytes. The input value size 206b shows the size in bytes of an argument passed to the target program for the test execution. The output value size 206c shows the size in bytes of a return value that should be returned by the target program. As shown in FIG. 22C, the test case body 207 includes an argument 207a passed to the object (target program), a return value 207b that should be returned by the object, and an execution time 207c that should be taken by the test execution.

The execution time 207c gives not an absolute value but a relative value because the execution time varies according to the throughput of the receiving apparatus 510.

Difference (2)

When a module is downloaded and replaced with a previous module (version-up), it is necessary to undertake an overall test of the safety of the module by executing the module and applications that depend on the module. Therefore, in this embodiment, the object storing unit 140 stores test cases of applications as well as the program data of the applications. With this construction, the program configuration management apparatus 200 can properly handle the downloading of a new module that an application currently present in the receiving apparatus 510 depends on.

Difference (3)

When a test case is stored in the object storing unit 140, the receiving apparatus 510 needs to store information for managing the stored test case. Therefore, in this embodiment, the history information storing unit 160 also stores information related to test cases stored in the object storing unit 140. More specifically, the history information storing unit 160 stores three types of information, that is, an input value size, an output value size, and a test case address (such information is hereinafter referred to as "test case items"). Here, the input value size and the output value size in the history information storing unit 160 are respectively the same as the input value size 206*b* and the output value size 206*c* in FIG. 22B. The test case address gives the start address of the area in the object storing unit 140 where the test case is stored.

Also, in this embodiment, when a program has failed its test execution, information showing this failure is stored in the history information storing unit 160. More specifically, when a program has failed its test execution, the program state 161*c* of the corresponding history information table is set as "non-downloadable". With this construction, the program configuration management apparatus 200 avoids a situation where a program that has been found to be non-executable is downloaded again.

More specifically, when a program expanded in the temporary storing buffer 180 has failed its test execution, the history information management unit 130 adds a history information table corresponding to the failed program into the history information storing unit 160 and sets the program state 161*c* of the history information table as "non-downloadable". Then, in step S15 (shown in FIG. 13) where it is judged whether a target program should be downloaded, the history information management unit 130 finds a history information table corresponding to the target program and checks the program state 161*c* of the found history information table. When the program state 161*c* is set as "non-downloadable", the history information management unit 130 sends a No signal showing that the download of the target program is not allowed to the program management unit 120 (step S16). In this manner, a situation where a program that has already failed its test execution is unnecessarily downloaded can be avoided.

Difference (4) and (5)

In this embodiment, when a program is downloaded, the temporary storing buffer 180 holds the test case body 207 in addition to the program body 107. Therefore, when a caller program that calls the program are downloaded afterward, it is possible to perform an overall test of the program and the caller program.

To do so, it is necessary to store information for managing each test case body when the test case body is temporary stored. Therefore, the temporary object storing table also includes information concerning the test case, such as the input value size, the output value size, and the test case address. Here, the input value size and the output value size are respectively the same as the input value size 206*b* and the output value size 206*c* shown in FIG. 22B. The test case address gives the start address of the area in the temporary storing buffer 180 where the test case is stored.

Figure 23:
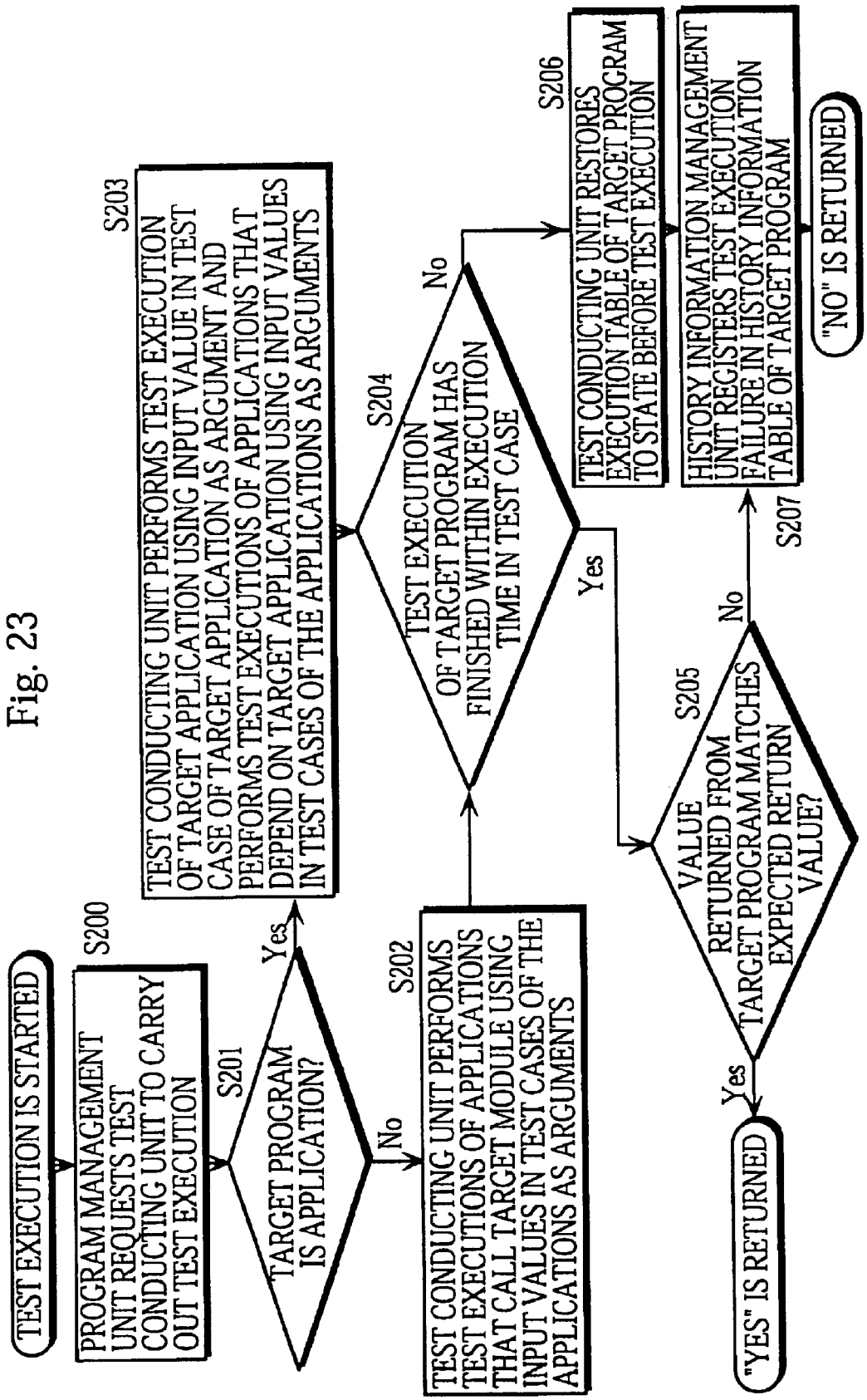
FIG. 23 is a flowchart showing the procedure where a test conducting unit performs a test execution on a target program expanded in the temporary storing buffer.

FIG. 23 is a flowchart showing the procedure where the test conducting unit 220 performs a test execution for a target program that is expanded in the temporary storing buffer 180 by the program download unit 110. Note that when the target program is subjected to a test execution, an execution table of the target program needs to be stored in the execution table storing unit 190. This is because the test execution is the same as an ordinary execution in that the CPU 516 of the receiving apparatus 510 executes a program by referring to the corresponding execution table. Therefore, before the test execution, the test conducting unit 220 adds an execution table of the target program to the execution table storing unit 190. The added execution table gives various information concerning the target program, such as the program name (ID), the size, and an address in the temporary storing buffer 180. If an execution table of the target program has already been stored in the execution table storing unit 190, the test execution unit 220 changes the start address in the execution table to show the start address of an area in the temporary storing buffer 180 where the target program is stored.

After this operation, the program management unit 120 requests the test conducting unit 220 to perform the test execution of the target program (step S200). On receiving this request, the test conducting unit 220 checks whether the target program is an application (step S201). If the target program is an application, the test conducting unit 220 subjects the target program to the test execution by setting the input value 207*a* of the test case stored in the temporary storing buffer 180 as an argument. The test conducting unit then subjects applications that are present in the receiving apparatus 510 and depend on the target program to test executions (step S203). The test executions of such applications are performed according to their test case items stored in the history information storing unit 160.

On the other hand, when the target program is not an application, that is, the target program is a module (step S201), the test conducting unit 220 subjects applications that call the module to test executions (step S202). Such test executions are performed according to the test case items of the applications stored in the history information storing unit 160. Here, among caller applications registered in the object header 106 expanded in the temporary storing buffer 180, test executions are performed on only caller applications that are present in the receiving apparatus 510.

After conducting the test execution in this manner (steps S202 and S203), the test conducting unit 220 checks whether the test execution of the target program has finished within the execution time 207*c* included in the test case (step S204). If the test execution has finished within the execution time 207*c*, the test conducting unit 220 compares the value returned by the target program with the return value 207*b* (step S205). If the value returned by the target program matches the return value 207*b*, the test conducting unit 220 judges that the test execution has successfully finished and sends a Yes signal showing this to the program management unit 120.

On the other hand, if the test execution took longer than the execution time 207*c* (step S204), or if the value returned by the target program does not match the return value 207*b* (step S205), the test conducting unit 220 judges that the test execution ended in failure and terminates the test execution process. The program management unit 120 then restores the execution table of the target program stored in the execution table storing unit 190 to the values of the corresponding object table in the object table storing unit 150 (step S206). The history information management unit 130 then adds a history information table of the target program to the history information storing unit 160, sets the program state 161c of the added history information table as "non-downloadable" (step S207), and sends a No signal showing that the test execution of the target program by the test conducting unit 220 ended in failure to the program management unit 120.

In this manner, the test conducting unit 220 subjects a target program expanded in the temporary storing buffer 180 to a test execution before the target program is written into the object storing unit 140.

Figure 24:
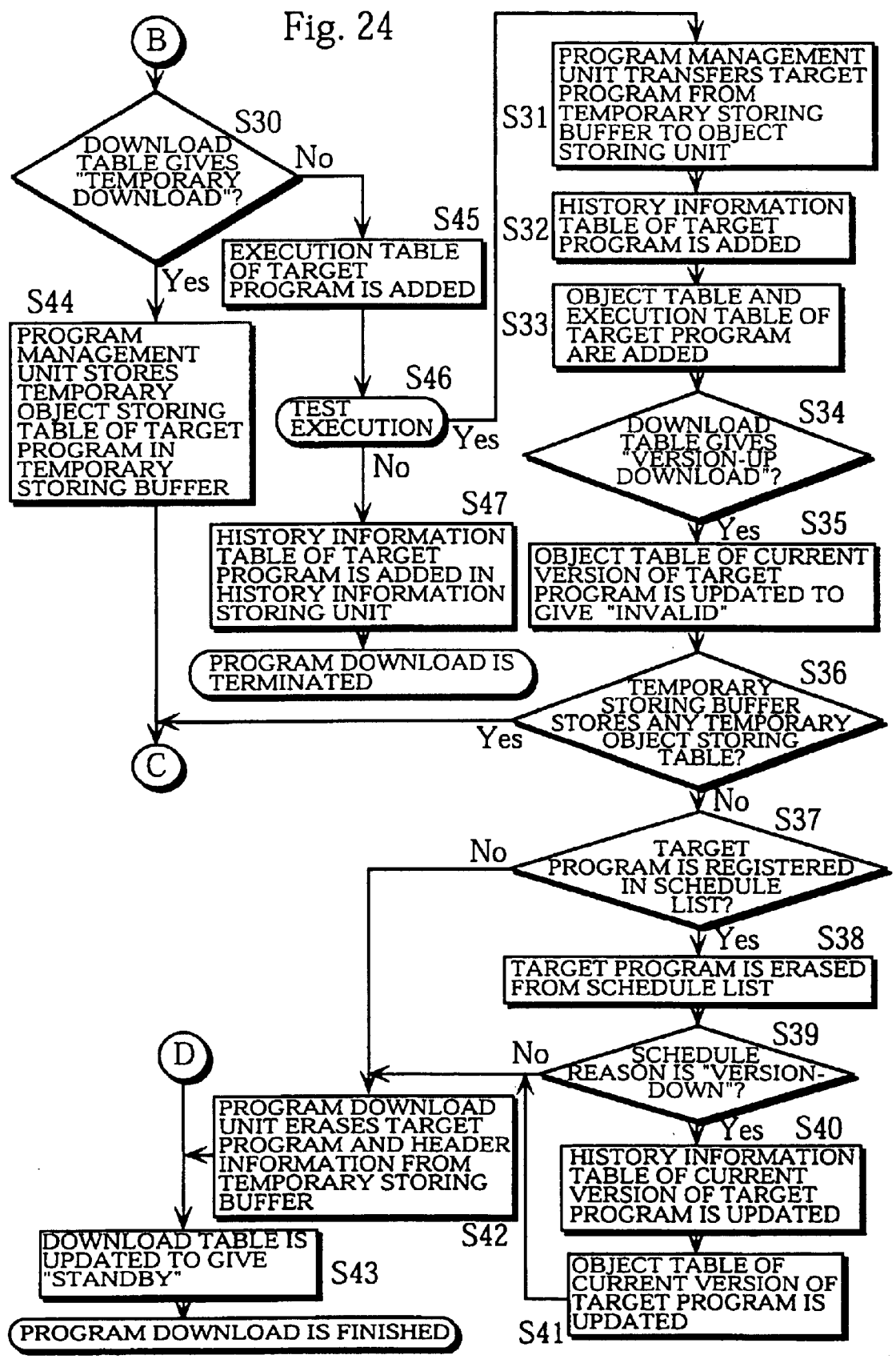
FIG. 24 is a flowchart showing a procedure in the second embodiment for transferring a program expanded in the temporary storing buffer to the object storing unit.

FIG. 24 is a flowchart showing the procedure for transferring the program expanded in the temporary storing buffer 180 to the object storing unit 140 in connection with a test execution. This flowchart is the same as that shown in FIG. 14 except for step S45–S47.

In the first embodiment, when the target program expanded in the temporary storing buffer 180 corresponds to the "new download" or "version-up download" mode, the target program is unconditionally transferred to the object storing unit 140 (step S31). However, in the present embodiment, the target program is subjected to a test execution before transferred to the object storing unit 140 (steps S45 and S46). More specifically, the program management unit 120 adds an execution table of the program (target program) expanded in the temporary storing buffer 180 (step S45). Then the test conducting unit 220 performs the test execution of the target program (step S46).

If the target program has passed its test execution, the program management unit 120 writes the target program into the object storing unit 140 (step S31) and updates information in the history information storing unit 160 and the object table storing unit 150 accordingly (steps S32 and S33). If the target program has failed the test execution, the program management unit 120 deletes the execution table of the target program from the execution table storing unit 190. At the same time, the history information management unit 130 stores a history information table of the target program in the history information storing unit 160 and sets the program state 161c of the history information table as "non-downloadable" (step S47). Then the process for downloading the target program is terminated.

Figure 25:
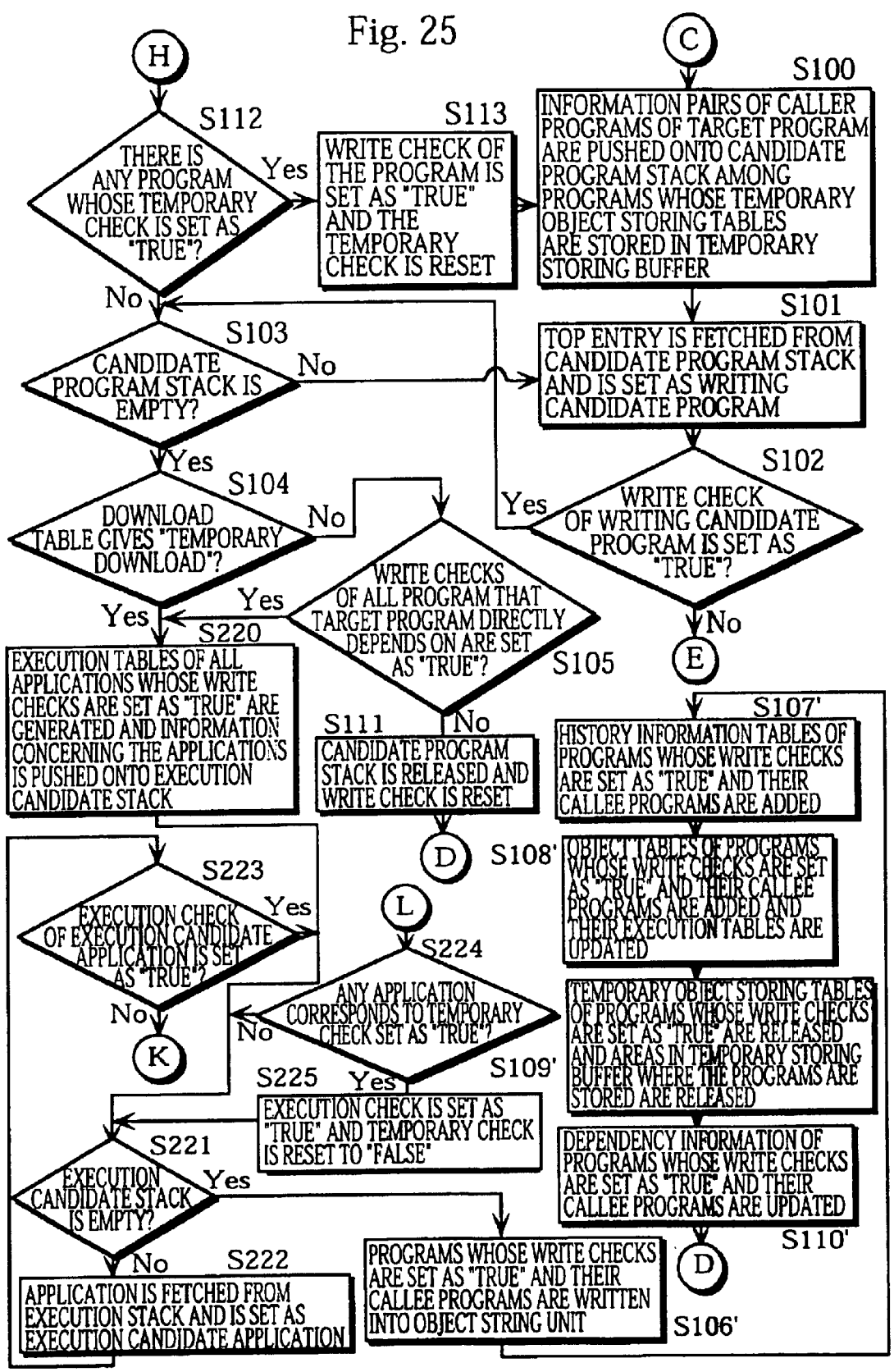
FIG. 25 is a flowchart showing the procedure for finding programs, out of programs stored in the temporary storing buffer, that have become executable due to the download of the target program and transferring the found programs to the object storing unit.

FIG. 25 is a flowchart showing the procedure for searching for programs that become executable due to the download of the target program among programs stored in the temporary storing buffer 180 and transferring the found programs to the object storing unit 140. This flowchart is the same as that in FIG. 15 except that test executions are carried out (steps S220–S225) immediately before programs whose write checks are set as "true" are written into the object storing unit 140 (step S106' that is equivalent to step S106 in FIG. 15). Note that programs that have passed the test executions are processed in substantially the same manner as the flowchart in FIG. 15 after the test executions (steps S106'–S110').

The program management unit 120 first pushes information concerning applications whose write checks are set as "true" onto an execution candidate stack reserved in the temporary storing buffer 180 (step S220). Here, the execution candidate stack has the same construction as the temporary stack 70 and the candidate program stack 50 of the first embodiment and is used to store program names and version information of applications whose write checks are set as "true".

The program management unit 120 then fetches information of each application from the execution candidate stack one by one and repeats the test execution for the applications until the execution candidate stack becomes empty (steps S221–S225). By doing so, the executabilities of applications whose write checks are set as "true" are checked. More specifically, if information of any application has been pushed onto the execution candidate stack 50 (step S221), the program management unit 120 sets the application as an execution candidate application (step S222) and judges whether the execution check of the execution candidate application is set as "true" (step S223). By doing so, the program management unit judges whether the execution candidate application is an application that is guaranteed to run properly (an application that has passed the test execution). Here, the execution check is a flag that is provided for each application whose temporary object storing table 40 is stored in the temporary storing buffer 180. If the execution check is set as "true", the corresponding application has passed its test execution; if "false", the corresponding application has failed the test execution.

If the executability of the execution candidate application has not been checked (step S223), the program management unit 120 subjects the execution candidate application to a test execution (step K). After this test execution (step L), the program management unit 120 checks whether the temporary check of the execution candidate application is set as "true" (step S224). If the temporary check is set as "true", the execution candidate application has passed the test execution. Therefore, the program management unit 120 sets the execution check of the execution candidate application as "true" and resets the temporary check to "false" (step S225).

On the other hand, when the temporary check is set as "false", the program management unit 120 leaves the execution check as "false" and the program management unit 120 commences the test execution for the next execution candidate application (step S221).

Figure 26:
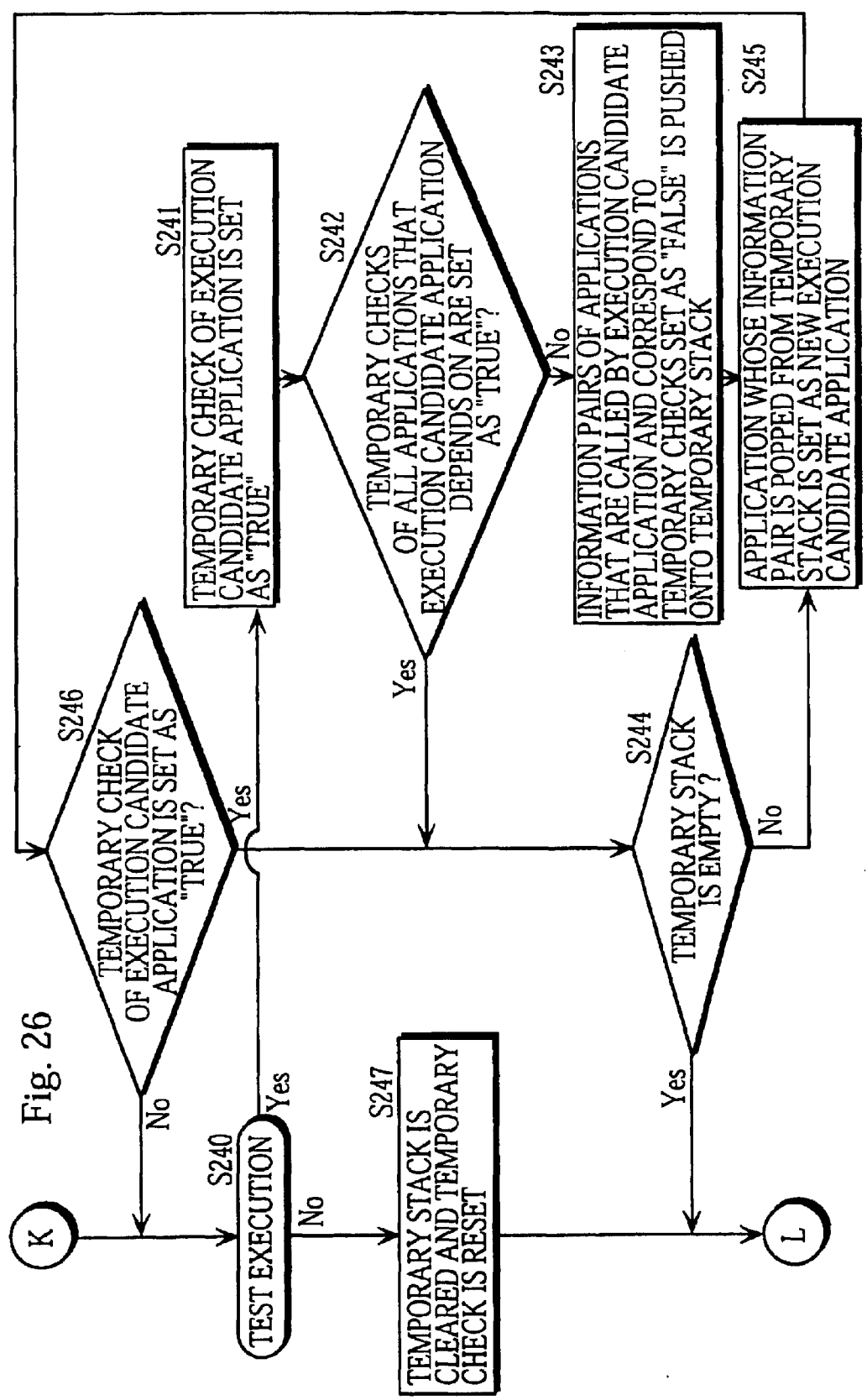
FIG. 26 is a flowchart showing the procedure for performing a test execution on an execution candidate application whose information is popped from an execution candidate stack.

FIG. 26 is a flowchart showing the procedure for performing a test execution on an execution candidate application whose information has been popped from the execution candidate stack (steps K–L). That is, this flowchart shows the procedure for checking whether an execution candidate application correctly functions in the receiving apparatus 510.

The test conducting unit 220 first performs a test execution on the execution candidate application indicated by the program management unit 120 (step S240). It should be noted here that the test execution in step S240 is performed in the same manner as the flowchart shown in FIG. 23 (the execution candidate application in FIG. 26 is equivalent to the target program in FIG. 23).

If the execution candidate application has failed its test execution, the execution candidate application is not eligible for storage in the object storing unit 140. Therefore, the program management unit 120 clears the temporary stack 70 and the temporary check of the execution candidate application (step S247).

On the other hand, if the execution candidate application has passed the test execution, the program management unit 120 sets the temporary check of the execution candidate application as "true" and starts a process for performing test executions on all applications that the execution candidate application depends on (steps S242–S246). More specifically, the program management unit 120 checks whether the temporary checks of all applications that the execution candidate application depends on are set as "true" (step S242). If the check result in this step is affirmative, all of such applications will have passed their test executions. That is, all applications that the execution candidate application depends on have passed their test executions and these applications are guaranteed to function correctly.

On the other hand, if a temporary check of any of the applications that the execution candidate application depends on is not set as "true" (step S242), the program management unit 120 pushes information pairs of applications whose temporary checks are not set as "true" onto the temporary stack 70 (step S243). The program management unit 120 then pops each information pair from the temporary stack 70, sets the application corresponding to the popped information pair as a new execution candidate application (step S245), checks the temporary check of the new execution candidate application (step S246), and subjects the new execution candidate application to a test execution (step S240). The program management unit 120 repeats the operation in steps S241–S243 for each application that the original execution candidate application depends on until the temporary stack 70 becomes empty (step S244) or any application that the original execution candidate application depends on has failed the test execution (step S247). If any application that the original execution candidate application depends on has failed the test execution, the program management unit 120 clears the temporary stack 70 and each temporary check (step S247). On the other hand, if the temporary stack 70 becomes empty, the program management unit 120 does not clear temporary checks, that is, leaves the temporary checks of applications that have passed test executions as "true". The processing is then terminated (step L).

The program configuration management apparatus 200 next performs a process for writing applications whose temporary checks are set as "true", which is to say applications that are guaranteed to safely function along with other related applications, into the object storing unit 140 (steps S224, S225, S221, and S106'–S110).

As described above, the program configuration management apparatus 200 of the second embodiment has a construction where the test conducting unit 220 is added to the program configuration management unit 100 of the first embodiment. With this construction, programs downloaded into the receiving apparatus 510 are given input values specified by the test cases, which have been sent with the downloaded programs, and are subjected to test executions with other programs having dependent relations with the downloaded programs. The program configuration management apparatus 200 regards the downloaded programs as passing the test executions only if expected values are outputted within expected times. If the downloaded programs have passed the test executions, the program configuration management apparatus 200 stores the downloaded programs in the object storing unit 140 and formally registers the downloaded programs as execution objects. In this manner, the program configuration management apparatus 200 reduces the incidence of unrecoverable malfunctions that may occur if programs that contain bugs or are infected with viruses are sent from the broadcast center, are registered in the receiving apparatus as they are, and are executed by the receiving apparatus 510.

Also, when the numbers of modules and versions increase, there will be an explosive increase in the number of combinations of modules. In this case, it is very difficult for the broadcast center to check the functioning of each combination by performing a test execution. However, because the receiving apparatus 510 performs the test execution in this embodiment, the burden of such tests on the broadcast center is reduced.

Third Embodiment

The following description concerns the program configuration management apparatus 300 of the third embodiment that includes a removable auxiliary storing device. This auxiliary storing device can be used to store backup copies of information such as programs stored in the receiving apparatus 510 or to transfer such information into other receiving apparatuses.

Figure 27:
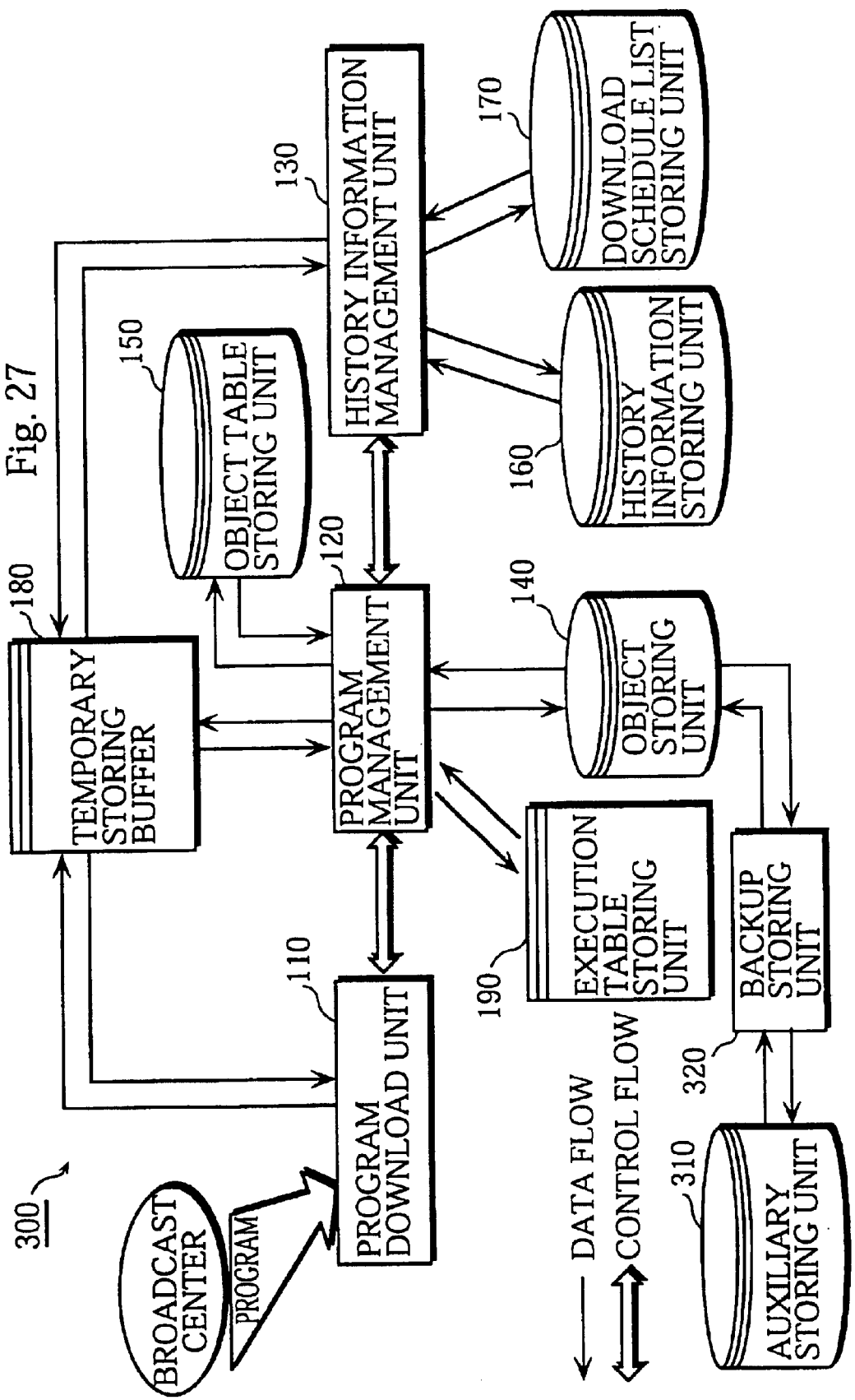
FIG. 27 is a functional block diagram showing the construction of a program configuration management apparatus of the third embodiment.

FIG. 27 is a functional block diagram showing the construction of the program configuration management apparatus 300. The present apparatus 300 has a construction where an auxiliary storing unit 310 and a backup recording unit 320 are added to the program configuration management apparatus 100 of the first embodiment. The program configuration management apparatus 300 is also built in the receiving apparatus 510 shown in FIG. 1.

The auxiliary storing unit 310 is a removable non-volatile memory (a memory card in which a flash memory is embedded) having a storage capacity that is no less than the storage capacity of the object storing unit 140. The auxiliary storing unit 310 is used to keep backup copies of all objects stored in the object storing unit 140 and is also used as a medium for copying the objects stored in the object storing unit 140 to other receiving apparatuses.

The backup recording unit 320 performs backup processing that writes objects stored in the object storing unit 140 into the auxiliary storing unit 310 and performs program reconstruction processing that restores objects stored in the auxiliary storing unit 310 into the object storing unit 140. The backup recording unit 320 is achieved by a program prestored in the EEPROM 518.

Figure 28:
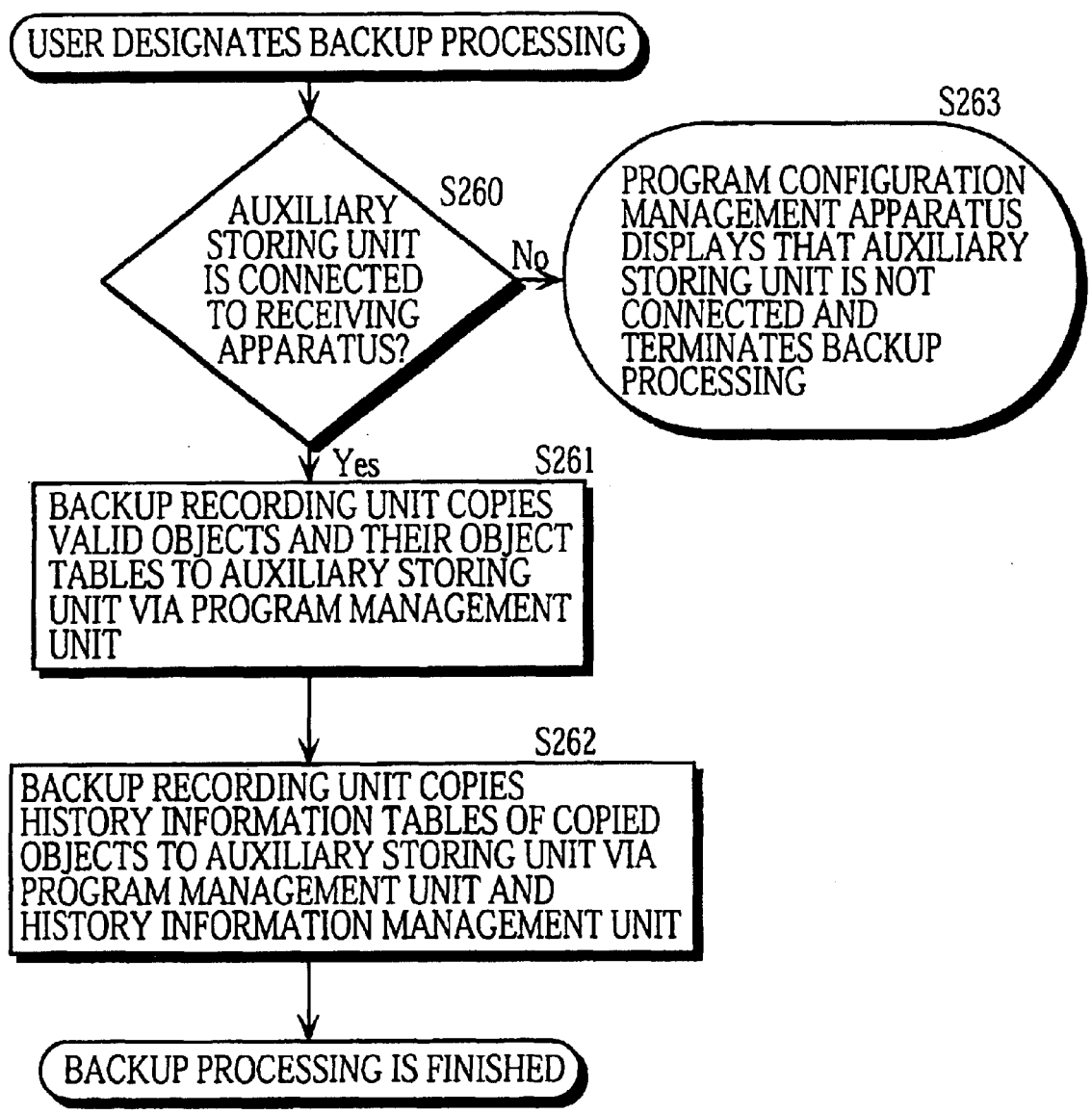
FIG. 28 is a flowchart showing a procedure for making backup copies of programs, which are stored in the object storing unit, in an auxiliary storing unit.

FIG. 28 is a flowchart showing the procedure for making backup copies of programs, which are stored in the object storing unit 140, in the auxiliary storing unit 310.

On receiving an instruction for making backup copies of programs from a user via the I/O unit 515, the backup recording unit 320 checks whether an auxiliary storing unit 310 is connected to the receiving apparatus 510 (step S260). If no auxiliary storing unit 310 is connected to the receiving apparatus 510, the program configuration management apparatus 300 informs the user via the I/O unit 515 and terminates the backup process (step S263).

On the other hand, if an auxiliary storing unit 310 is connected to the receiving apparatus 510, the backup recording unit 320 specifies every object whose validity descriptor 151f is set as "valid" by referring to the object tables in the object table storing unit 150 via the program management unit 120. The backup recording unit 320 then copies the specified objects from the object storing unit 140 to the auxiliary storing unit 310 and copies object tables of the copied objects from the object table storing unit 150 to the auxiliary storing unit 310 (step S261). In the copied object tables, the start addresses 151d are changed to give the start addresses of areas in the auxiliary storing unit 310 where the copied objects are stored.

The backup recording unit 320 then reads the history information concerning the copied objects, partially changes the read history information, and stores the changed history information into the auxiliary storing unit 310 (step S262). When changing the read history information, the backup recording unit 320 sets the program states 161c as "valid", blanks out the invalidation reasons 161d and the program download dates and times 161e. However, other items of the read history information are not changed.

In this manner, the backup processing by the backup recording unit 320 is completed and all objects that are currently "valid" and related information (object tables and history information corresponding to the valid objects) necessary for program reconstruction are stored in the auxiliary storing unit 310.

Figure 29:
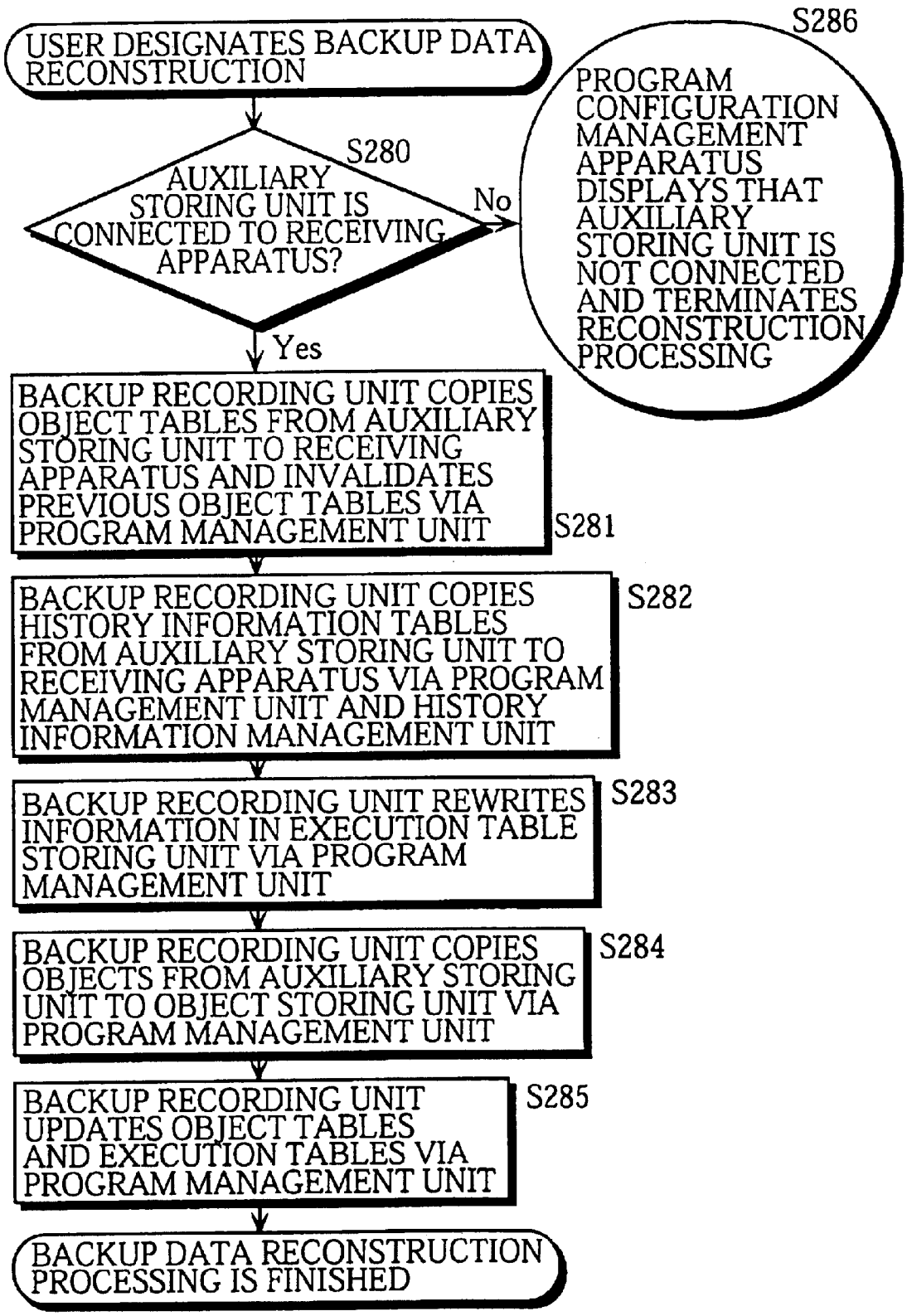
FIG. 29 is a flowchart showing a reconstruction procedure where programs and related information that are copied to the auxiliary storing unit in the manner shown in FIG. 28 are restored to the receiving apparatus.

FIG. 29 is a flowchart showing the reconstruction procedure where programs, object tables, and history information that are copied to the auxiliary storing unit 310 in the manner shown in FIG. 28 are restored into the receiving apparatus 510.

On receiving a reconstruction instruction (a restoration instruction) from the user via the I/O unit 515, the backup recording unit 320 checks whether the auxiliary storing unit 310 is connected to the receiving apparatus 510 (step S280). If the auxiliary storing unit 310 is not connected to the receiving apparatus 510, the backup recording unit 320 informs the user of this via the I/O unit 515 and terminates the reconstruction processing (step S286).

On the other hand, if the auxiliary storing unit 310 is connected to the receiving apparatus 510, the backup recording unit 320 writes object tables stored in the auxiliary storing unit 310 into the object table storing unit 150 of the receiving apparatus 510 and sets validity descriptors 151f of old object tables (object tables that have already been stored in the object table storing unit 50) corresponding to the written object tables as "invalid" via the program management unit 120 (step S281). The backup recording unit 320 then copies the history information in the auxiliary storing unit 310 into the history information storing unit 160 of the receiving apparatus 510 via the program management unit 120 and the history information management unit 130 (step S282). When doing so, the backup recording unit 320 changes each program download date and time 161e to show the date and time when this backup reconstruction is performed because the history information needs to give information that is appropriate to the receiving apparatus 510.

The backup recording unit 320 then rewrites information in the execution table storing unit 190 via the program management unit 120 (step S283). That is, the backup recording unit 320 generates execution tables according to the object tables written in step S282. Following this, the backup recording unit 320 copies objects from the auxiliary storing unit 310 to the object storing unit 140 via the program management unit 120 (step S284).

The backup recording unit 320 finally changes the start addresses of the object tables and execution tables that are copied to the receiving apparatus 510 to show the start addresses of areas in the object storing unit 140 to which objects are copied in step S284 (step S285). In this manner, the backup reconstruction processing is completed.

As described above, the program configuration management apparatus 300 of this embodiment has a construction where the auxiliary storing unit 310 and the backup recording unit 320 are added to the program configuration management unit 100 of the first embodiment. With this construction, all "valid" (current version) objects stored in the receiving apparatus 510 are copied to the removable auxiliary storing unit 310 along with necessary management information, and objects kept in the auxiliary storing unit 310 are restored into the receiving apparatus 510. Accordingly, contingencies are handled using the backup copies kept in the auxiliary storing unit 310. Even if programs in the receiving apparatus 510 are corrupted, for instance, the program configuration management apparatus 300 can use the auxiliary storing unit 310 to restore the program configuration in the receiving apparatus 510 to the state when the backup copies were made. In this manner, the receiving apparatus 510 can be restored to a functioning condition.

Also, with this construction, objects can be exchanged between receiving apparatuses and copied from one receiving apparatus to another receiving apparatus. For instance, programs in a given receiving apparatus are transferred to another receiving apparatus by making backup copies of programs of the given receiving apparatus in the auxiliary storing unit 310 and connecting the auxiliary storing unit 310 to another receiving apparatus. Also, when authorized distributors provide users with auxiliary storing units in which programs that are guaranteed to completely function are recorded, the programs can be transferred into users' receiving apparatuses from the auxiliary storing units. This allows applications to be accumulated in the receiving apparatuses using media apart from broadcast radio waves.

Fourth Embodiment

The following description concerns the program configuration management apparatus 400 of the fourth embodiment that subjects programs to test executions and acquires programs necessary for the receiving apparatus 510.

Figure 30:
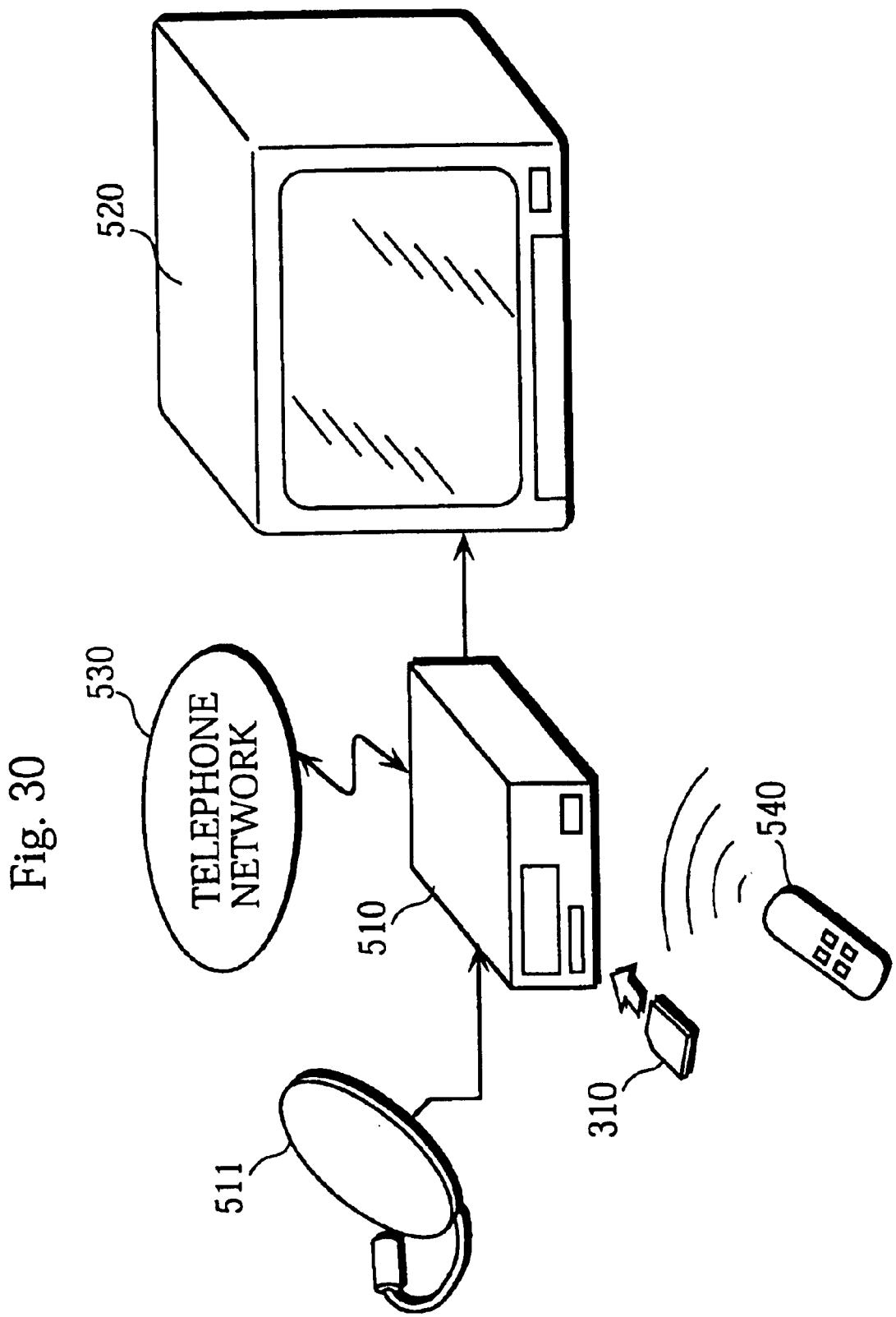
FIG. 30 shows the overall hardware construction of a digital satellite broadcast receiving system of the fourth embodiment.

FIG. 30 shows the overall hardware construction of a receiving system for digital satellite broadcasts to which the present program configuration management apparatus 400 is applied. The present system includes an antenna 511, the receiving apparatus 510, and a television 520. The receiving apparatus 510 downloads programs via broadcast radio waves and the auxiliary storing unit 310, like in the third embodiment. The receiving apparatus 510 also downloads programs from a program server (a computer that accumulates programs for the receiving apparatus 510 and electrically delivers the programs by request) on a network via a telephone network. Here, the receiving apparatus 510 is connected to the telephone network via a built-in modem. The receiving apparatus 510 also allows user interaction via a remote controller 540. When the user designates a program using the remote controller 540, the receiving apparatus 510 subjects the designated program to a test execution or downloads the designated program.

Figure 31:
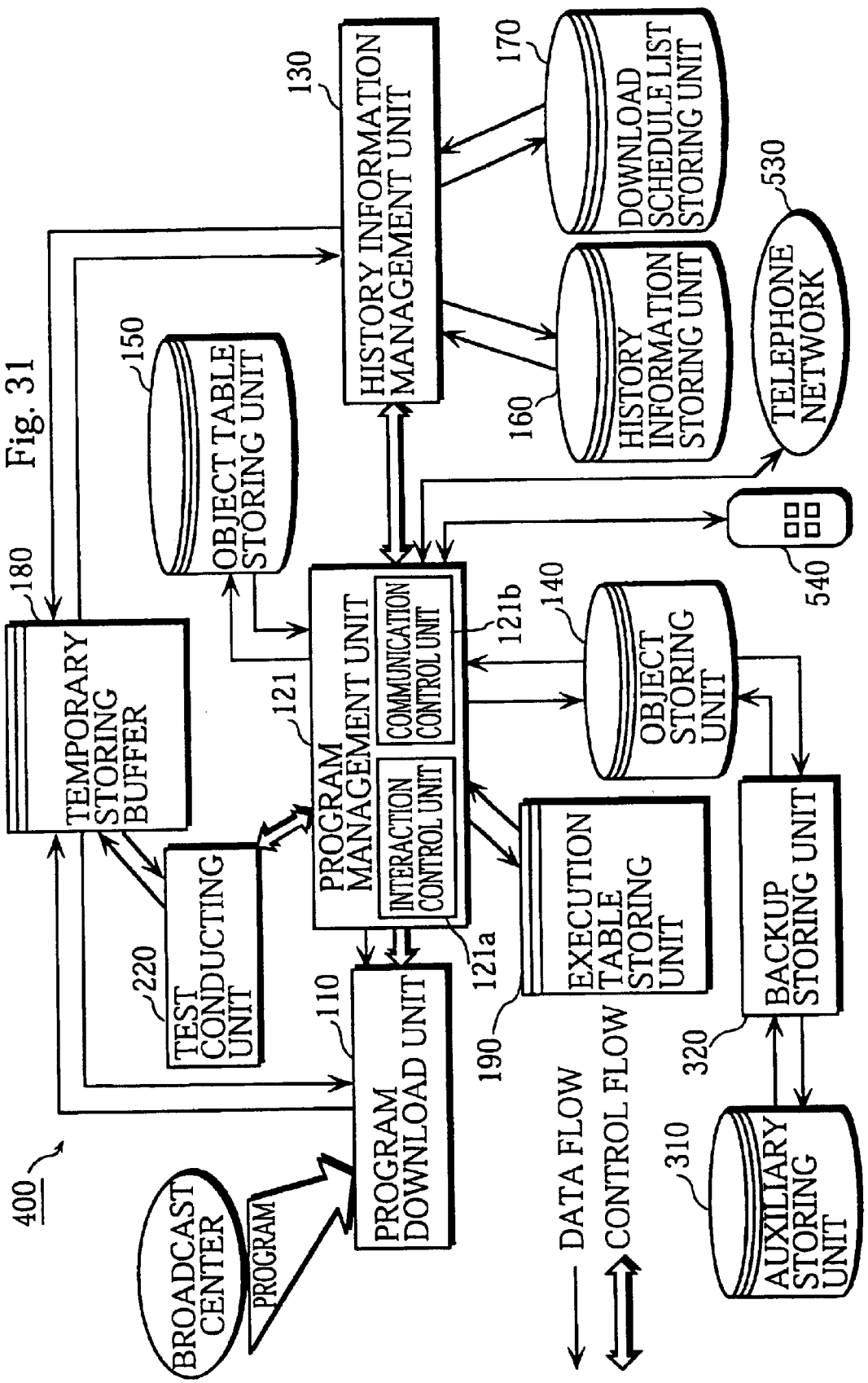
FIG. 31 is a functional block diagram showing the construction of a program configuration management apparatus of the fourth embodiment that is built in the receiving apparatus shown in FIG. 30.

FIG. 31 is a functional block diagram showing the construction of the program configuration management apparatus 400 that is built in the receiving apparatus 510 shown in FIG. 30. This apparatus 400 has a function of interacting with a user, in addition to functions of the program configuration management unit 200 of the second embodiment and the program configuration management unit 300 of the third embodiment.

More specifically, the program configuration management apparatus 400 has a construction where the test conducting unit 220, the auxiliary storing unit 310, and the backup recording unit 320 are added to the program configuration management unit 100 of the first embodiment. Also, the program configuration management apparatus 400 includes a program management unit 121 instead of the program management unit 120 of the first embodiment. Here, the program management unit 121 includes an interaction control unit 121a and a communication control unit 121b, in addition to the functions of the program management unit 120.

The communication control unit 121b includes a circuit for receiving infrared rays from the remote controller 540 and analyzing commands. The communication control unit 121b also includes the modem that connects the receiving apparatus 510 with the telephone network 530.

The interaction control unit 121a receives instructions from the user via the communication control unit 121b and the remote controller 540. The interaction control unit 121a also allows the user to interact with the receiving apparatus 510 by displaying graphics on the screen of the television 520. The interaction control unit 121a further controls test executions and program downloads according to user's instructions.

Figure 32:
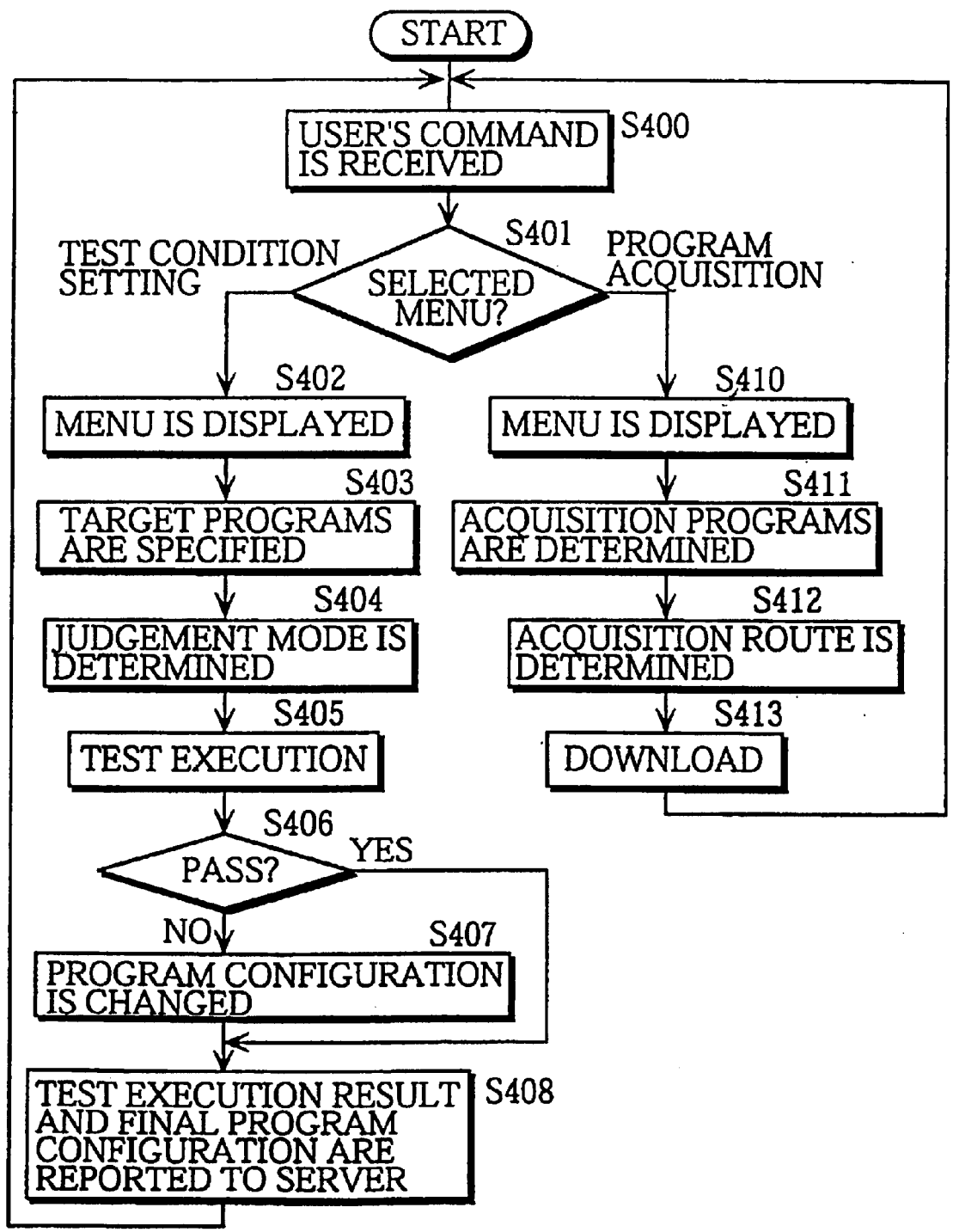
FIG. 32 is a flowchart showing the procedure where the program configuration management apparatus of the fourth embodiment interacts with a user.

FIG. 32 is a flowchart showing the procedure where the program configuration management apparatus 400 interacts with the user. The interaction operation is described below with reference to example screens shown in FIGS. 33–35.

The interaction control unit 121*a* first receives an instruction for displaying a maintenance menu from the user via the remote controller 540 (step S400). The interaction control unit 121*a* then judges whether the user designates a "test condition setting" mode or a "new program acquisition" mode according to the key (the corresponding signal) sent from the remote controller 540 (step S401).

Figure 33:
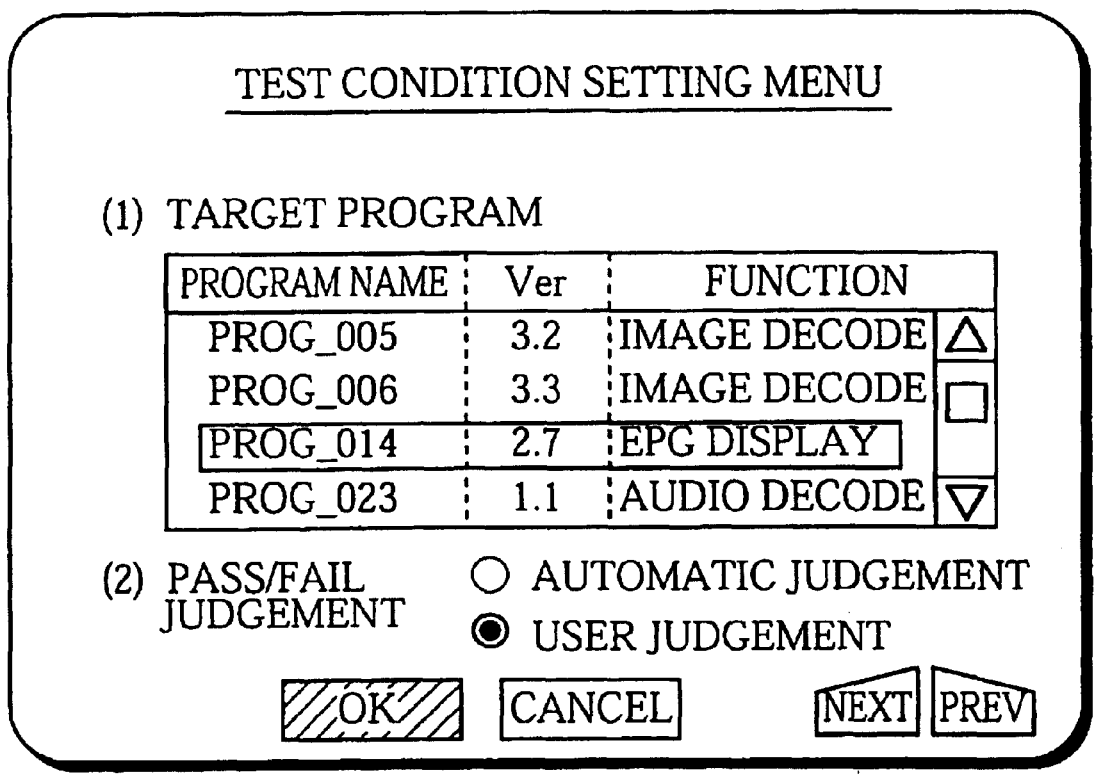
FIG. 33 shows an example of a "test condition setting menu" displayed by the program configuration management apparatus of the fourth embodiment.

When the user designates the "test condition setting" mode, the interaction control unit 121*a* displays a "test condition setting menu" shown in FIG. 33 on the screen of the television 520 (step S402). That is, the interaction control unit 121*a* displays (1) a scroll window for allowing the user to specify programs that the user wishes to subject to test executions and (2) a selection menu for allowing the user to select a method for judging whether the programs have passed their test executions.

As shown in FIG. 33 (see the first selection item (1)), the scroll window lists names, versions, and functions of all programs present in the receiving apparatus. The user scrolls the window and highlights programs that the user wants to subject to test executions. By doing so, the user specifies one or more programs to be subjected to test executions (such programs are hereinafter referred to as "test programs") (step S403). Here, it is assumed that the user selects a program "PROG_014 (Ver. 2.7)", as shown in FIG. 33. This program is used to display an EPG (Electronic Program Guide) that is multiplexed with image data into transport streams of broadcast radio waves and is sent from the broadcast center.

With the second selection item (2) shown in FIG. 33, the user also selects a test pass/fail judgement mode from an "automatic judgement" mode and a "user judgement" mode (step S404). When the user selects the "automatic judgement" mode, the test pass/fail judgement is made in the same manner as the second embodiment. That is, the test pass/fail judgement is made according to the pass/fail criteria specified by the test case stored in the receiving apparatus 510. On the other hand, when selecting the "user judgement" mode, the user makes the test pass/fail judgement by himself using the screen of the television 520. Here, it is assumed that the user selects the "user judgement" mode, as shown in FIG. 33.

After making the selections described above, the user finally pushes an "OK" button to start the test execution (step S405). On receiving a designation for commencing the test execution, the interactive control unit 121*a* informs the test execution unit 220 of the name and version of the test program. The test execution unit 220 then performs the test execution of the test program.

Figure 34:
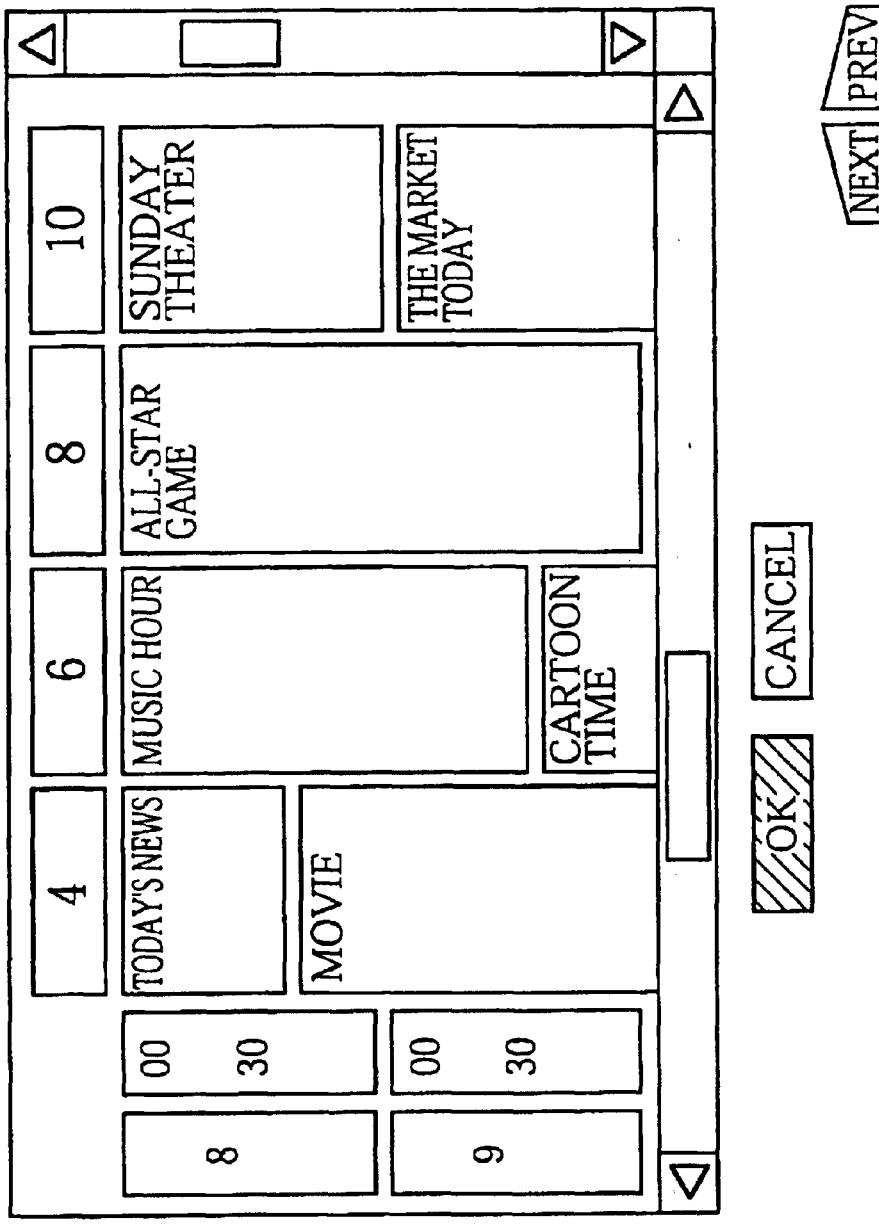
FIG. 34 shows an example of an EPG displayed by the program configuration management apparatus of the fourth embodiment.

As a result of the test execution, an EPG that has already been stored in the receiving apparatus 510 is displayed on the screen of the television 520, like the example screen shown in FIG. 34. As shown in this drawing, part of the EPG is displayed within a scroll window, in this example.

The user checks whether the entire EPG is correctly displayed by operating the scroll button with the remote controller 540. That is, the user checks the result of the test execution by interacting with the screen to see whether the program "PROG_014" properly functions. Note that the window at the center of the example screen is displayed as a result of the test execution of PROG_014, while other titles and menu items are displayed by the interaction control unit 121*a*.

The user pushes a "pass" button on judging that the EPG is correctly displayed from the test execution result or otherwise pushes a "fail" button (step S406).

Here, if the user pushes the "fail" button, the interaction control unit 121*a* reconstructs programs (step S407). More specifically, the interaction control unit 121*a* judges whether the test program PROG_014 is valid by referring to the object table storing unit 150. If the test program PROG_014 is valid, the program management unit 121 reinstalls an immediately preceding version of,the program PROG_014 (step S407). In this manner, the program configuration management apparatus 400 properly reconstructs the configuration of programs in the receiving apparatus 510. That is, the program configuration management apparatus 400 removes the program that has failed its test execution from the program configuration.

After the user pushes the "pass" button in step S406 or after the processing in step S407 that is performed in the case where the user pushes the "fail" button, the interaction control unit 121*a* informs the program server of the test execution result and the final program configuration via the communication control unit 121*b* and the telephone network 530 (step S408). In this manner, the test execution operation is completed and the process returns to the menu selection processing (step S400).

Figure 35:
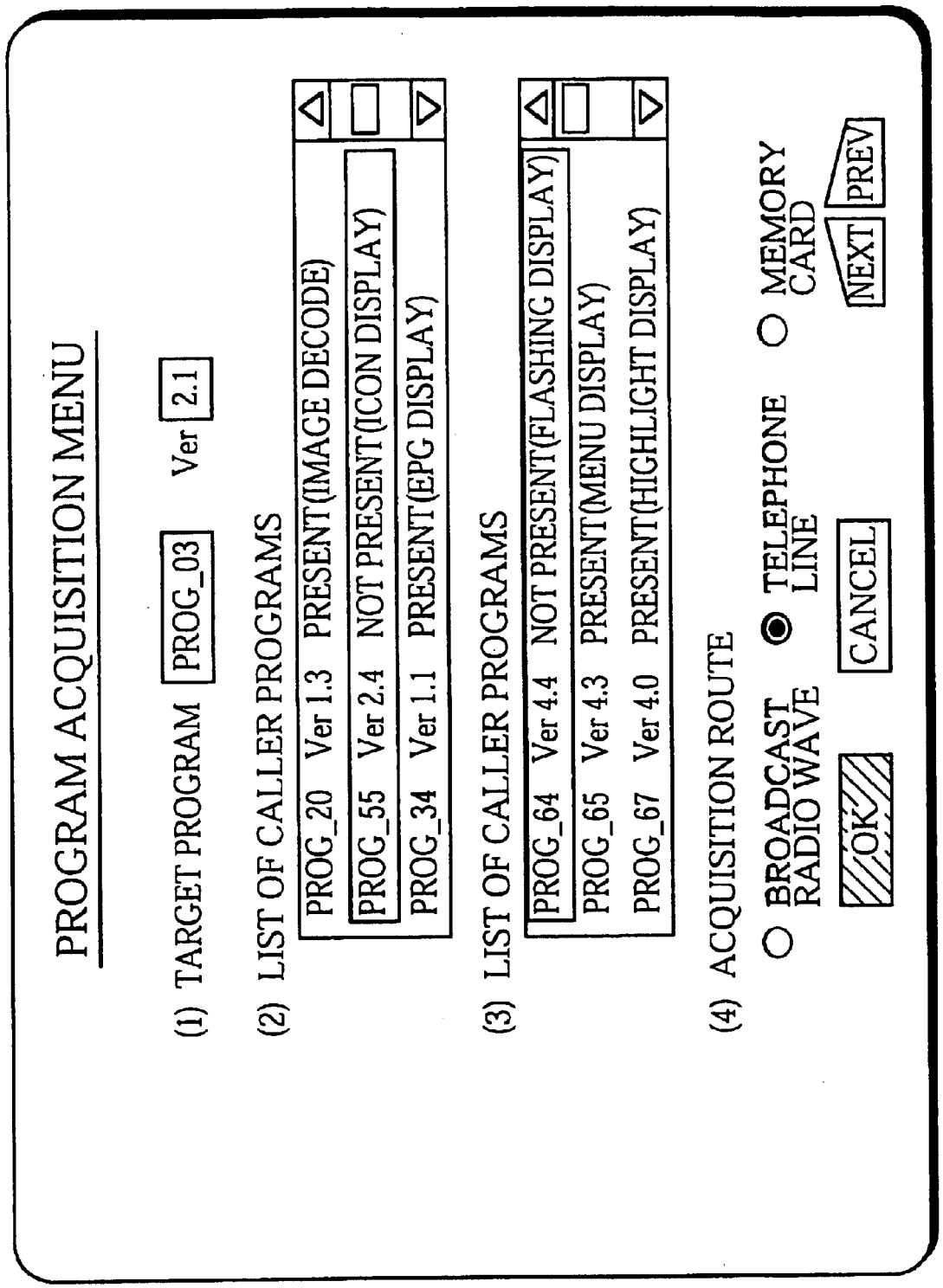
FIG. 35 shows an example of a "program acquisition menu" displayed by the program configuration management apparatus of the fourth embodiment.

If the user designates the "new program acquisition" mode in the menu selection (step S401), the interaction control unit 121*a* displays a "program acquisition menu" shown in FIG. 35 on the screen of the television 520 (step S410). More specifically, the interaction control unit 121*a* displays four items (1)–(4). The first through third items help the user search for and specify programs that the user wishes to acquire, while the fourth item allows the user to select a route for acquiring the specified programs.

More specifically, the user inputs the name and version of a focused program into the first item. Here, the focused program means a program focused on when the user searches for programs that the user wants to download. In this example, as shown in FIG. 35, the user inputs "PROG_03" and "2.1" as the name and version of the focused program, respectively.

The interaction control unit 121*a* then displays a list of all programs (caller programs) that call the focused program (PROG_03, Ver. 2.1) in the scroll window as the second item. At the same time, the interaction control unit 121*a* displays a list of all programs (callee programs) that the focused program (PROG_03, Ver. 2.1) calls in the scroll window as the third item. When doing so, the interaction control unit 121*a* refers to the dependency information 151*g* of the focused program in the object table storing unit 150. Note that these lists include names and versions of the caller and callee programs, information showing whether the programs are currently present (stored) in the receiving apparatus 510, and information concerning the functions of the programs.

The user scrolls through these two windows and highlights programs that the user wishes to acquire. In this manner, the user specifies one or more programs to be acquired (step S411). In this example, the user selects programs "PROG_55, Ver. 1.3" and "PROG_64, Ver. 4.4" as shown in FIG. 35.

The user then selects a route for acquiring these programs from "broadcast radio wave", "telephone line", and "memory card" in the fourth item (step S412). Here, it is assumed that the user selects "telephone line" as shown in FIG. 35.

After the operation described above (inputs of the four items), the user finally pushes an "OK" button to start the download of the programs (step S413). In this example, on being informed that the OK button has been pushed, the interaction control unit 121a informs the communication control unit 121b of the contents of the items (1)–(4). The communication control unit 121b then downloads the two programs selected by the user from a program server that is connected with the receiving apparatus 510 via the telephone network 530. The downloaded programs are passed from the communication control unit 121b to the program download unit 110 and are processed in the same manner as the flowchart in FIG. 10 of the first embodiment.

If the user selects the "broadcast radio wave" in the fourth item as the acquisition route, the program management unit 121 registers the programs selected by the user in the download schedule list stored in the download schedule list storing unit 170. Following this, the same operation as the first embodiment is performed.

If the user selects the "memory card" in the fourth item as the acquisition route, the backup recording unit 320 reads the programs selected by the user from the auxiliary storing unit 310 and stores the read programs in the object storing unit 140. This operation is performed under the control of the program management unit 121 in the same manner as in the flowchart in FIG. 29.

After the programs selected by the user are downloaded in this manner, the interaction control unit 121a terminates the program acquisition processing and returns to the menu selection processing (step S400).

As described above, the program configuration management apparatus 400 of the present embodiment has a construction where the test conducting unit 220, the auxiliary storing unit 310, the backup recording unit 320, the interaction control unit 121a, and the communication control unit 121b are added to the program configuration management apparatus 100 of the first embodiment. This construction allows the user to download intended programs, subjects the downloaded programs to test executions, and evaluates results of the test executions by interacting with the receiving apparatus 510. Accordingly, the user can maintain the configuration of programs in the receiving apparatus 510 in the latest state and diagnose faults without reference to schedules drawn up by program providers. That is, the user can perform the configuration maintenance and fault diagnosis at his convenience according to his own intended use of the receiving apparatus 510.

The program configuration management apparatus of the present invention has been described above by means of Embodiments 1–4, although it should be obvious that the present invention is not limited to these embodiments.

(1) In the above embodiments, programs and data that construct (provide the functions of) the receiving apparatus 510 except for the program configuration management apparatus are downloaded. However, programs that construct the program configuration management apparatus (such as the program download unit 110 and the program management unit 120) may also be downloaded and updated. Such programs that construct the program configuration management apparatus are hereinafter referred to as "download programs".

For instance, like programs that construct the receiving apparatus 510 except for the program configuration management apparatus, the download programs are stored in the object storing unit 140 and managed by the program configuration management apparatus. When the download programs are executed to download programs or data, the download programs are copied from the object storing unit 140 and are expanded in the temporary storing buffer 180. Then the start addresses 191c in the corresponding execution tables are changed to show the start addresses of areas in the temporary storing buffer 180 where the download programs are stored.

In this manner, not the download programs in the object storing unit 140 but the download programs in the temporary storing buffer 180 are executed by the CPU 516. This means that download programs to be updated and download programs that are executed to download new versions of the download programs are managed as different objects. Therefore, after this operation, the new versions of the download programs can be downloaded in the same manner as the first to third embodiments.

The simplest method for achieving this system is to expand all programs, which are stored in the object storing unit 140, in the temporary storing buffer 180 when the receiving apparatus 510 is activated. That is, after all programs in the object storing unit 140 are expanded in the temporary storing buffer 180, the start addresses 191c of the corresponding execution tables are changed to show the start addresses of areas in the temporary storing buffer 180 where the expanded programs are stored. In this case, because all functions of the receiving apparatus 510 including the program configuration management apparatus are achieved by executing programs stored in the temporary storing buffer 180, any kind of program and data, including new versions of download programs, can be downloaded.

(2) In the above embodiments, there is no limitation on the locations of objects in the object storing unit 140. However, such locations may be fixed or each block may be restricted to storing programs or data. In this case, if there is no blank block in the object storing unit 140 (if the judgement result in step S140 in FIG. 17 is "No") during the program relocation processing, blocks that only store data such as font data are blanked out. By doing so, even if power is accidentally disconnected from the receiving apparatus 510, programs are not destroyed. Therefore, the worst case where the receiving apparatus 510 cannot be restarted can be avoided.

(3) In the second embodiment, if a program has failed its test execution, the program state 161c of the program is set as "non-downloadable" (step S207). However, the test execution failure may be explicitly indicated. For instance, a test execution flag corresponding to a program is set in the temporary storing buffer 180 before the test execution of the program, and the test execution flag is reset only if the program has passed its test execution. In some cases, programs run away out of control during test executions and the receiving apparatus 510 hangs up. However, with this construction, even if the same programs are sent from the broadcast center afterward, it can be confirmed that the programs have already failed test executions because test execution flags of the programs are not reset. Therefore, a situation where the programs are repeatedly subjected to test executions and the receiving apparatus 510 hangs up over and over again is avoided.

Also, test executions may be performed using contents sent from the broadcast center. In this case, the test execution flags are also useful. Programs to be subjected to test executions are expanded in the temporary storing buffer 180 and the corresponding execution tables are updated to show that the expanded programs are valid. By doing so, the operation of the receiving apparatus 510 is controlled by the expanded programs. At the same time, contents that utilize the expanded programs are sent from the broadcast center to allow the expanded programs to achieve all the functions of the receiving apparatus 510. In this case, if fatal bugs are included in the expanded programs or the expanded programs do not function in the receiving apparatus 510 and the receiving apparatus 510 hangs up, the test execution failures of the expanded programs are explicitly shown by the test execution flags.

(4) In the second embodiment, the program state 161*c* of a target program is set as "non-downloadable" when the target program has failed its test execution. However, the program configuration management apparatus may be modified to reset the program state 161*c* set as "non-downloadable". This is because even if the target program has failed its test execution, the target program may properly run after programs that the target program depends on are updated. More specifically, the history information storing unit 160 may also store information as to the date and time when the target program has failed the test execution. If programs that the target program depends on have been downloaded after the target program has failed the test execution, the target program can be downloaded and subjected to the test execution again regardless of whether the program state 161*c* of the target program was previously set as "non-downloadable" during its download (step S15 in FIG. 13).

(5) In the third embodiment, the test cases that are sent from the broadcast center along with programs only include input values, output values, and times taken by executions of the programs. However, the test cases may also contain applications that use all functions of target programs. In this case, the receiving apparatus 510 subjects the target programs to test executions by executing the applications contained in the sent test cases. Also, by sending such test cases with programs, the broadcast center can give the receiving apparatus an optimal test method for each target program.

After target programs stored in the temporary storing buffer 180 are validated, for instance, the receiving apparatus 510 receives test cases that are sent from the broadcast center as contents and performs test executions using applications contained in the test cases. This allows the program configuration management apparatus to check whether programs in the receiving apparatus 510 are properly combined.

(6) In the third embodiment, during the program relocation processing, programs designated by the broadcast center are deleted. However, programs that precede a given date may be deleted. Also, if there are three or more versions of programs are stored in the receiving apparatus 510, the third and older versions from the latest version may be deleted. In this manner, program configuration management apparatuses that use various program deletion conditions can be achieved.

(7) In the first embodiment, when the CPU 516 executes programs, the program management unit 120 specifies programs that should be executed by referring to execution tables stored in the temporary storing buffer 180. However, the execution tables may be omitted. For instance, each time a request to select programs to be executed is issued to the program management unit 120, the program management unit 120 may refer directly to object tables in the object table storing unit 150 and specify objects to be executed. With this method, the program configuration management apparatus does not need to include the execution table storing unit 190 in FIG. 4.

(8) In the third embodiment, when backup copies of objects in the receiving apparatus 510 are made, all programs stored in the object storing unit 140 are copied to the auxiliary storing unit 310. However, specific programs may be selectively copied to the auxiliary storing unit 310. In this case, backup copies of only applications that a user designates are made. Also, only applications that a user designates can be copied to other receiving apparatuses.

(9) In the first and second embodiments, objects and programs sent from the broadcast center are downloaded and subjected to test executions. However, objects and programs copied from the auxiliary storing unit 310 of the third embodiment may also be subjected to test executions. In this case, not only online version-up from the broadcast center but also offline version-up using the auxiliary storing unit 310 as a medium are performed. Also, applications stored in the auxiliary storing unit 310 may be subjected to test executions and copied to other receiving apparatuses.

Figure 36:
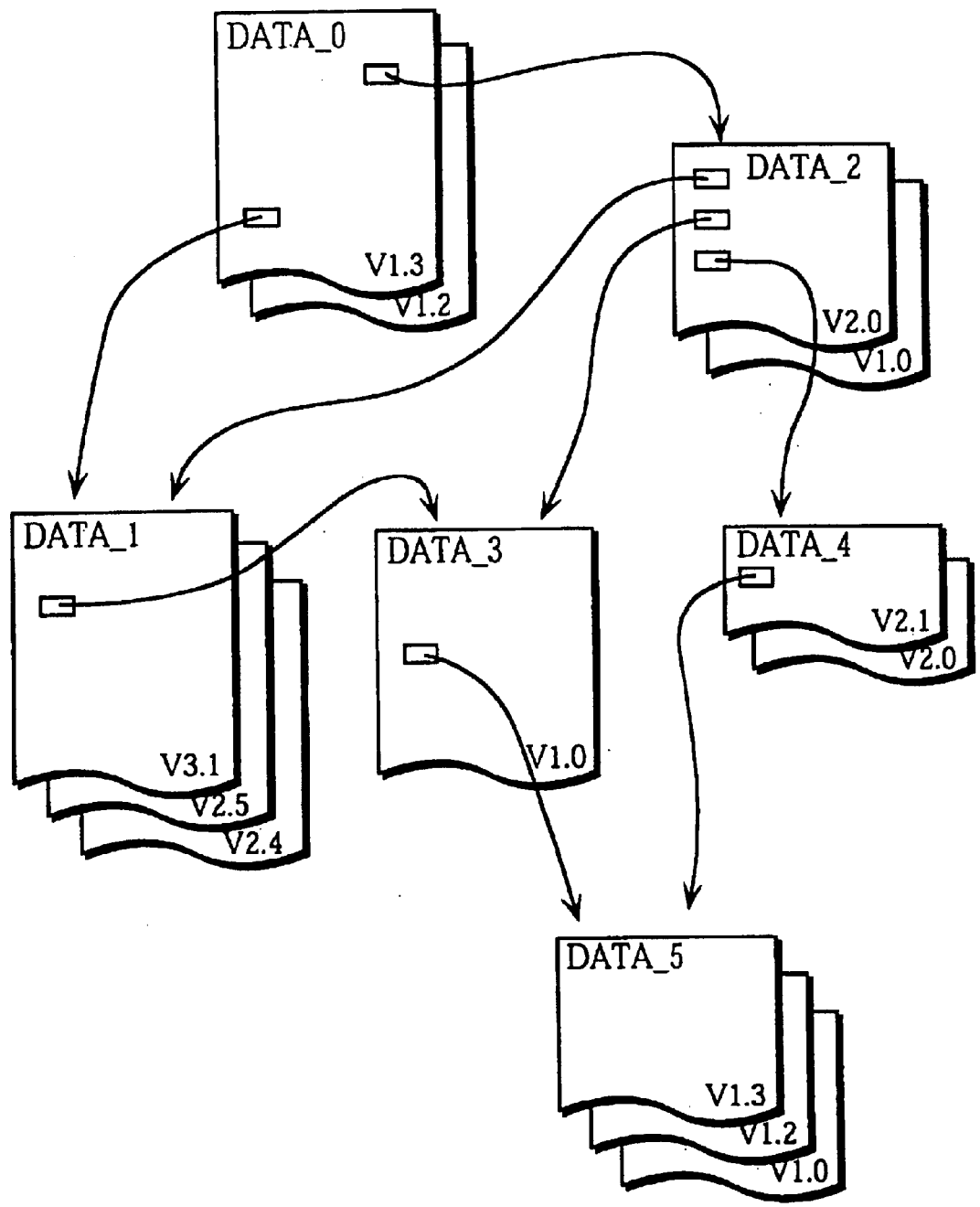
FIG. 36 shows the construction of modularized data having a hyperlink structure.

(10) In the above embodiments, the program configuration management apparatus reinstalls previous versions of programs. However, the program configuration management apparatus may restore previous versions of data in the receiving apparatus 510. In some cases, there are several versions of each type of data and the versions have dependent relations with each other due to a hyperlink structure, as shown in FIG. 36. In such cases, the program configuration management apparatus of the present invention may be used to manage versions of data, such as the restoration of previous versions of data.

When a news program of a data broadcast is divided into modules according to areas and topics and the modules are combined to construct a single large news program, for instance, the program configuration management apparatus may download the latest news module of the news program and update the whole of the news program using the downloaded module. Also, when faults are found in part of news information, the program configuration management apparatus may restore previous versions of data.

What is claimed is:

1. A program configuration management apparatus that is used for a communication terminal device and manages a configuration of programs for providing functions of the communication terminal device, the program configuration management apparatus comprising:

download means for downloading a program via a communication channel;

program holding means for holding the downloaded program as well as at least one previous version of the downloaded program including a program holding unit for holding each program downloaded by the download means, and a management information holding unit for holding management information that shows a name, a version, and validity information for each program in the program holding unit, the validity information showing whether a program is valid or invalid, with programs whose validity information is valid being selected as execution objects, and the management information also shows the names and versions of programs that have dependent relations with individual programs in the program holding means, previous version reinstallation means for receiving a previous version reinstallation designation for a specific program held in the program holding means, invalidating a current version of the specific program, and validating a previous version of the specific program includes, a receiving unit for receiving a designation of a name of the specific program and a reinstallation target version of the specific program; and a reinstallation unit for validating a previous version of the specific program by changing the validity information of a certain version of the specific program, the certain version being a most recent version, out of the reinstallation target version and older versions of the specific program, in the program holding unit; and a related program reinstallation unit that identifies all programs which have dependent relations with the specific program by referring to the management information, and validates a suitable version of each identified program by referring to the history information, the suitable version of each identified program being the version that was downloaded at a latest time prior to the invalidation date and time of the version validated by the reinstallation unit; and history information holding means for holding history information giving a name, a version, a downloading date and time, and an invalidation date and time for each of the downloaded programs, the downloading date and time showing when a program was downloaded and the invalidation date and time showing when a program that has been invalidated was invalidated.

2. The program configuration management apparatus of claim 1, further comprising:

a removable, non-volatile memory;

backup means for copying a designated program from the program holding unit to the non-volatile memory, management information related to the designated program from the management information holding unit to the non-volatile memory, and history information related to the designated program from the history information holding means to the non-volatile memory; and restoring means for copying the copied program from the non-volatile memory to the program holding unit, the copied management information from the non-volatile memory to the management information holding unit, and the copied history information from the nonvolatile memory to the history information holding means.

3. A program configuration management apparatus that is used for a communication terminal device and manages a configuration of programs for providing functions of the communication terminal device, the program configuration management apparatus comprising:

download means for downloading a program via a communication channel;

program holding means for holding the downloaded program as well as at least one previous version of the downloaded program;

previous version reinstallation means for receiving a previous version reinstallation designation for a specific program held in the program holding means, invalidating a current version of the specific program, and validating a previous version of the specific program; and test means for performing a test execution on each downloaded program and writing only programs that pass the test execution into the program holding means, wherein the download means downloads test conditions and pass/fail evaluation criteria together with each program, and the test means performs a test execution on each downloaded program using the test conditions downloaded with the program and judges whether the program has passed the test execution according to the pass/fail evaluation criteria downloaded with the program, the test means includes a test result saving unit for saving a result of the test execution of each downloaded program so that the result is associated with the downloaded program, and before a downloaded program is subjected to a test execution, the test means refers to the test result saving unit and terminates the test execution if the downloaded program failed a previous test execution.

4. The program configuration management apparatus of claim 3, further comprising an interaction means for interacting with a user by displaying graphics, wherein the test means performs test executions on downloaded programs that have been specified by the interaction means.

5. The program configuration management apparatus of claim 4, wherein the interaction means displays a state of each test execution performed by the test means using graphics and obtains pass/fail evaluation criteria for the test execution from the user.

6. A program configuration management apparatus that is used for a communication terminal device and manages a configuration of programs for providing functions of the communication terminal device, the program configuration management apparatus comprising:

download means for downloading a program via a communication channel;

program holding means for holding the downloaded program as well as at least one previous version of the downloaded program;

previous version reinstallation means for receiving a previous version reinstallation designation for a specific program held in the program holding means, invalidating a current version of the specific program, and validating a previous version of the specific program; and relocation means for receiving a designation of an unwanted version of a program, erasing the unwanted version and all earlier versions of the program from the program holding means, and relocating remaining programs in the program holding means to combine blank areas where the erased versions were previously stored.

7. A program configuration management method that is used for a communication terminal device and manages a configuration of programs for providing functions of the communication terminal device, the program configuration management method comprising:

a download step for downloading a program via a communication channel;

a program storing step for storing the downloaded program into program holding means, the program holding means holding the downloaded program as well as at least one previous version of the downloaded program;

a previous version reinstallation step for receiving a previous version reinstallation designation for a specific program held in the program holding means, invalidating a current version of the specific program, and validating a previous version of the specific program; and a relocation step for receiving a designation of an unwanted version of a program, erasing the unwanted version and all earlier versions of the program from the program holding means, and relocating remaining programs in the program holding means to combine blank areas where the erased versions were previously stored.

8. A computer-readable recording medium which records a program for having a computer perform a program configuration management method that is used for a communication terminal device and manages a configuration of programs for providing functions of the communication terminal device, the program configuration management method comprising:

a download step for downloading a program via a communication channel;

a program storing step for storing the downloaded program into program holding means, the program holding means holding the downloaded program as well as at least one previous version of the downloaded program; and a previous version reinstallation step for receiving a previous version reinstallation designation for a specific program held in the program holding means, invalidating a current version of the specific program, and validating a previous version of the specific program, wherein the program configuration management method further comprises a relocation step for receiving a designation of an unwanted version of a program, erasing the unwanted version and all earlier versions of the program from program holding means, and relocating remaining programs the program holding means to combine blank areas where the erased versions were previously stored.

* * * * *

UNITED STATES PATENT AND TRADEMARK OFFICE
CERTIFICATE OF CORRECTION

PATENT NO. : 6,704,933 B1
DATED : March 9, 2004
INVENTOR(S) : Tanaka et al.

It is certified that error appears in the above-identified patent and that said Letters Patent is hereby corrected as shown below:

<u>Title page,</u>
Item [73], Assignee, please delete "Masushita" and insert -- Matsushita --.

<u>Column 41,</u>
Line 46, after the word "the" delete "nonvolatile" and insert -- non-volatile --.

Signed and Sealed this

Fourth Day of January, 2005

JON W. DUDAS
*Director of the United States Patent and Trademark Office*